United States Patent
Yamanaka et al.

(10) Patent No.: US 10,061,439 B2
(45) Date of Patent: Aug. 28, 2018

(54) TOUCH PANEL INPUT DEVICE

(71) Applicant: Konica Minolta, Inc., Chiyoda-ku, Tokyo (JP)

(72) Inventors: Tomoo Yamanaka, Toyokawa (JP); Tomoaki Yamada, Toyokawa (JP); Katsuaki Wakui, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 44 days.

(21) Appl. No.: 14/638,178

(22) Filed: Mar. 4, 2015

(65) Prior Publication Data
US 2015/0253928 A1   Sep. 10, 2015

(30) Foreign Application Priority Data

Mar. 10, 2014  (JP) .................................. 2014-046682

(51) Int. Cl.
*G06F 3/042* (2006.01)
*G06F 1/32* (2006.01)
(Continued)

(52) U.S. Cl.
CPC .......... *G06F 3/0421* (2013.01); *G06F 1/3262* (2013.01); *G06F 3/0416* (2013.01); *G06F 3/04886* (2013.01); *G06F 2203/04104* (2013.01)

(58) Field of Classification Search
USPC ...................... 345/173–178; 178/18.01–20.01
See application file for complete search history.

(56) References Cited

U.S. PATENT DOCUMENTS 4,806,749 A    2/1989   Ohuchi et al.
5,355,149 A *  10/1994  Casebolt ............... G06F 3/0421
                                              250/221
(Continued)

FOREIGN PATENT DOCUMENTS

JP    63-103142 U    7/1988
JP    7-210299 A     8/1995
(Continued)

OTHER PUBLICATIONS

Arrange Desktop Icons Win XP; pc4seniors, Published Sep. 18, 2011.*

(Continued)

*Primary Examiner* — Chad Dicke
(74) *Attorney, Agent, or Firm* — Buchanan Ingersoll & Rooney PC

(57) ABSTRACT

Touch panel input device including: display panel having display surface; display controller causing display of button image on the display surface, the button image used for receiving touch operation performed by user; touch position detector detecting touch position of the display surface by detecting X and Y coordinates on X-Y rectangular coordinate system; area specifier specifying first area and second area of the display surface, the first area being area at which the button image is to be displayed, the second area being remaining area of display surface; and detection instructor referring to result of the specification by the area specifier and instructing the touch position detector (i) to perform touch position detection with respect to an area corresponding to the first area and (ii) to put in off state touch position detection with respect to an area corresponding to at least a part of the second area.

23 Claims, 17 Drawing Sheets

(51) Int. Cl.
*G06F 3/041* (2006.01)
*G06F 3/0488* (2013.01)

(56) References Cited

U.S. PATENT DOCUMENTS

| | | | |
|---|---|---|---|
| 6,426,761 B1* | 7/2002 | Kanevsky | G06F 3/0481 715/764 |
| 2004/0145575 A1* | 7/2004 | Weindorf | G06F 3/0421 345/173 |
| 2009/0199134 A1* | 8/2009 | Murayama | G06F 3/0482 715/835 |
| 2010/0134447 A1* | 6/2010 | Nakajoh | G06F 3/0421 345/175 |
| 2010/0238138 A1* | 9/2010 | Goertz | G06F 3/042 345/175 |
| 2011/0138328 A1* | 6/2011 | Ge | G06F 3/0482 715/811 |
| 2012/0154336 A1 | 6/2012 | Lee et al. | |
| 2013/0215049 A1 | 8/2013 | Lee | |
| 2014/0344608 A1* | 11/2014 | Wang | G06F 1/3287 713/324 |

FOREIGN PATENT DOCUMENTS

| | | |
|---|---|---|
| JP | 11-232024 A | 8/1999 |
| JP | 2008-250495 A | 10/2008 |
| JP | 2012-47980 A | 3/2012 |
| JP | 2012-128851 A | 7/2012 |
| JP | 2013-168121 A | 8/2013 |

OTHER PUBLICATIONS

Office Action (Notification of Reasons for Refusal) dated Feb. 2, 2016, by the Japanese Patent Office in corresponding Japanese Patent Application No. 2014-046682, and an English translation of the Office Action. (8 pages).

Office Action (Notification of Reasons for Refusal) dated Dec. 27, 2016, by the Japanese Patent Office in corresponding Japanese Patent Application No. 2016-074633 and an English translation of the Office Action. (5 pages).

* cited by examiner

FIG. 17
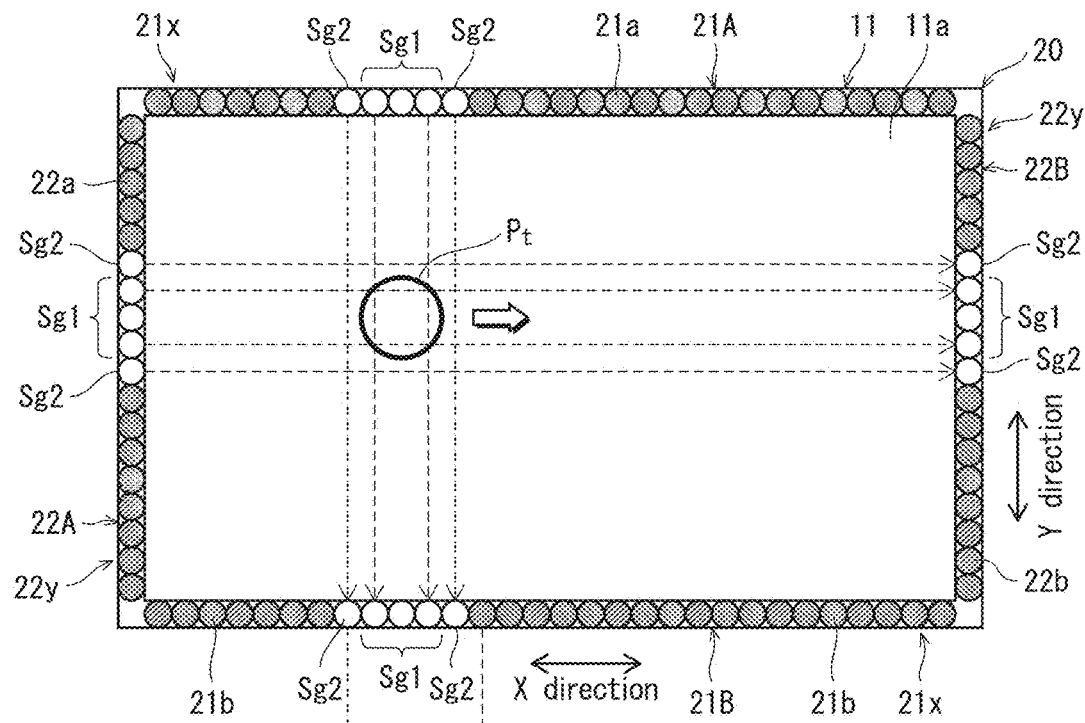
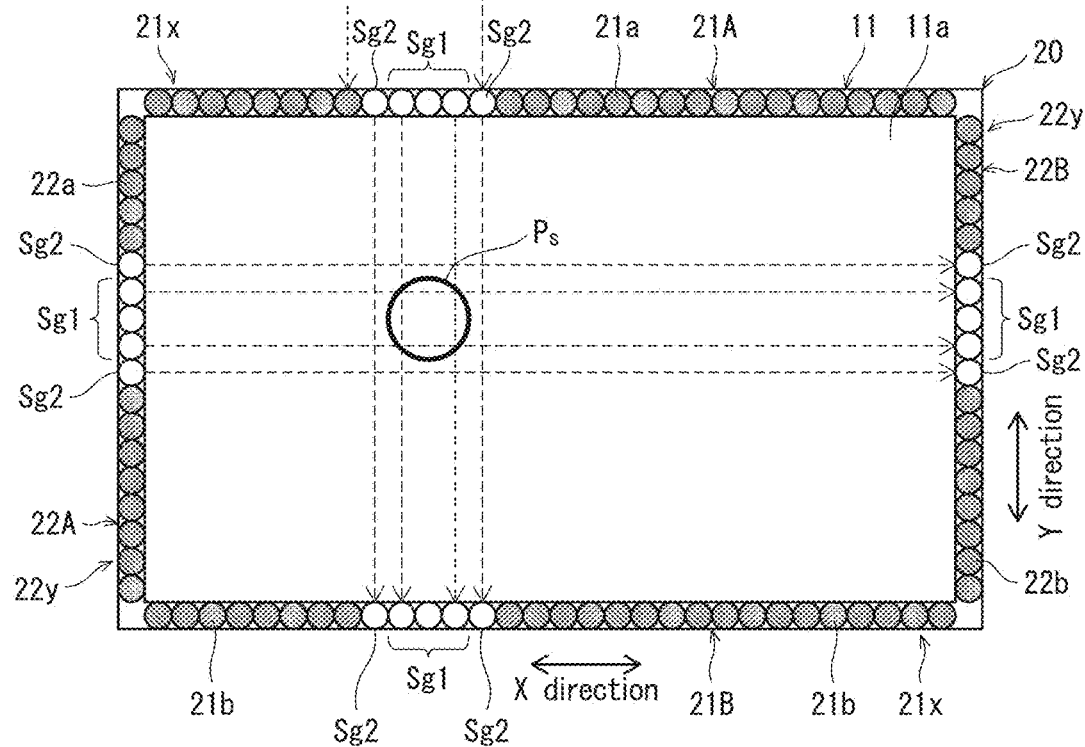

TOUCH PANEL INPUT DEVICE

This application is based on application No. 2014-046682 filed in Japan, the contents of which are hereby incorporated by reference.

BACKGROUND OF THE INVENTION (1) Field of the Invention

The present invention relates to a touch panel input device that is usable in various types of electronic devices, such as an image forming device, a portable information terminal device, or a car-mountable information terminal device.

(2) Description of the Related Art

There are electronic devices that utilize touch panel input devices. Examples of such devices include: image forming devices such as printers and multi-function peripherals (MFPs), portable terminal devices, and car-mountable terminal devices. A typical touch panel input device includes a display panel that displays various types of information, and a touch position detection mechanism that detects a touch position (i.e., a position touched by a user) on a surface of the display panel (referred to in the following as a display surface).

Further, when receiving an instruction from the user, the touch panel input device causes a predetermined image to be displayed on the display surface. The image displayed on the display surface may include images of buttons, icons, or the like for receiving touch operations performed by the user. Such images are referred to in the following as button images. Such button images may be, for example, various buttons displayed in a menu screen or keys of a so-called software keyboard displayed on the display surface.

When a button image is displayed on the display surface and a touch position is detected by the touch position detection mechanism at a position on the display surface at which the button image is displayed, input of information allocated in advance to the button image, which may be an instruction to commence copying for example, is received.

Recently, such touch panel input devices are provided with display panels of relatively large sizes. Providing display panels with large sizes is beneficial for users, due to usability, visual perceptibility, etc., being improved. However, providing display panels with large sizes not only increases power consumption of the display panel, but also increases power consumption of the touch position detection mechanism. Thus, there is a demand for technology reducing overall power consumption of touch panel input devices, even in touch panel input devices having display panels of large sizes.

Japanese Patent Application Publication No. 2012-047980 discloses an image forming device including a touch panel that has a liquid crystal display unit and a light source unit (a backlight) that emits light with respect to the liquid crystal display unit.

Due to the light source unit emitting light with respect to the liquid crystal display unit, images indicating various configuration items, such as paper size, images of keys for selecting the configuration items, etc., are displayed on a display surface.

In the image forming device disclosed by Japanese Patent Application Publication No. 2012-047980, when a touch position detection mechanism has detected selection of a configuration item for only a small number of times, the backlight is controlled to emit light with reduced luminance with respect to displayed images of the configuration item and the key for selecting the configuration item. Thus, the power consumption of the backlight is reduced.

However, unfortunately, the technology disclosed in Japanese Patent Application Publication No. 2012-047980 reduces power consumption of the liquid crystal display unit but does not reduce power consumption of the touch position detection mechanism.

Meanwhile, a touch panel input device including a display panel not having a backlight, which is starting to gain popularity, and a touch position detection mechanism attached to such a display panel further reduces power consumption compared to touch panel input devices including backlights. However, as display panels in such touch panel input devices become greater in size and higher in definition, power consumption of touch position detection mechanisms increases accordingly. This increase in power consumption of touch position detection mechanisms cannot be ignored, and thus, necessitates improvement.

SUMMARY OF THE INVENTION

In view of such problems, the present invention aims to provide a touch panel input device including a display panel that may or may not include a backlight and achieving a reduction in power consumption regardless of whether or not the display panel includes a backlight.

To achieve the above aim, the present invention provides a touch panel input device including: a display panel that has a display surface; a display controller that causes a button image to be displayed on the display surface, the button image used for receiving a touch operation performed by a user of the touch panel input device; a touch position detector that performs touch position detection of detecting a touch position of the display surface by detecting a set of an X coordinate and a Y coordinate on an X-Y rectangular coordinate system defined on the display surface; an area specifier that, when the button image is to be displayed on the display surface, specifies a first area and a second area of the display surface, the first area being an area of the display surface at which the button image is to be displayed, the second area being a remaining area of the display surface; and a detection instructor that refers to a result of the specification by the area specifier and provides an instruction to the touch position detector (i) to perform the touch position detection with respect to an area, on the rectangular coordinate system, corresponding to the first area and (ii) to put in off state the touch position detection with respect to an area, on the rectangular coordinate system, corresponding to at least a part of the second area.

To achieve the above aim, the present invention also provides a touch panel input device including: a display panel that has a display surface; a display controller that causes a predetermined screen to be displayed on the display surface; a touch position detector that performs touch position detection of detecting a touch position of the display surface by detecting a set of an X coordinate and a Y coordinate on an X-Y rectangular coordinate system defined on the display surface; and a detection instructor that, when the touch position detector detects a touch position with a slide operation screen for urging the user to perform a slide operation displayed on the display surface, provides an instruction to the touch position detector (i) to perform the touch position detection with respect to an area, on the rectangular coordinate system, corresponding to a first area of the display surface and (ii) to put in off state the touch position detection with respect to an area, on the rectangular coordinate system, corresponding to a second area of the display surface, the first area being an area of the display surface including the touch position and an area around the touch position, the second area being a remaining area of the display surface.

BRIEF DESCRIPTION OF THE DRAWINGS

These and the other objects, advantages and features of the invention will become apparent from the following description thereof taken in conjunction with the accompanying drawings, which illustrate specific embodiments of the invention. In the drawings:

FIG. 17 is a schematic for explaining a state before user performs slide operation with respect to touch position on single touch screen displayed on display panel, and a state after user has performed slide operation;

DESCRIPTION OF PREFERRED EMBODIMENT

The following describes an embodiment of the present invention.

[MFP]

Figure 1:
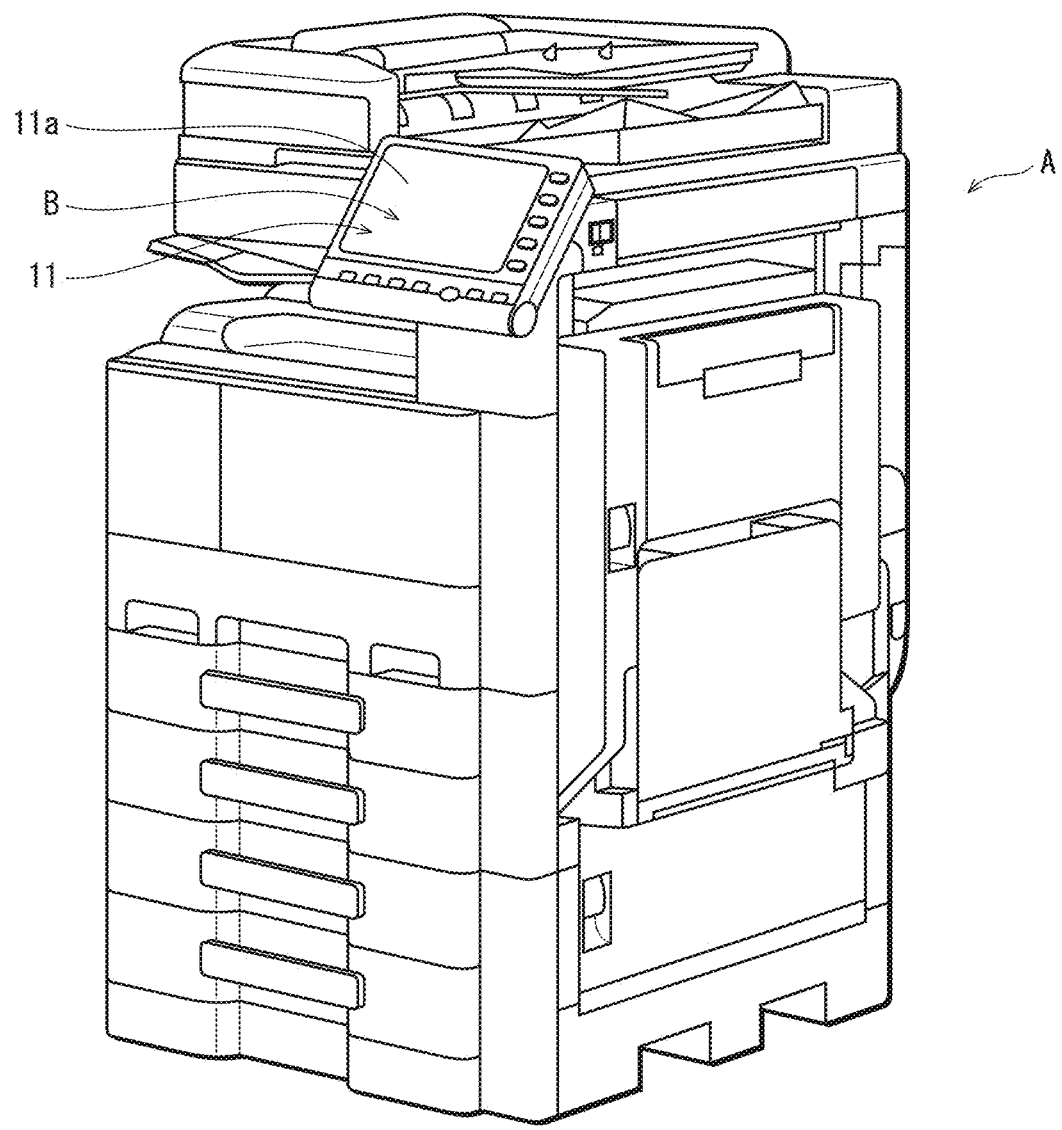
FIG. 1 is a perspective view illustrating the exterior of MFP provided with touch panel input device.

FIG. 1 illustrates the exterior of an MFP, which is one example of an image forming device including a touch panel input device pertaining to an embodiment of the present invention.

The MFP includes an image forming main body A and a touch panel input device B.

The image forming main body A has, for example, an image forming function of forming a toner image on a recording sheet by performing electrophotographic printing and then printing-out the recording sheet having the toner image formed thereon, a scanning function of reading an image on an original sheet, and a transmission function of transmitting data obtained by scanning.

The touch panel input device B has a function of displaying an image for receiving input of various types of information, and a function of, when the user performs a touch operation on a display surface with an image displayed thereon, detecting the touch operation and detecting a touch position.

[Touch Panel Input Device]

Figure 2:
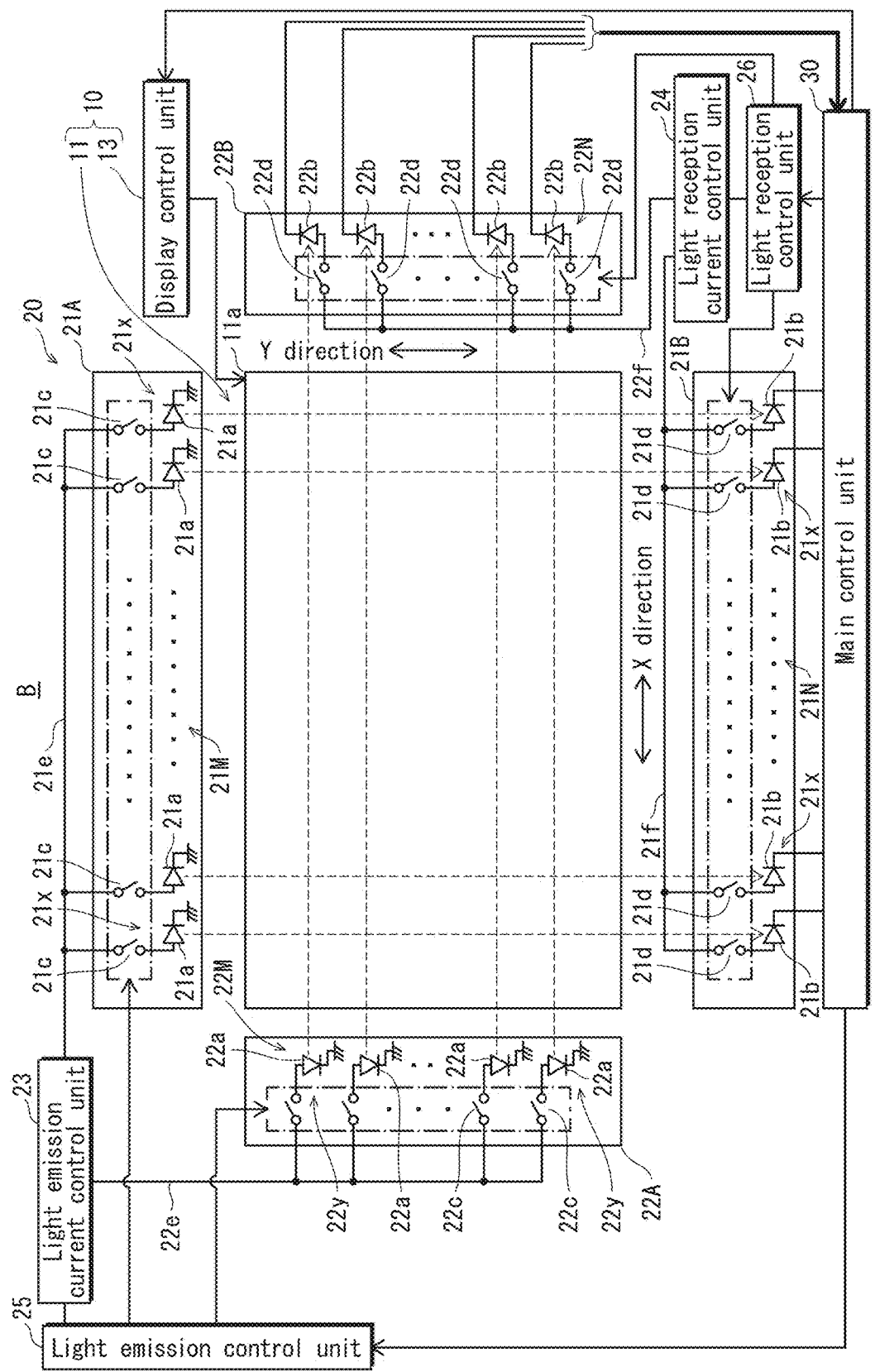
FIG. 2 is a schematic for explaining the structure of touch panel input device.

FIG. 2 is a schematic for explaining the structure of the touch panel input device B pertaining to the present embodiment. The touch panel input device B includes: a display panel 10; a touch position detection mechanism 20; and a main control unit 30 that controls the display panel 10 and the touch position detection mechanism 20.

The display panel 10 includes: a display panel main body 11 that displays various images; and a display control unit 13 that controls the display panel main body 11.

The display panel main body 11 is implemented, for example, by using a liquid crystal display panel. The display panel main body 11 may or may not include a backlight.

The display control unit 13 controls the display panel main body 11 so that various images are displayed on a display surface 11a of the display panel main body 11. In FIG. 1, the display surface 11a is illustrated as a front side surface of the display panel main body 11.

The display surface 11a has a rectangular shape whose horizontal sides are longer than vertical sides, and is capable of receiving touch operations from the user. Note that in the following, the horizontal direction of the display surface 11a is referred to as the X direction, and the vertical direction of the display surface 11a is referred to as the Y direction.

The touch position detection mechanism 20 detects a touch position on the display surface 11a. The touch position is a position on the display surface 11a at which the user has performed a touch operation, by using a finger, an input pen, or the like.

The touch position detection mechanism 20 includes, disposed around the display surface 11a, a first light-emission portion 21A and a first light-reception portion 21B. The first light-emission portion 21A and the first light-reception portion 21B each correspond to one of two sides of the display surface 11a that are opposite one another in the Y direction. The first light-emission portion 21A has a first light-emission element array 21M, which is composed of a plurality of first light-emission elements 21a. The first light-reception portion 21B has a first light-reception element array 21N, which is composed of a plurality of first light-reception elements 21b.

The touch position detection mechanism 20 also includes, disposed around the display surface 11a, a second light-emission portion 22A and a second light-reception portion 22B. The second light-emission portion 22A and the second light-reception portion 22B each correspond to one of two sides of the display surface 11a that are opposite one another in the X direction. The second light-emission portion 22A has a second light-emission element array 22M, which is composed of a plurality of second light-emission elements 22a. The second light-reception portion 22B has a second light-reception element array 22N, which is composed of a plurality of second light-reception elements 22b.

The first light-emission portion 21A, the first light-reception portion 21B, the second light-emission portion 22A, and the second light-reception portion 22B compose a detection optical system that detects a touch position on the display surface 11a.

Each of the first light-emission elements 21a is implemented by using an LED. The first light-emission elements 21a are disposed along the X direction with fixed intervals of, for example, approximately 2 mm to 3 mm therebetween. Further, the first light-emission elements 21a are each disposed to emit light that travels in the Y direction through an area that is, for example, approximately 1 mm to 2 mm above the display surface 11a.

The first light-emission elements 21a are connected to the same first light-emission power supply line 21e. Each first light-emission element 21a is connected to the first light-emission power supply line 21e via a respective first light-emission switch 21c, which is normally in open state. Each first light-emission switch 21c is controlled, by a light-emission control unit 25, to be in either an on (i.e., open) state or an off (i.e., closed) state.

The light-emission control unit 25, according to an instruction from the main control unit 30, puts a selected one of the first light-emission switches 21c into on state at a predetermined timing, while keeping the rest of the first light-emission switches 21c in off state.

The first light-emission power supply line 21e is supplied with current that is controlled by a light-emission current control unit 23. The light-emission current control unit 23 is controlled by the light-emission control unit 25. The light-emission current control unit 23 supplies a predetermined current to the first light-emission power supply line 21e at the timing when one of the first light-emission switches 21c is put in on state.

Thus, a first light-emission element 21a connected to a first light-emission switches 21c put in on state is supplied with the predetermined current. Accordingly, the first light-emission element 21a is put in operation state (driven state) and emits light of an intensity corresponding to the current supplied thereto.

When one of the first light-emission switches 21c is put in on state, the rest of the first light-emission switches 21c are kept in off state. Thus, current from the first light-emission power supply line 21e is not supplied to the first light-emission elements 21a connected to the first light-emission switches 21c that are kept in off state. Accordingly, such light-emission elements 21a are put in non-operation state (non-driven state) and do not emit light.

The switching of the first light-emission switches 21c performed by the light-emission control unit 25 is such that one first light-emission switch 21c is put in on state at a time, in the order in which the first light-emission switches 21c are disposed along the X direction.

Note that when power saving control (described in detail later in the present disclosure) is executed, the switching described above is not performed with respect to all of the first light-emission switches 21c. In specific, when the power saving control is executed, first light-emission switches 21c that are connected to first light-emission elements 21a that have been set to non-operation state (off state) are kept in off state (i.e., not put in on state). Further, note that the switching frequency at which the switching is performed with respect to switching target first light-emission switches 21c (i.e., the switching frequency when putting the switching-target first light-emission switches 21c in on state one by one) may be set, for example, to several milliseconds or several tens of milliseconds. The above-described points similarly apply to the second light-emission portion 22A.

Each of the first light-reception elements 21b in the first light-reception portion 21B, which faces the first light-emission portion 21A, is implemented by using a photodiode. Each of the first light-reception elements 21b is disposed to face a corresponding one of the first light-emission elements 21a, so as to receive light emitted from the corresponding first light-emission element 21a. As such, similar to the first light-emission elements 21a, the first light-reception elements 21b are disposed along the X direction with fixed intervals of, for example, approximately 2 mm to 3 mm therebetween.

The first light-reception elements 21b are connected to the same first light-reception power supply line 21f. Each first light-reception element 21b is connected to the first light-reception power supply line 21f via a respective first light-reception switch 21d. The first light-reception power supply line 21f is supplied with current that is controlled by a light-reception current control unit 24.

The first light-reception switches 21d are each switched on and off by a light-reception control unit 26, in synchronization with the switching on and off of a corresponding first light-emission switch 21a, which is a first light-emission switch 21a connected to a first light-emission element 21a facing the first light-reception element 21b. Accordingly, at the timing when one first light-emission element 21a is put in operation state (light-emission state), a corresponding first light-reception switch 21d, which is connected to a first light-reception element 21b that faces the first light-emission element 21a, is put in on state.

The light-reception control unit 24, based on an instruction provided from the light-reception control unit 26, supplies a predetermined current to the first light-reception power supply line 21f at the timing when one first light-reception switch 21d is put in on state. Accordingly, the predetermined current is supplied to a first light-reception element 21b when a first light-reception switch 21d connected to the first light-reception element 21b is put in on state. As such, each first light-reception element 21b is put in operation state (driven (on) state) at the timing when a first light-reception switch 21d connected thereto is put in on state. A first light-reception element 21b in on state makes a response when receiving light.

When a first light-reception element 21b in operation state receives light emitted from a first light-emission element 21a facing the first light-reception element 21b, the first light-reception element 21b outputs a current corresponding to the intensity of the light received. The output side of each first light-reception element 21b is connected to the main control unit 30.

Note that when light emitted from a first light-emission element 21a facing a first light-reception element 21b in operation state is blocked by a finger or the like touching the display surface 11a, the intensity of light received by the first light-reception element 21b decreases. Accordingly, the current output from the first light-reception element 21b decreases.

When a value of the current output from the first light-reception element 21b in operation state falls below a predetermined current value (referred to in the following as a threshold current), the main control unit 30 determines that the display surface 11a has been touched by the user.

Meanwhile, a first light-reception switch 21d connected to a first light-reception element 21b that faces a first light-emission element 21a that has been set to non-operation state (non-light-emission state) is kept in off state. Accordingly, current from the first light-reception power supply line 21f is not supplied to the first light-reception element 21b. Thus, the first light-reception element 21b is put in non-operation state (off state) and does not make any response to light. A first light-reception element 21b in off state, even when receiving light from a first light-emission element 21a facing the first light-reception element 21b, does not output any current.

When the user performs a touch operation, the main control unit 30 specifies one or more first light-reception elements 21b that detect the touch operation from among ones of the first light-reception elements 21b that are put in operation state one at a time in order. In specific, when a current value output from a first light-reception element 21b in operation state falls below the predetermined threshold current, the main control unit 30 specifies the first light-reception element 21b. Further, the main control unit 30 detects an X coordinate position of the touch position on the display surface 11a based on the X coordinate position of the first light-reception element 21b so specified. Note that for each first light-reception element 21b, an X coordinate position of the first light-reception element 21b with respect to the display surface 11a is stored in advance.

As can be seen from the above, a combination of a first light-emission element 21a and a first light-reception element 21b that face one another at a given one of different X coordinate positions with respect to the display surface 11a forms a first sensor 21x (detector). The first sensors 21x are transmissive optical sensors that each detect a touch position at X component areas on the display surface 11a. That is, a first sensor 21x at a given X coordinate position performs the touch position detection with respect to an entirety of an area of the display surface 11a in the Y direction from the X coordinate position.

The following describes the second light-emission portion 22A and the second light-reception portion 22B.

Similar to the first light-emission elements 21a, each of the second light-emission elements 22a is implemented by using an LED. The second light-emission elements 22a are disposed along the Y direction with fixed intervals of, for example, approximately 2 mm to 3 mm therebetween. The second light-emission portion 22A is similar to the first light-emission portion 21A, differing from the first light-emission portion 21A only in that light emitted from a second light-emission element 22a travels in the X direction through an area that is, for example, approximately 1 mm to 2 mm above the display surface 11a.

In specific, the second light-emission elements 21a are connected to the same second light-emission power supply line 22e. Each second light-emission element 22a is connected to the second light-emission power supply line 22e via a respective second light-emission switch 22c. Each second light-emission switch 22c is controlled, by the light-emission control unit 25, to be in either an on state or an off state. Further, the second light-emission power supply line 22e is supplied with current that is controlled by the light-emission current control unit 23.

In the second light-emission portion 22A having the above-described structure, second light-emission elements 22a that have been set to operation state are controlled to be put in operation state one at a time in the order at which the second light-emission elements 22a are disposed along the Y direction. Other than this, the second light-emission portion 22A is similar to the first light-emission portion 21A. Accordingly, second light-emission elements 22a that have been set to non-operation state are not supplied with any current and are controlled to remain in non-operation state.

Similar to the first light-reception elements 21b, each of the second light-reception elements 22b is implemented by using a photodiode. Each of the second light-reception elements 22b is disposed to face a corresponding one of the second light-emission elements 22a, so as to receive light emitted from the corresponding second light-emission element 22a. The second light-reception portion 22B is similar to the first light-reception portion 21B, differing from the first light-reception portion 21B only in that the second light-reception elements 22b are disposed along the Y direction.

In specific, the second light-reception elements 22b are connected to the same second light-reception power supply line 22f. Each second light-reception element 22b is connected to the second light-reception power supply line 22f via a respective second light-reception switch 22d. Each second light-emission switch 22d is controlled, by the light-reception control unit 26, to be in either an on state or an off state. Further, the second light-reception power supply line 22f is supplied with current that is controlled by the light-reception current control unit 24.

Similar to the first light-receiving portion 21B, in the second light-reception portion 22B having the above-described structure, each second light-reception element 22b is put in operation state at the timing when a second light-emission element 22a facing the second light-reception element 22b is put in operation state.

A second light-reception element 22b put in operation state outputs a current corresponding to the amount of light received to the main control unit 30. Further, when not supplied with current, a second light-reception element 22b is put in non-operation state and does not output any current even when receiving light.

Note that when light emitted from a second light-emission element 22a facing a second light-reception element 22b in operation state is blocked by a finger or the like touching the display surface 22a, the intensity of light received by the second light-reception element 22b decreases. Accordingly, the current output from the second light-reception element 22b decreases.

Meanwhile, a second light-reception switch 22d connected to a second light-reception element 22b that faces a second light-emission element 22a that has been set to non-operation state (non-light-emission state) is kept in off state. Accordingly, current from the second light-reception power supply line 22f is not supplied to the second light-reception element 22b. Thus, the second light-reception element 22b is put in the non-operation state (off state) and does not make any response to light.

When the user performs a touch operation, from among ones of the second light-reception elements 22b that are put in operation state one at a time, the main control unit 30 specifies one or more second light-reception elements 22b that detect the touch operation. In specific, when a current value output from a second light-reception element 22b in operation state falls below the predetermined threshold current, the main control unit 30 specifies the second light-reception element 22b. Further, the main control unit 30 detects a Y coordinate of the touch position on the display surface 11a based on the Y coordinate position of the second light-reception element 22b so specified. Note that for each second light-reception element 22b, a Y coordinate position of the second light-reception element 22b with respect to the display surface 11a is stored in advance.

Through the detection of X and Y coordinates of a touch position being performed as described above, a touch position is detected as a set of an X coordinate and a Y coordinate on an X-Y rectangular coordinate system defined on the display surface 11a.

As can be seen from the above, a combination of a second light-emission element 22a and a second light-reception element 22b that face one another at a given one of different Y coordinate positions with respect to the display surface 11a forms a second sensor 22y (detector). The second sensors 22y are transmissive optical sensors that each detect a touch position at Y coordinate areas on the display surface 11a. That is, a second sensor 22y at a given Y coordinate position performs the touch position detection within respect to an entirety of an area of the display surface 11a in the X direction from the Y coordinate position.

The main control unit 30 provides an instruction to the display control unit 13 to display an input operation screen for receiving input of predetermined information on the display surface 11a.

Further, when a touch position is detected by the touch position detection mechanism 20 with the input operation screen displayed on the display surface 11a, the main control unit 30 receives input of predetermined information based on the touch position so detected.

[Input Operation Screen]

The following describes the input operation screen. The input operation screen may be a touch operation screen or a slide operation screen.

Figure 3:
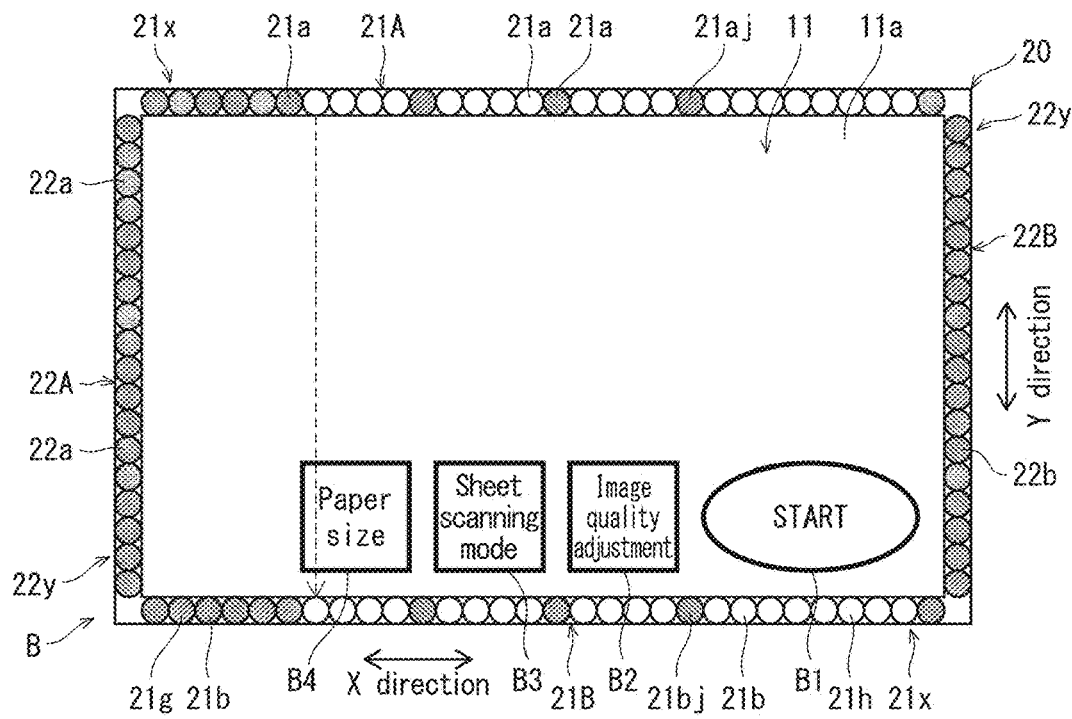
FIG. 3 is a diagram illustrating an example of touch operation screen displayed on display surface of display panel of touch panel input device.

FIG. 3 illustrates one example of a touch operation screen. The touch operation screen illustrated in FIG. 3 includes button images B1 through B4, which are examples of one or more button images via which input of predetermined information is received when a touch operation is performed thereto by the user touching the display surface 11a. Note that in the present disclosure, a button image refers to an image that has the shape of a button, a key, or the like and that urges the user to perform a touch operation or to input a character by performing a touch operation.

When a touch operation screen is displayed on the display surface 11a, the display surface 11a is divided into one or more areas at each of which a button image is displayed (first areas) and a remaining area where one or more background images or one or more display images other than button images are displayed (second area). Note that in the following, a background image refers to an image that is not a button image. Further, the term "button image area" is used to refer to each first area, and the term "background image area" is used to refer to the second area.

When a touch operation screen is displayed on the display surface 11a, the touch position detection mechanism 20 detects a touch position (a set of X and Y coordinates) on the display surface 11a as described above, and the main control unit 30 specifies, based on the touch position, a button image area with respect to which a touch operation has been performed, i.e., a button having been selected by the user.

Further, the main control unit 30 receives input of predetermined information (may be input of characters) allocated in advance to the button image displayed at the button image area, and provides an instruction to the image forming main body A to execute processing related to the information so received.

Meanwhile, when a slide operation screen is displayed on the display surface 11a, input of predetermined information is received when the user slides a touch position on the display surface 11a. The slide operation screen may be a single touch screen or a double touch screen.

When a single touch screen (refer to FIG. 17) is displayed, input of predetermined information is received when, for example, the user slides one finger that he/she has touched the display surface 11a with in one direction, as in a flick operation.

Meanwhile, when a double touch screen (refer to FIG. 18) is displayed, input of predetermined information is received when, for example, the user slides two fingers that he/she has touched the display surface 11a with in opposite directions, as in a pinch-in operation or in a pinch-out operation.

Returning to FIG. 2, a storage unit (undepicted) of the main control unit 30 stores image data corresponding to each of a plurality of touch operation screens and a plurality of slide operation screens. The main control unit 30 provides an instruction to the display control unit 13 to display one screen selected from among such touch operation screens and slide operation screens.

The display control unit 13, when receiving an instruction from the main control unit 30, displays on the display surface 11a a touch operation screen or a slide operation screen (may be a single touch screen or a double touch screen), as the input operation screen. Further, when a touch operation is performed with respect to the input operation screen displayed on the display surface 11a and input of predetermined information is received accordingly, a different input operation screen is displayed on the display surface 11a when necessary.

<Touch Operation Screen>

The following describes in detail a touch operation screen displayed on the display surface 11a, with reference to FIG. 3.

The touch operation screen illustrated in FIG. 3 includes a plurality of button images that are displayed on the display surface 11a. In specific, the touch operation screen illustrated in FIG. 3 includes four button images, namely button images B1 through B4. In this example, areas of the display surface 11a at which the button images B1 through B4 are displayed are button image areas.

The button images B1 through B4 are displayed to form a single line along the X direction with spaces therebetween. Further, the button images B1 through B4 are displayed at a lower side of the display surface 11a in a vertical direction (Y direction). The button image B1, which is displayed farthest to the right, has an oval shape, and for example, is an image of a start button receiving an instruction for commencing an operation (e.g., a copy operation) in various operation modes of the image forming main body A.

The button images B2, B3, and B4, which are displayed in line in the stated order to the left of the button image B1, have the same size and have rectangular shapes.

The button image B2 is an image of a selection key receiving selection of an image quality to be applied in image forming. The button image B3 is an image of a selection key receiving selection of a sheet scanning mode (scanning only one side of an original sheet, scanning both sides of an original sheet, etc.,) to be applied in scanning The button image B4 is an image of a selection key receiving selection of paper size to be used in image forming. These adjacent button images are arranged at the same interval in the X direction.

When a touch operation is performed with respect to one of the button image areas on the display surface 11a, at which the button images B1 through B4 are displayed, the main control unit 30 receives an instruction corresponding to the button image, regarding that an instruction has been received to execute information (for example, commencement of operation or the like) allocated in advance to the button image.

On the display surface 11a, the area other than the areas at which the button images B1 through B4 are displayed corresponds to the background image area. In specific, here, the background image area includes a portion between the right side of the display surface 11a and the button image B1, a portion between the left side of the display surface 11a and the button image B4, portions between adjacent ones of the button images, and a portion between the upper side of the display surface 11a and the area at which the button images B1 through B4 form a line in the X direction.

In FIG. 3, the first sensors 21x (each being a combination of one first light-emission element 21a and one first light-reception element 21b) and the second sensors 22y (each being a combination of one second light-emission element 22a and one second light-reception element 22b) of the touch position detection mechanism 20 are illustrated schematically.

Further, in FIG. 3, to facilitate explanation, the first light-emission elements 21a, the second light-emission elements 22a, and the button images B1 through B4 are illustrated in sizes differing from their actual sizes. Note that practically, each of the areas of the display surface 11a where the button images B1 through B4 are illustrated has, in each of the X direction and the Y direction, a size such that light emitted from a plurality (practically five or more) of adjacent light-emission elements (the first light-emission elements 21a or second light-emission elements 22a) passes over the area.

Further, in FIG. 3, portions of the background image area between adjacent button images each have an X direction size such that light emitted from one first light-emission element 21a passes over the portion. However, practically, such portions each have an X direction size such that light emitted from about two or three first light-emission elements 21a passes over the portion.

Further, in FIG. 3, the path of light emitted from a first light-emission element 21a put in the operation state and arriving at a corresponding first light-reception element 21b is illustrated schematically by using a broken line arrow. In the subsequent drawings, light emitted from light-emission elements may be illustrated in a similar manner, i.e., by using broken line arrows.

Note that in a touch operation screen, a plurality of button images need not form a single line in the X direction. That is, for example, a plurality of button images may form a single line in the Y direction, as illustrated in FIG. 4.

Figure 4:
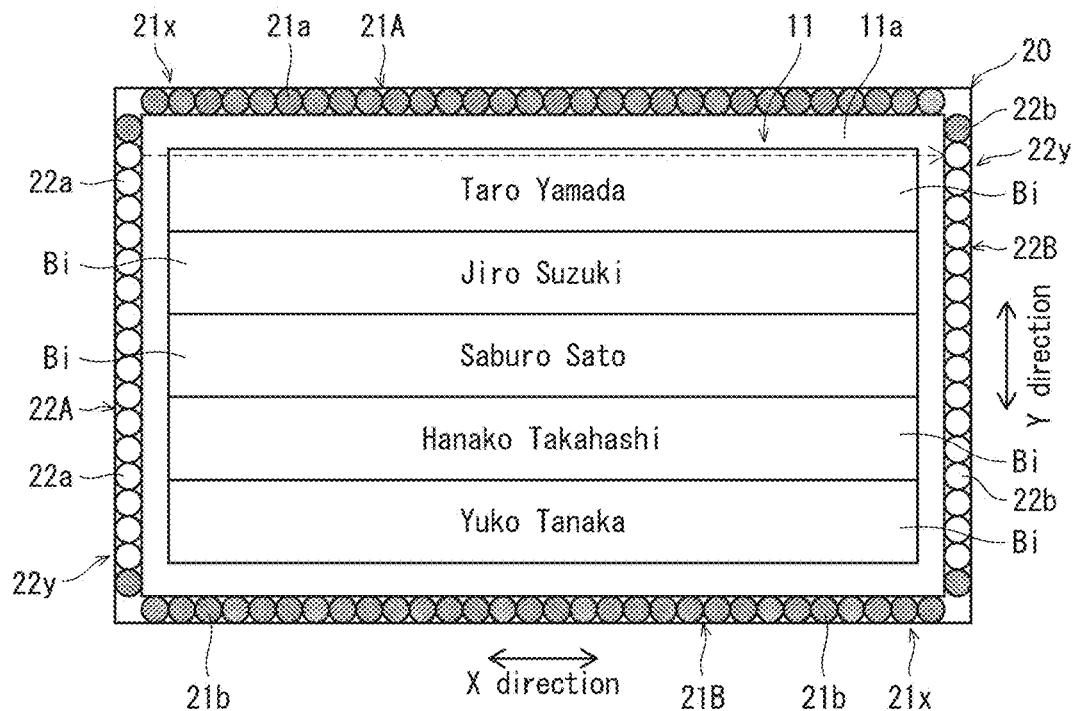
FIG. 4 is a diagram illustrating an example of different touch operation screen displayed on display surface of display panel of touch panel input device.

FIG. 4 illustrates a touch operation screen including a plurality of button images Bi.

Each button image Bi displays a name of a transmission destination when the image forming main body A performs data transmission by using a transmission function thereof. Here, each of the areas of the display surface 11a at which the button images Bi are displayed is a button image area.

This touch operation screen illustrated in FIG. 4 is displayed as an image for making settings in further detail or a pop-up image on the display surface 11a when a data transmission mode is selected as the operation mode of the image forming main body A.

The button images B1 have the same rectangular shape whose horizontal sides are longer than vertical sides, and extend along the X direction of the display surface 11a. Further, the button images Bi are displayed to form a single line in the Y direction, with adjacent ones thereof in contact with one another.

In the touch operation screen illustrated in FIG. 4, the background image area includes portions between the left and right sides of the display surface 11a and the group of button images Bi. These portions cover the entirety of the display surface 11a in the Y direction, while being relatively short in the X direction.

Further, in the touch operation screen illustrated in FIG. 4, the background image area includes a portion between the top side of the display surface 11a and the button image Bi displayed uppermost in the Y direction (vertical direction), and a portion between the bottom side of the display surface 11a and the button image Bi displayed lowermost in the Y direction (vertical direction). These portions cover the entirety of the display surface 11a in the X direction, while being relatively short in the Y direction.

Similar to FIG. 3, in FIG. 4, the first sensors 21x (each being a combination of one first light-emission element 21a and one first light-reception element 21b) and the second sensors 22y (each being a combination of one second light-emission element 22a and one second light-reception element 22b) of the touch position detection mechanism 20 are illustrated schematically.

Further, when a touch operation is performed with respect to a button image area at which a given one of the button images Bi, the main control unit 30 receives an instruction corresponding to the button image Bi, regarding that an instruction has been provided to transmit data to the address allocated to the button image Bi.

<Slide Operation Screen>

In contrast to a touch operation screen, in the present embodiment, a slide operation screen, when displayed, allows the user to either move a part of an image displayed on the display surface 11a, enlarge a part of an image displayed on the display surface 11a, or reduce the size of a part of an image displayed on the display surface 11a.

[Power Saving Control]

The main control unit 30, when provided with an instruction to display the input operation screen on the display surface 11a, executes power saving control to reduce the power consumed by the touch position detection mechanism 20 when performing the touch position detection. In specific, the power saving control includes touch operation power saving processing and slide operation power saving processing. The main control unit 30 executes the touch operation power saving processing when provided with an instruction to display a touch operation screen on the display surface 11a, and executes the slide operation power saving processing when provided with an instruction to display a slide operation screen on the display surface 11a.

In the touch operation power saving processing, the main control unit 30 executes processing in a standard power saving mode, which reduces power consumption of the touch position detection mechanism 20. Further, when a power saving priority mode has been selected by the user, the main control unit 30 executes processing in the power saving priority mode, which prioritizes the reduction of power consumption of the touch position detection mechanism 20. The user may select the power saving priority mode in the process of initially configuring the MFP, or at any point during the use of the MFP.

The slide operation power saving processing reduces power consumed by the touch position detection mechanism 20 when performing the touch position detection and when performing detection of a slide of a touch position on a single touch screen or a double touch screen.

Figure 5:
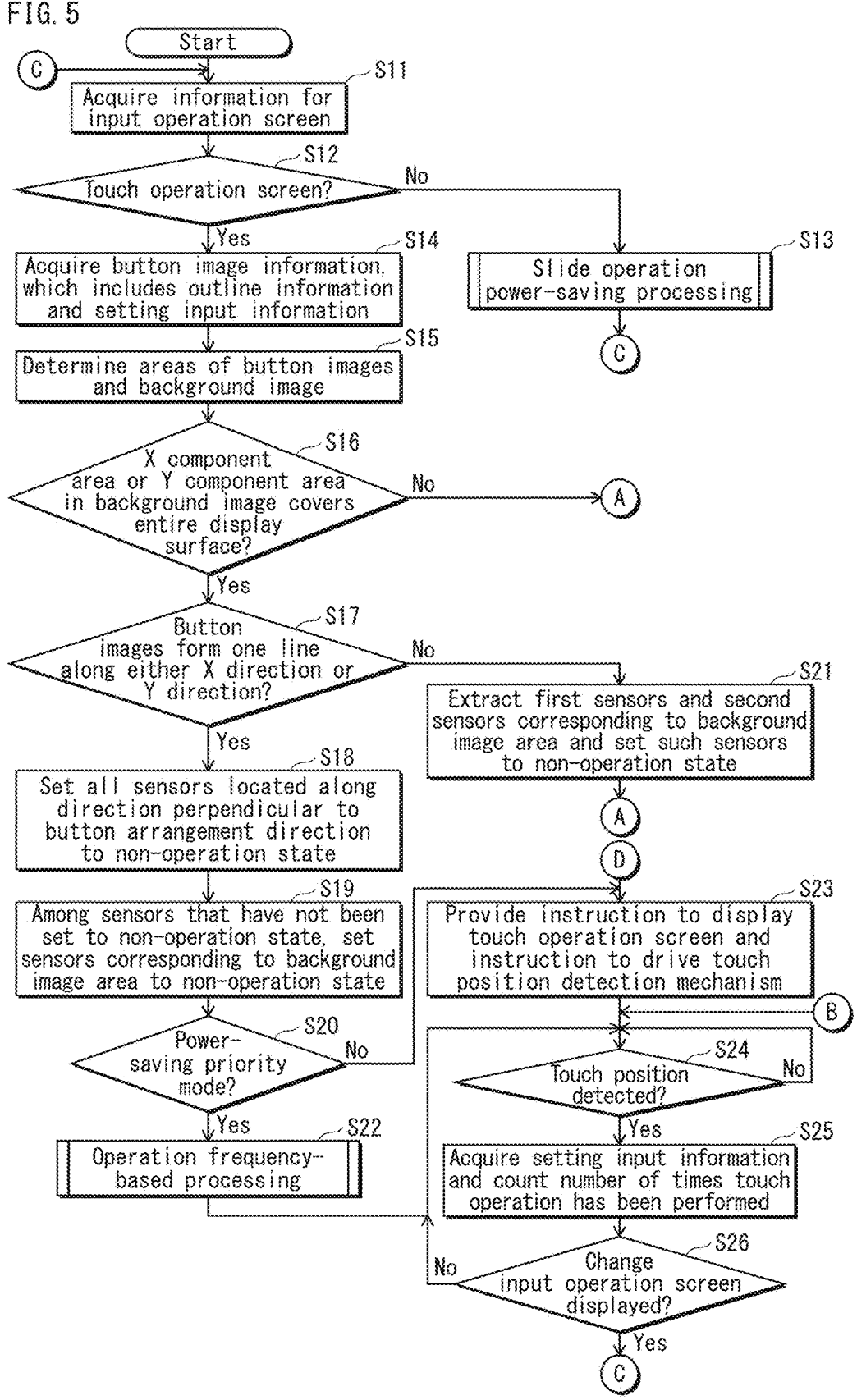
FIG. 5 is a flowchart illustrating procedures of power saving control executed in touch panel input device.
Figure 6:
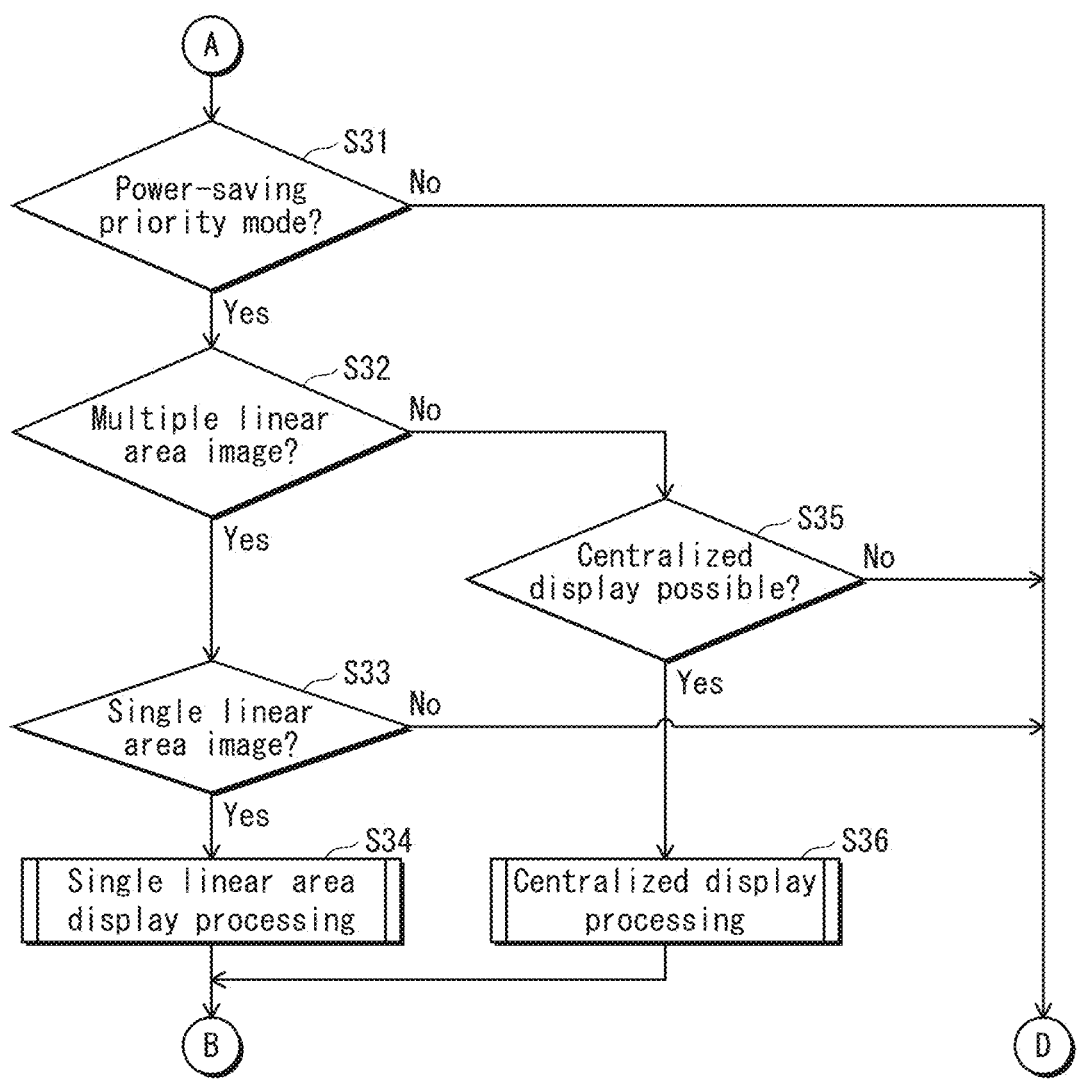
FIG. 6 is a flowchart that is a continuation of the flowchart in FIG. 5, and illustrates procedures of power saving control.

The following describes in detail the power saving control executed by the main control unit 30, with reference to the flowcharts in FIGS. 5 and 6.

The main control unit 30 commences the power saving control when the power of the MFP is turned on, for example. Before issuing an instruction to display the input operation screen on the display surface 11a, the main control unit 30 acquires information regarding the input operation screen, which is appended to image data of the input operation screen (Step S11).

This information includes information indicating a screen type of the input operation screen, i.e., information indicating whether the input operation screen is a touch operation screen or a slide operation screen.

Subsequently, the main control unit 30 determines whether the input operation screen to be displayed is a touch operation screen or a slide operation screen (Step S 12). The main control unit 30 makes this determination by referring to the above-described information indicating the screen type of the input operation screen.

When determining that the input operation screen is a slide operation screen (No in Step S 12), processing proceeds to Step S13, where the slide operation power saving processing is executed. Details of the slide operation power saving processing executed in Step S13 is described later in the present disclosure.

Meanwhile, when determining that the input operation screen is a touch operation screen (Yes in Step S 12), the main control unit 30 executes the touch operation power saving mode, which begins in Step S14.

<Touch Operation Power Saving Processing>

The touch operation power saving processing includes processing for the standard power saving mode (Steps S14 through S19, and Step S21) and processing for the power saving priority mode (Steps S22, S23, and S36). The following first describes processing for the standard power saving mode first and then describes processing for the power saving priority mode.

<Standard Power Saving Mode>

In Step S14, the main control unit 30 acquires information (referred to in the following as button image information) related to one or more button images included in the touch operation screen with respect to which a display instruction has been issued (referred to in the following as a display target touch operation screen). The button image information includes sets of X and Y coordinates indicating outlines of the button images to be displayed on the display surface 11a, and setting input information that is set for each button image.

For example, setting input information allocated in advance to a given button image may indicate a function that has been allocated in advance to the button, i.e., a function that is to be executed when a touch operation is performed with respect to the button. For example, setting input information for a given button image may indicate commencement of copying.

The main control unit 30 acquires, for each button image included in the display target touch operation screen, coordinates indicating the outline of the button image. The coordinates are acquired from the image data of the display target touch operation screen. This acquisition is executed by an outline coordinate acquisition unit (undepicted) that is included in the main control unit 30.

For example, the outline coordinate acquisition unit may acquire outline coordinates for a given button image by referring to the image data of the touch operation screen, and extracting an X coordinate and a Y coordinate position of each pixel composing each line of an outline of the button image. Note that the acquisition of outline coordinates may be performed in other ways. For example, a modification may be made such that for each button image in a display target touch operation screen, a table having outline coordinates of the button image written therein is prepared in advance, and the outline coordinates are acquired from such tables. When making such a modification, such tables may be stored in advance to the storage unit of the main control unit 30.

When the main control unit 30 acquires the button image information in Step S14, processing proceeds to Step S15.

In Step S15, the main control unit 30 performs area specification processing of specifying button image areas and a background image area on the display surface 11a, based on the outline coordinates of the button images already having been acquired.

In the area specification processing, the main control unit 30 specifies, for each button image included in the display target touch operation screen, a closed area indicated by the outline of the button image as a button image area. Further, the main control unit 30 specifies the background image area by specifying areas on the display surface 11a other than the button image areas as portions of the background image area. In this sense, the main control unit 30, when executing the processing in Step S15, functions as an area specifier that specifies one or more button image areas and a background image area.

Subsequently, the main control unit 30 determines whether or not an X component area or a Y component area in the background image area covers an entirety of the display surface 11a (Step S16).

In specific, the main control unit 30 determines, for each light-reception element 21b disposed in line along the X direction, whether an entirety of a range of Y coordinates corresponding to the X coordinate position of the light-reception element 21b belongs to the background image area, or a part of the range of Y coordinates belongs to button image areas.

When taking the light-reception element 21g illustrated in FIG. 3 for example, button image areas do not exist at any position in the Y direction from the X coordinate position of the light-reception element 21g. Thus, the main control unit 30 determines that the entirety of the range of Y coordinates corresponding to the X coordinate position belongs to the background image area. Meanwhile, when taking the light-reception element 21h illustrated in FIG. 3 for example, the button image area of the button image B1 exists at some positions in the Y direction from the X coordinate position of the light-reception element 21h. Thus, the main control unit 30 determines that a part of the range of Y coordinates corresponding to the X coordinate position of the light-reception element 21h belongs to button image areas.

The main control unit 30 performs this determination in a similar manner in the Y direction. In specific, the main control unit 30 determines, for each light-reception element 22b disposed in line along the Y direction, whether an entirety of a range of X coordinates corresponding to the Y coordinate position of the light-reception element 21b belongs to the background image area, or a part of the range of X coordinates belongs to button image areas.

When there is at least one X coordinate position whose corresponding Y coordinate range belongs entirely to the background image area or when there is at least one Y coordinate position whose corresponding X coordinate range belongs entirely to the background image area, the main control unit 30 determines that an X component area or a Y component area in the background image area covers an entirety of the display surface 11a. On the other hand, when there is no X coordinate position whose corresponding Y coordinate range belongs entirely to the background image area or when there is no Y coordinate position whose corresponding X coordinate range belongs entirely to the background image area, the main control unit 30 determines that an X component area or a Y component area in the background image area does not cover an entirety of the display surface 11a. In the examples illustrated in FIGS. 3 and 4, the main control unit 30 determines that an X component area or a Y component area in the background image area covers an entirety of the display surface 11a.

When the main control unit 30 determines that an X component area or a Y component area in the background image area covers an entirety of the display surface 11a in the Y direction or the X direction (Yes in Step S16), processing proceeds to Step S17.

In Step S17, when the display target touch operation screen includes a plurality of button images, the main control unit 30 determines whether or not the button images form a single line along one direction (X direction or Y direction), based on the button image information. Note that in the following, the direction along which button images form one or more lines is referred to as a button arrangement direction. The main control unit 30 determines that button images form a single line in the examples illustrated in FIGS. 3 and 4. In this sense, the main control unit 30, when executing the processing in Step S17, functions as an arrangement determiner unit that determines whether or not button images, when displayed, form a single line.

In the example illustrated in FIG. 3, where the button images B1 through B4 form a single line along the X direction, the button images B1 through B4 are displayed at display positions indicated by different X coordinates but indicated by the same Y coordinates. In this example, when a touch operation is performed with respect to one of the button images B1 through B4, the determination of which of the button images B1 through B4 has been touched can be made by detecting only an X coordinate of the touch position while not detecting a Y coordinate of the touch position.

Meanwhile, in the example illustrated in FIG. 4, multiple button images form a single line along the Y direction. In this example, the button images are displayed at display positions indicated by different Y coordinates but indicated by the same X coordinates. Thus, the display positions of the button images are indicated by using the same X coordinates but by using different Y coordinates. Accordingly, when a touch operation is performed with respect to one of the button images, the determination of which of the button images has been touched can be made by detecting only a Y coordinate of the touch position while not detecting an X coordinate of the touch position. That is, when a plurality of button images form a single line in the display target touch operation screen, a touch operation performed with respect to one of the button images can be detected by detecting a coordinate of the touch position in one direction (X direction or Y direction) but not detecting a coordinate of the touch position in the other direction (X direction or Y direction), regardless of the distinction between a button image area and the background image area.

When determining that a plurality of button images form a single line in the display target touch operation screen (Yes in Step S 17), the main control unit 30 sets all of the sensors that are disposed in a direction perpendicular to the button arrangement direction to non-operation state (Step S18), regardless of the result of the specification of areas in Step S15.

In specific, in the example illustrated in FIG. 3, all of the second sensors 22y are set to non-operation state, whereas in the example illustrated in FIG. 4, all of the first sensors 21x are set to non-operation state. In FIGS. 3 and 4, sensors having been set to non-operation state are indicated by using filled circles.

As already described above, each of the first sensors 21x performs the touch operation detection with respect to all Y coordinates located in the Y direction from the X coordinate position at which the first sensor 21x is located. Due to this, when the background image area includes a portion extending across the entirety the display surface 11a in the Y direction, a first sensor 21x corresponding to an X component area of the portion of the background image area is extracted and set to non-operation state.

Similarly, each of the second sensors 22y the touch operation detection with respect to all X coordinates located in the X direction from the Y coordinate position at which the second sensor 22y is located. Due to this, when the background image area includes a portion extending across the entirety the display surface 11a in the X direction, a second sensor 22y corresponding to an Y component area of the portion of the background image area is extracted and set to non-operation state.

Subsequently, the main control unit 30 sets, to non-operation state, sensors corresponding to the background image area, among sensors other than those having been set to non-operation state in Step S18 (Step S 19). In Step S19, among the plurality of sensors disposed along the button arrangement direction, sensors corresponding to the background image area are set to non-operation state.

In the example illustrated in FIG. 3, among the plurality of first sensors 21x, the first sensors 21x corresponding to the background image area (i.e., the sensors indicated by filled circles) are set to non-operation state. In the example illustrated in FIG. 4, among the plurality of second sensors 22y, the second sensors 22y corresponding to the background image area (i.e., the sensors indicated by filled circles) are set to non-operation state. Note that sensors that are not set to non-operation state are set to operation state. Note that in FIGS. 3 and 4, the sensors that are set to operation state are indicated by using unfilled circles.

Subsequently, the main control unit 30 determines whether or not the power saving priority mode has been selected (Step S20). When the main control unit 30 determines that the power saving priority mode has not been selected (No in Step S20), processing proceeds to Step S23.

When determining in Step 17 that a plurality of button images do not form a single line (No in Step S17), the main control unit 30 extracts sensors corresponding to the background image area from among the plurality of first sensors 21x and the plurality of second sensors 22y, and sets only such sensors to non-operation state (Step S21). Subsequently, processing proceeds to Step S31 in FIG. 6.

Figure 7:
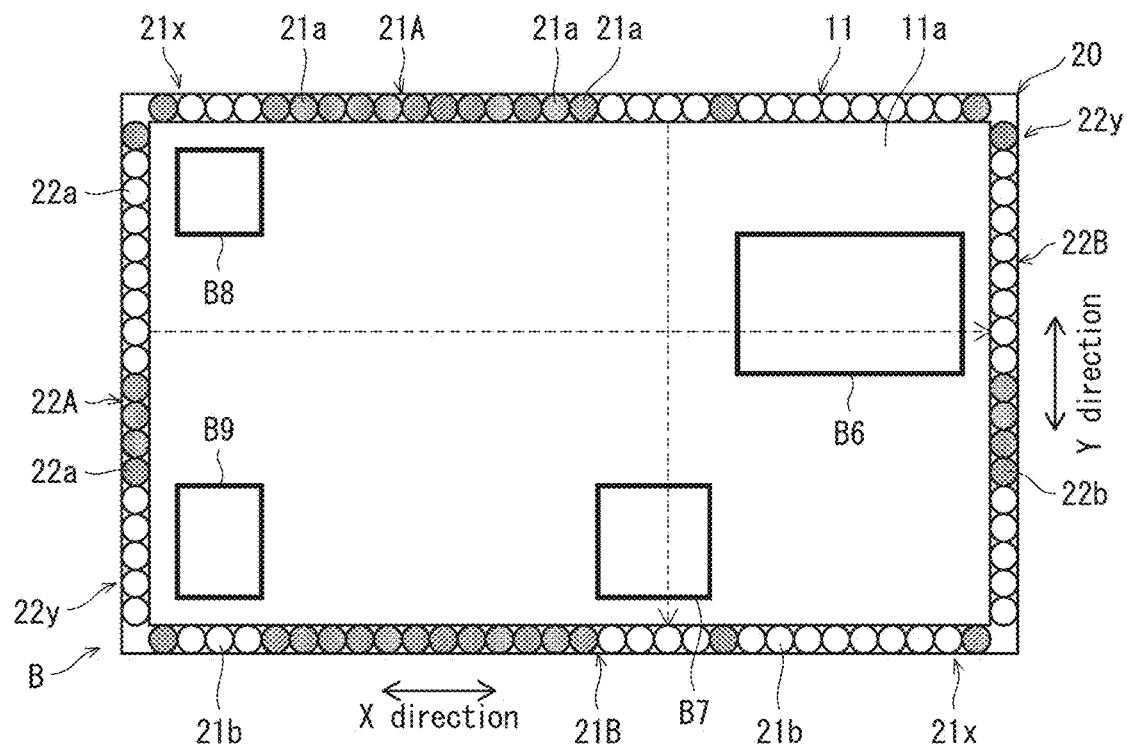
FIG. 7 is a diagram illustrating an example of different touch operation screen displayed on display surface of display panel of touch panel input device.

FIG. 7 illustrates one example of a touch operation screen in which a plurality of button images do not form a single line. The touch operation screen in FIG. 7 includes four button images, namely button images B6 through B9. The button image B8 and B9 are located at the same position in the X direction (i.e., are indicated by the same coordinates in the X direction). The button images B7 and B9 are located at the same position in the Y direction (i.e., are indicated by the same coordinates in the Y direction). As such, when a touch operation is performed with respect to one of the buttons B6 through B9, the determination of which of the button images B6 through B9 has been touched cannot be made when detecting only one of an X coordinate or Y coordinate of the touch position.

As such, when the display target touch operation screen is that illustrated in FIG. 7, setting all of the first sensors 21x or all of the second sensors 22y to non-operation state is undesirable, and thus, only sensors corresponding to the background image area (indicated by filled circles in FIG. 7) are extracted and set to non-operation state. The rest of the sensors, which are not set to non-operation state, are set to operation state.

Subsequently, the main control unit 30 determines, in Step S31 in FIG. 6, whether or not the power saving priority mode has been selected by the user. When the main control unit 30 determines that the power saving priority mode has not been selected (No in Step S31), processing proceeds to Step S23 in FIG. 5.

When the main control unit 30 determines that an X component area or a Y component area in the background image area does not cover the entirety of the display surface 11a (No in Step S16), processing proceeds to Step S31 in FIG. 6.

An X component area or a Y component area in the background image area does not cover the entirety of the display surface 11a when there is no X coordinate position (i.e., no first sensor 21x) at which the entirety of the corresponding Y coordinate range belongs to the background image area and there is no Y coordinate position (i.e., no second sensor 22y) at which the entirety of the corresponding X coordinate range belongs to the background image area. In such a case, none of the sensors can be set to non-operation state, and thus, all of the first sensors 21x and all of the second sensors 22y are set to operation state.

Subsequently, when the main control unit 30 determines, in Step S31, that the power saving priority mode has not been selected by the user (No in Step S31), processing proceeds to Step S23 in FIG. 5.

In Step S23, the main control unit 30 provides an instruction to the display control unit 13 to display the display target touch operation screen on the display surface 11a, and provides an instruction to the touch position detection mechanism 20 to commence driving.

Accordingly, the display target touch operation screen is displayed on the display surface 11a. Further, the touch position detection mechanism 20 operates such that, among the first sensors 21x and the second sensors 22y, sensors that have been set to operation state are switched to operation state one at a time, and sensors that have been set to non-operation state are kept in non-operation state. In this sense, the main control unit 30, when executing the processing in Step S23, functions as a display controller that provides an instruction to the display panel 10 to display an image, and a detection instructor that provides an instruction to the touch position detection mechanism 20 to put the touch position detection in on state with respect to the button image areas and to put the touch position detection in off state with respect to at least a part of the background image area.

Note that when first sensors 21x have been set to non-operation state, the touch position detection mechanism 20 keeps all combinations of a first light-emission switch 21c and a first light-reception switch 21d corresponding to such first sensors 21x in off state. Similarly, when second sensors 22y have been set to non-operation state, the touch position detection mechanism 20 keeps all combinations of a second light-emission switch 22c and a second light-reception switch 22d corresponding to such second sensors 22y in off state.

Meanwhile, when first sensors 21x have been set to operation state, the touch position detection mechanism 20 switches, from off state to on state, the combinations of a first light-emission switch 21c and a first light-reception switch 21d corresponding to such first sensors 21x, one at a time. Similarly, when second sensors 22y have been set to operation state, the touch position detection mechanism 20 switches, from off state to on state, the combinations of a second light-emission switch 22c and a second light-reception switch 22d corresponding to such second sensors 22y, one at a time.

In specific, when first sensors 21x have been set to operation state, the light-emission control unit 25 puts the first light-emission switches 21c connected to the first light-emission elements 21a of such first sensors 21x in on state for a predetermined time period, one at a time in the order in which the first light-emission switches 21c are disposed in the X direction. Meanwhile, the first light-emission switches 21c other than the one that is currently put in on state are kept in off state.

Further, each time one of the first light-emission switches 21c is put in the on state as described above, the light-emission current control unit 23 supplies a current of a predetermined reference value to the first light-emission power supply line 21e. Note that in the following, the predetermined power supplied to the first light-emission power supply line 21e at such a timing is referred to as a standard power.

Accordingly, the standard power is supplied to a first light-emission element 21a that is connected to a first light-emission switch 21c that is put in on state. A light-emission element 21a that is supplied with the standard power emits light with a predetermined intensity in the Y direction for a predetermined amount of time. Note that the intensity of light emitted by a light-emission element $21a$ supplied with the standard power is referred to in the following as a standard intensity.

When a first light-emission switch $21c$ is put in on state, the light-reception control unit 26 puts in on state a first light-reception switch $21d$ of the same first sensor $21x$ corresponding to the first light-emission switch $21c$, at the same timing as the first light-emission switch $21c$ is put in on state. Thus, the first light-emission switch $21c$ and the first light-reception switch $21d$ are controlled in synchronization. Accordingly, the light-reception switches $21d$ are also put in on state for a predetermined time period, one at a time in the order in which the light-reception switches $21d$ are disposed in the X direction. Meanwhile, the first light-reception switches $21d$ other than the one that is currently put in on state are kept in off state, similar to the first light-emission switches $21c$.

When one first light-reception switch $21d$ is put in on state, a first light-reception element $21b$ that is connected to the first light-reception switch $21d$ is put in operation state for a predetermined amount of time by receiving power supplied from the first light-reception power supply line $21f$, and outputs a current corresponding to the intensity of received light.

Similarly, when some second sensors $22y$ have been set to operation state, the light-emission control unit 25 puts the second light-emission switches $22c$ connected to the second light-emission elements $22a$ of such second sensors $22y$ in on state for a predetermined time period, one at a time in the order in which the second light-emission switches $22c$ are disposed in the Y direction. When a second light-emission switch $22c$ is put in on state, the light-reception control unit 26 puts in on state a second light-reception switch $22d$ of the same second sensor $22y$ corresponding to the second light-emission switch $22c$, at the same timing as the second light-emission switch $22c$ is put in on state. Thus, the second light-emission switch $22c$ and the second light-reception switch $22d$ are controlled in synchronization.

Thus, the second sensors $22y$ are controlled in a similar manner as the first sensors $21x$. Further, the standard power and standard intensity described above similarly apply to the second sensors $22y$.

Accordingly, the touch operation detection is not performed (is put in off state) at portions of the background image area corresponding to first sensors $21x$ and second sensors $22y$ that have been set to non-operation state.

As such, compared to a structure where, regardless of display positions of button images, all first sensors $21x$ and all second sensors $22y$ are put in operation state, or that is, in on state where the sensors are capable of performing the touch operation detection, the above-described structure reduces the number of first sensors $21x$ and second sensors $22y$ that are put in operation state. Thus, the above-described structure reduces the amount of power supplied to sensors by an amount corresponding to the difference in the number of sensors that are not put in operation state when and when not applying the above-described structure. Accordingly, the above-described structure reduces power consumption of the touch position detection mechanism 20.

When the drive of the touch position detection mechanism 20 is commenced, the main control unit 30 remains in standby state until the user performs a touch operation on the display surface $11a$ and a touch position is detected by first sensors $21x$ and second sensors $22y$ that are put in operation state (Step S24).)

The main control unit 30 performs the touch position detection as follows.

The main control unit 30 monitors the current values that are sequentially output by the first light-reception elements $21b$ and the second light-reception elements $22b$ that are put in operation state. The main control unit 30 determines whether or not current output from each of the first light-reception elements $21b$ falls below the threshold current, and determines whether or not current output from each of the second light-reception elements $22b$ falls below the threshold current.

When determining that current output from one first light-reception element $21b$ has fallen below the threshold current, the main control unit 30 detects an X component on the X-Y rectangular coordinate system as an X component of a touch position resulting from a touch operation, based on the X coordinate position of the first light-reception element $21b$. Similarly, when determining that current output from one second light-reception element $22b$ has fallen below the threshold current, the main control unit 30 detects a Y component on the X-Y rectangular coordinate system as a Y component of a touch position resulting from a touch operation, based on the Y coordinate position of the second light-reception element $22b$.

When detecting a touch position (Yes in Step S24), the main control unit 30 specifies a button image corresponding to the button image area with respect to which the touch operation has been performed, based on the touch position so detected and the outline coordinates of the button images having been acquired in Step S14, and further, selects and thereby acquires the setting input information for the button image so specified from the setting input information for all button images, which is acquired in Step S14 (Step S25).

Subsequently, the main control unit 30 provides an instruction to the image forming main body A to execute processing related to the setting input information so acquired. For example, when the touch operation has been performed with respect to the button image area corresponding to the button image B1, the main control unit 30 provides an instruction to the image forming main body A to commence an operation (e.g., a copy operation) in an operation mode.

In addition to the above, in Step S25, the main control unit 30 counts the number of times (a total number of times) touch operations have been performed with respect to the button image that has been touched. When a touch operation is performed once with respect to a given button image, the main control unit 30 updates the number of times touch operations have been performed with respect to the given button image by incrementing the current count by one. The number of times touch operations have been performed with respect to button images is used in operation frequency-based processing (Step S22), which is described later in the present disclosure.

When the processing in Step S25 is completed, processing proceeds to Step S26. In Step S26, the main control unit 30 determines whether or not it is necessary to replace the touch operation screen currently displayed on the display panel 10 with a different input operation screen (need not be a touch operation screen). For example, when a touch operation has been performed with respect to the button image B2, which is for receiving a selection of an operation mode, it is necessary to replace the touch operation screen currently displayed with a different menu screen for the selection of an operation mode, and thus, the main control unit 30 determines affirmatively in Step S26.

When the main control unit 30 determines that it is necessary to replace the touch operation screen currently displayed with a different input operation screen (Yes in Step S26), processing returns to Step S11, and the processing in and following Step S11 is executed for the new input operation screen. Meanwhile, when the main control unit 30 determines that it is unnecessary to replace the touch operation screen with a different input operation screen (No in Step S26), processing returns to Step S24 and the main control unit 30 enters the standby mode. Here, note that once the amount of time the main control unit 30 has continuously been in the standby mode exceeds a predetermined amount of time, the power saving control may be terminated.

<Power Saving Priority Mode>

The following describes a case where the power saving priority mode has been selected by the user. The determination of whether or not the user has selected the power saving priority mode is made in each of Step S20 or Step S31.

<Power Saving Priority Mode in Step S20>

When determining in Step S20 that the power saving priority mode has been selected (Yes in Step S20), the main control unit 30 executes operation frequency-based processing as the power saving priority mode (Step S22).

The operation frequency-based processing is processing of reducing power supplied to sensors (first sensors 21x or second sensors 22y) corresponding to button image areas at which button images that are not touched frequently are displayed.

Figure 8:
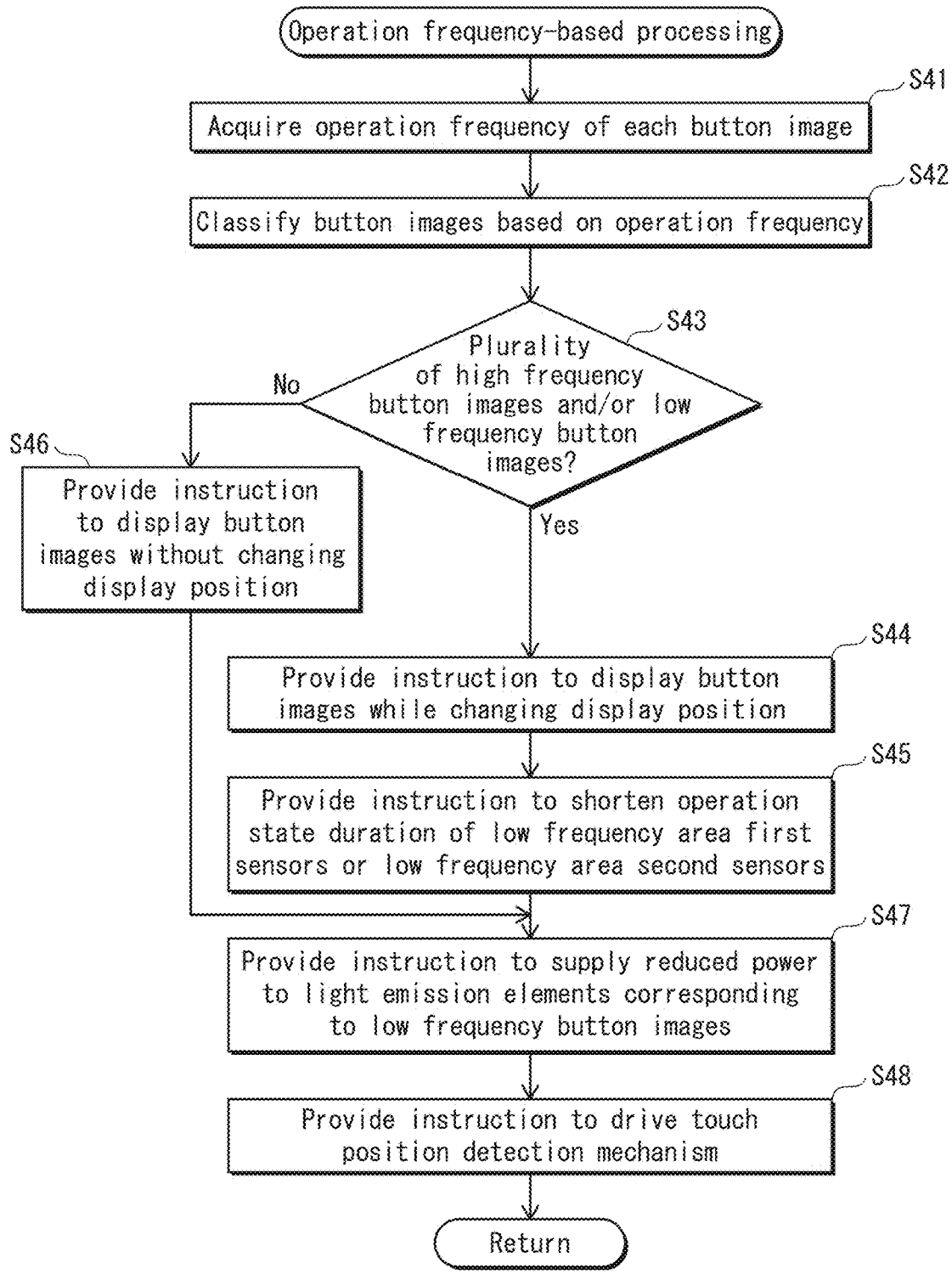
FIG. 8 is a flowchart illustrating sub-routines of operation frequency-based processing executed in power saving control.

FIG. 8 is a flowchart illustrating sub-routines of the operation frequency-based processing.

As illustrated in FIG. 8, first, the main control unit 30 acquires, for each of the button images (button image areas) of the display target touch operation screen, the frequency at which touch operations have been performed with respect to the button image (Step S41).

Here, the frequency at which touch operations are performed with respect to a given button image is indicated by a ratio of the number of times touch operations have been performed with respect to the given button image to the total number of times touch operations have been performed with respect to all button images (button image areas). As already described above, the number of times touch operations have been performed with respect to each of the button images is counted in Step S25. Accordingly, the total number of times touch operations have been performed with respect to all button images can be calculated based on the number of times touch operations have been performed with respect to each of the button images. Thus, the frequency at which touch operations have been performed (referred to in the following as a "touch frequency") can be acquired for each button image.

Subsequently, the main control unit 30 compares, for each of the button images, the touch frequency having been acquired with a predetermined threshold value, and classifies the button images in the display target touch operation screen into those that are frequently touched (high frequency button images) and those that are not frequently touched (low frequency button images) (Step S42). Here, a given button image is classified as being a high frequency button image when the touch frequency of the button image is higher than the threshold value, and is classified as being a low frequency button image when the touch frequency of the button image is lower than the threshold value.

When having performed this classification, the main control unit 30 determines whether or not there are two or more low frequency button images and/or two or more high frequency button images (Step S43).

When determining that there are two or more low frequency button images and/or two or more high frequency button images (Yes in Step S43), processing proceeds to Step S44.

In Step S44, the main control unit 30 provides an instruction to the display control unit 13 to rearrange the button images in the display target touch operation screen such that a group composed of all low frequency button images and a group composed of all high frequency button images are in a predetermined arrangement when displayed.

Before the processing in Step S44, a determination has already been made in Step S17 that the plurality of button images in the display target touch operation screen form a single line in the button arrangement direction (X direction or Y direction). In Step S44, the main control unit 30 provides an instruction to the display control unit 13 to rearrange the display positions of the button images such that the group of all low frequency button images and the group of all high frequency button images are, when displayed, separated from one another in the button arrangement direction.

The display control unit 13, when receiving this instruction, rearranges display positions of the button images in the display target touch operation screen such that the group of all low frequency button images and the group of all high frequency button images are, when displayed, separated from one another in the button arrangement direction.

Figure 9A:
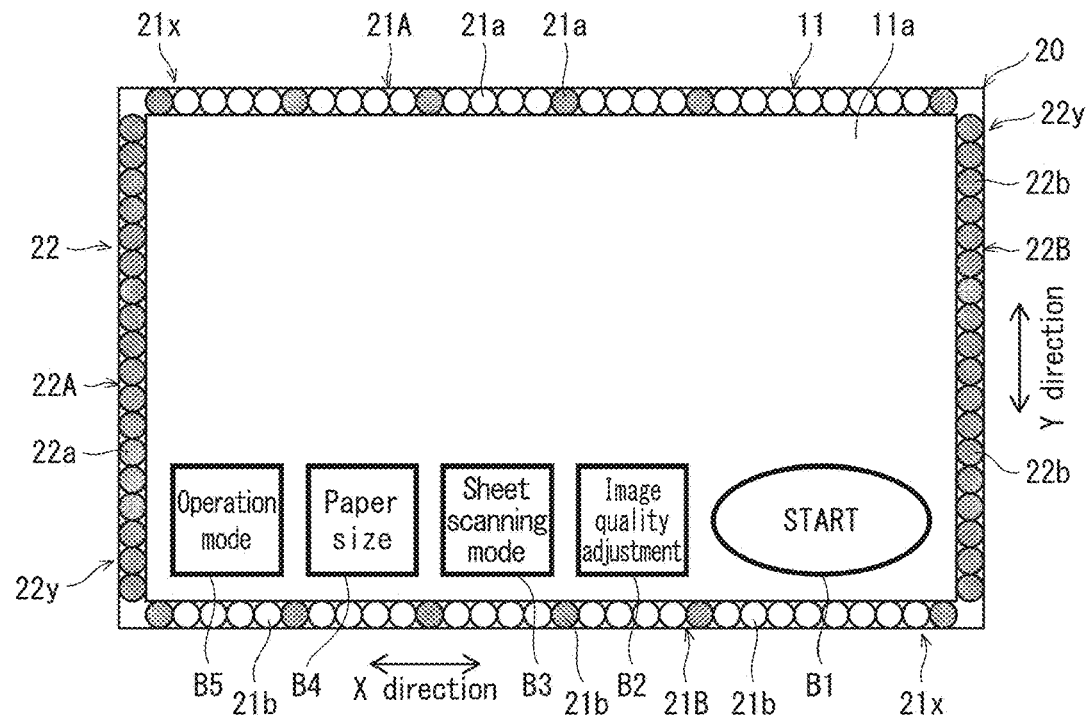
FIG. 9A is a schematic illustrating a state where touch operation screen, before operation frequency-based processing is executed, is displayed on display surface of display panel.
Figure 9B:
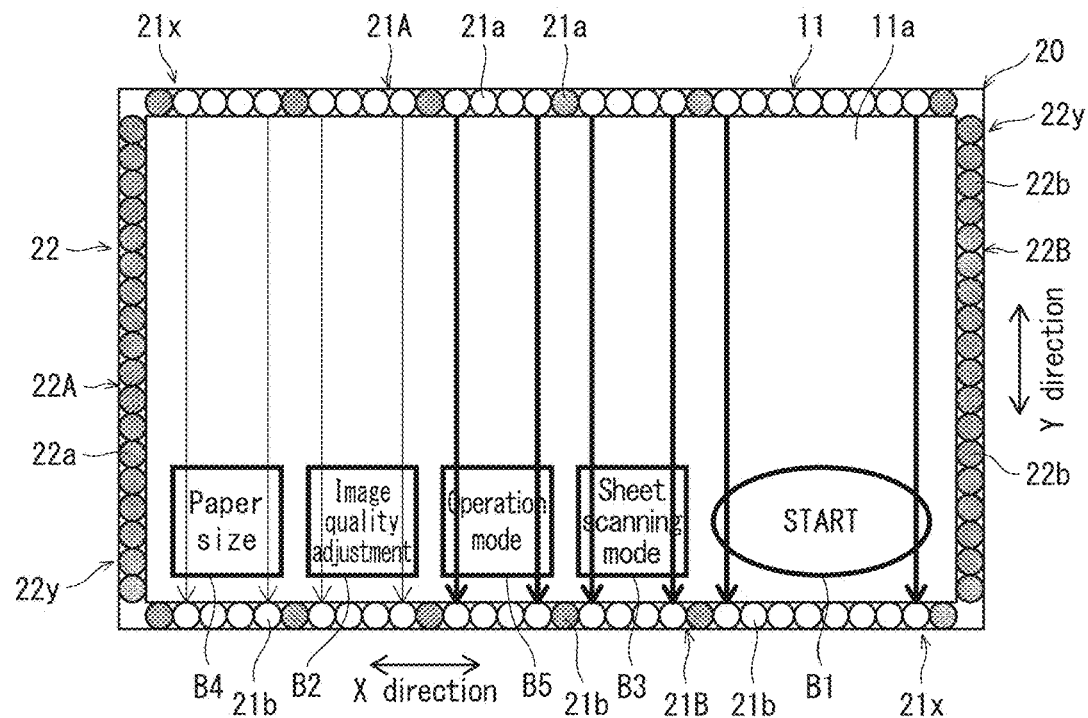
FIG. 9B is a schematic illustrating a state where, due to execution of operation frequency-based processing, image in which button images in touch operation screen illustrated in FIG. 9A are rearranged is displayed on display surface of display panel.

FIG. 9A illustrates a state before the rearrangement of button images, and FIG. 9B illustrates a state after the rearrangement of the button images.

FIGS. 9A and 9B illustrate a case where button images B1, B3, B5 are classified as high frequency buttons, and the button images B2, B4 are classified as low frequency buttons. Further, FIG. 9B illustrates a state where, after the rearrangement, the button images B1, B3, B5 are adjacent to one another at the right side of the display surface 11a in the X direction, and the button images B2, B4 are adjacent to one another at the left side of the display surface 11a in the X direction.

Returning to FIG. 8, in Step S45, the main control unit 30 provides an instruction to the light-emission control unit 25 and the light-reception control unit 26 to shorten the amount of time for which each sensor corresponding to a button image area of a low frequency button image, among the sensors (first sensor 21x or second sensor 22y) that are to be put operation state one by one, is actually put in operation state. Note that in the following, the amount of time for which a given sensor is actually put in operation state is referred to as an operation state duration, a first sensor 21x corresponding to a button image area of a low frequency button image is referred to as a low frequency area first sensor 21x, and a second sensor 22y corresponding to a button image area of a low frequency button image is referred to as a low frequency area second sensor 22y.

Meanwhile, in Step S45, note that the operation state duration of each sensor corresponding to a button image area of a high frequency button image, among the sensors (first sensor 21x or second sensor 22y) that are to be in put in operation state one by one, is not shortened. Note that in the following, the unshortened amount of time for which a sensor that performs touch operation detection with respect to a button image area of a high frequency button image is actually put in operation state is referred to as a standard duration. Further, a first sensor 21x corresponding to a button image area of a high frequency button image is referred to as a high frequency area first sensor 21x, and a second sensor 22y corresponding to a button image area of a high frequency button image is referred to as a high frequency area second sensor 22y.

When the processing in Step S45 is completed, processing proceeds to Step S47.

In Step S47, the main control unit 30 provides an instruction to the light-emission control unit 25 to supply a predetermined power (referred to in the following as a "low drive power") with a current having a lower current value than the standard power to the first light-emission elements 21x of the low frequency area first sensors 21x or the second light-emission elements 22a of the low frequency area second sensors 22y. Further, the main control unit 30 provides an instruction to the touch position detection mechanism 20 to commence driving (Step S48), and processing proceeds to Step S24 in FIG. 5. Accordingly, the touch position detection mechanism 20 is controlled by the light-emission control unit 25 and the light-reception control unit 26 in accordance with the instructions (Steps S45 and S47) from the main control unit 30, and thereby performs the touch operation detection.

For example, when all of the second sensors 22y have been set to non-operation state, the main control unit 30, in Step S45, provides an instruction for shortening the operation state duration of the low frequency area first sensors 21x compared to the operation state duration (standard duration) of the high frequency area first sensors 21x. Thus, the light-emission control unit 25 puts each of the first light-emission switches 21c of the low frequency area first sensors 21x in on state for an amount of time shorter than the standard duration. Consequently, the total of the operation state durations of the first light-emission elements 21a of the low frequency area first sensors 21x is reduced compared to when the operation frequency-based processing is not executed.

Meanwhile, when all of the first sensors 21x have been set to non-operation state, the main control unit 30, in Step S45, provides an instruction for shortening the operation state duration of the low frequency area second sensors 22y compared to the standard duration. Thus, the light-emission control unit 25 shortens the operation state duration of each of the second light-emission switches 22c of the low frequency area second sensors 22y to be shorter than the standard duration. Consequently, the total of the operation state durations of the second light-emission elements 22a of the low frequency area second sensors 22y is reduced compared to when the operation frequency-based processing is not executed.

In either case described above, power consumption of the touch position detection mechanism 20 is reduced compared to when the operation frequency-based processing is not executed.

As already described above, sensors having been set to operation state are put in operation state in order one at a time, i.e., are put in a state where power for the touch position detection is supplied thereto in order one at a time. When the operation state duration of a given sensor is shortened, the amount of time the given sensor performs detection per a unit time period becomes shorter than the standard duration.

Here, it should be noted that while power consumption can be reduced by shortening the operation state duration, when the operation state duration is shortened excessively, the risk increases of sensors not detecting a touch operation even when a touch operation is performed, particularly when the touch operation is for example a swift touch operation performed by the user by using his/her finger.

Meanwhile, as already described above, shortening the operation state duration to be shorter than the standard duration is performed with respect to only sensors (low frequency area first sensors 21x or low frequency area second sensors 22y) that correspond to button image areas that are not frequently touched by the user. Further, it can also be assumed that the likelihood is low of a swift touch operation as described above being performed with respect to such sensors. As such, the probability is low of the accuracy of the touch operation detection being reduced by shortening the operation state duration of such sensors.

When performing control as described above, where the operation state durations of specific sensors are shortened to be shorter than the standard duration, it can be expected that the accuracy of the touch operation detection decreases compared to when the operation state duration is fixed for all sensors. However, this control is performed when the user has selected the power saving priority mode, and when the user has selected the power saving priority mode, the reduction of power consumption of the touch position detection mechanism 20 is prioritized.

As already described above, in Step S47, the main control unit 30 provides an instruction for causing the low drive power to be supplied to the first light-emission elements 21a of the low frequency area first sensors 21x or the second light-emission elements 22a of the low frequency area second sensors 22y. Due to this, the light-emission control unit 25 controls the light-emission current control unit 23 to supply the low drive power to the first light-emission elements 21a of the low frequency area first sensors 21x or the second light-emission elements 22a of the low frequency area second sensors 22y.

For example, when all of the second sensors 22y have been set to non-operation state as illustrated in FIG. 9B, the low drive power is supplied to the first light-emission power supply line 21e at the timing when a first light-emission switch 21c that is connected to a first light-emission element 21a of a low frequency area first sensor 21x is put in on state. Accordingly, the low drive power is supplied to the first light-emission element 21a. As a result, the first light-emission element 21a emits light having an intensity that is lower than the standard intensity.

Note that when a first light-emission element 21a of a high frequency area first sensor 21x is put in operation state, the standard power is supplied to the first light-emission element 21a. As such, the first light-emission element 21a emits light of the standard intensity.

FIG. 9B illustrates a state where some of the first light-emission elements 21a emit light of the standard intensity (thick lines) while other ones of the first light-emission elements 21a emit light of an intensity lower than the standard intensity (thin lines).

Meanwhile, when all of the first sensors 21x have been set to non-operation state, the low drive power is supplied to the second light-emission power supply line 22e at the timing when a second light-emission switch 22c that is connected to a second light-emission element 22a of a low frequency area second sensor 22y is put in on state. Accordingly, the low drive power is supplied to the second light-emission element 22a. As a result, the second light-emission element 22a emits light having an intensity that is lower than the standard intensity.

Note that when a second light-emission element 22a of a high frequency area second sensor 22y is put in operation state, the standard power is supplied to the second light-emission element 22a. As such, the second light-emission element 22a emits light of the standard intensity.

In either one of the examples described above, the power supplied to the first light-emission elements 21a of the low frequency area first sensors 21x or the second light-emission elements 22a of the low frequency area second sensors 22y is reduced. Thus, compared to a configuration where the standard power is always supplied to all light-emission elements regardless of touch frequency, the power consumption of the touch position detection mechanism 20 can be reduced.

Note that the standard power described above is power with a current necessary to cause light-emission elements to emit light of an amount that corresponds to a standard light reception amount within an acceptable light reception amount range of light-reception elements (first light-reception elements 21b and the second light-reception elements 22b). When receiving light of an amount within the acceptable light reception amount range, a light-reception element is able to perform the touch operation detection. Meanwhile, the low drive power described above is power necessary to cause a light-emission element to emit light of an amount that corresponds to a light-reception amount that is within the acceptable light reception amount range but is lower than the standard reception amount.

The standard power and the low drive power are both within an acceptable range of power supplied to the light-emission elements, and are determined in advance such that the low drive power is lower than the standard power. When power within the acceptable range of power is supplied to a light-emission element, the light-emission element performs the touch position detection. Power consumption is reduced when low drive power is supplied to light-emission elements compared to when the standard power is supplied to light-emission elements. However, the current supplied to light-emission elements is lower when the low drive power is supplied compared to when the standard power is supplied, and thus, the amount of light emitted from the light-emission elements decreases accordingly when the low drive power is supplied.

When the amount of light emitted from the light-emission elements decreases, the amount of light received by the light-reception elements decreases proportionally. As such, current output from the light-reception elements decreases compared to when the standard power is supplied to the light-emission elements. Accordingly, a situation occurs where the difference between the current output from the light-reception elements and the threshold voltage becomes smaller than when the standard power is supplied to the light-emission elements.

Here, it should be noted that setting the low drive power to be lower than the standard power by an excessive degree in order to reduce power consumption results, for example, in the risk increasing of a situation occurring where current output from a light-reception element falls below the threshold voltage and a touch operation is detected accordingly even when only a part of light passing over a corresponding button image area is blocked by the user's finger.

However, the low drive power is supplied only to specific ones of the sensors (low frequency area first sensors 21x or low frequency area second sensors 22y) corresponding to button image areas with respect to which touch operations are not frequently performed by the user. Further, it can also be assumed that the likelihood is low of the user erroneously blocking light passing over such button image areas with his/her finger. As such, the probability is low of the accuracy of the touch operation detection decreasing even when supplying the low drive power to the specific ones of the sensors.

In addition, as already described above, when there are two or more low frequency buttons images and/or two or more high frequency button images in the display target touch operation screen, the group composed of all low frequency button images and the group composed of all high frequency button images are separated from one another when displayed. Thus, the frequency at which the user approaches the high frequency button images increases, whereas the frequency at which the user approaches the low frequency button images decreases. This, in addition to the above, reduces the probability of the accuracy of the touch operation detection performed with respect to the low frequency button images decreasing.

When performing control as described above, where sensors are supplied with the standard power or the low drive power depending upon touch frequency, it can be expected that the accuracy of the touch operation detection decreases compared to when the standard power is always supplied to the sensors. However, this control is performed when the user has selected the power saving priority mode, and when the user has selected the power saving mode, the reduction of power consumption of the touch position detection mechanism 20 is prioritized.

Note that regarding how short the operation state duration should be set compared to the standard duration and how low the low drive power should be set compared to the standard power, appropriate time lengths and current values can be determined in advance through experiments and the like, while taking into considering power consumption and detection accuracy.

The following describes a case where the display target touch operation screen includes neither a plurality of low frequency button images nor a plurality of high frequency button images (when NO in Step S43). In this case, processing proceeds to Step S46. In Step S46, the main control unit 30 provides an instruction to the display control unit 13 to display the button images included in the display target touch operation screen on the display surface 11a without performing rearrangement of display positions of the button images. Thus, a touch operation screen (i.e., the display target touch operation screen) including button images in a state where the button images have not been rearranged is displayed on the display surface 11a.

Subsequently, processing proceeds to Step S47. Accordingly, in this case, the processing in Step S45 of shortening the operation state duration of each of the low frequency area first sensors 21x or each of the low frequency area second sensors 22y is not executed.

In Step S47, the main control unit 30 provides an instruction to the light-emission control unit 25 to supply the low drive power to the first light-emission elements 21a of the low frequency area first sensors 21x or the second light-emission elements 22a of the low frequency area second sensors 22y.

Subsequently, the main control unit 30 provides an instruction to the touch position detection mechanism 20 to commence driving (Step S48), and processing proceeds to Step S24 in FIG. 5. Accordingly, the touch position detection mechanism 20 is controlled by the light-emission control unit 25 and the light-reception control unit 26 in accordance with the instruction from the main control unit 30, and thereby performs the touch operation detection.

In this case, the low drive power is supplied to the first light-emission elements 21a of the low frequency area first sensors 21x or the second light-emission elements 22a of the low frequency area second sensors 22y. Thus, the first light-emission elements 21a or the second light-emission elements 22a to which the low drive power is supplied emit light having an intensity lower than the standard intensity. Accordingly, the power consumption of the touch position detection mechanism 20 is reduced compared to when all light-emission elements are always caused to emit light of the standard intensity.

In the above, the power consumption of the touch position detection mechanism 20 is reduced by supplying the low drive power to the first light-emission elements 21a included in all first sensors 21x corresponding to low frequency button images. However, the reduction of power consumption of the touch position detection mechanism 20 may be realized in another way.

For example, a modification may be made such that, from among a plurality of first sensors 21x corresponding to one low frequency button image (button image area), one or more first sensors 21x are selected and set to non-operation state, while the first light-emission elements 21a of the unselected ones of the first sensors 21x are set to the operation state. The first light-emission elements 21a of the first sensors 21x that are set to the operation state may be supplied with either the standard power or the low drive power.

When making this modification, when a large number of first sensors 21x that are continuously arranged along the X direction are set to non-operation state, the area along the X direction within which touch operation detection is not detectable increases. To avoid this, when making the above modification, the number of first sensors 21x continuously arranged in the X direction that can be set to non-operation state can be determined in advance to be within a range enabling the touch operation detection, based on the size of the user's finger, the X direction interval between adjacent ones of the first sensors 21x, and the like. Further, when making the above-described modification, the determination of whether each first sensor 21x is to be set to operation state or to be set to non-operation state can be made such that two first sensors 21x at both sides in the X direction of a first sensor 21x set to non-operation state are set to operation state. Note that the above-described matters also apply to the second sensors 22y.

In addition, in the above, when the operation frequency-based processing is executed, rearrangement of button images is performed so that the low frequency button images included in the display target touch operation screen and the high frequency button images included in the display target touch operation screen are separated from one another when displayed. However, a modification may be made such that this rearrangement is not performed.

When making such a modification, when the processing in Step S42 in FIG. 8 is completed, the processing in Step S46 is executed, without the processing in Steps S43 through S45 being executed. Thus, the rearrangement of button images is not performed. Following this, the processing in Step S47 is executed, whereby the first light-emission elements 21a of the low frequency area first sensors 21x are supplied with the low drive power. Accordingly, when making this modification, power consumption of the touch position detection mechanism 20 is reduced compared to when the operation frequency-based processing is not executed.

Alternatively, a modification may be made such that while the rearrangement of button images is not performed (i.e., Step S44 is skipped), the processing in Step S45 of shortening the operation state duration of the low frequency area first sensors 21x or the low frequency area second sensors 22y is executed.

Alternatively, a modification may be made such that only one of the processing in Step S44 and the processing in Step S47 is executed in the operation frequency-based processing (Step S22).

Alternatively, a modification may be made such that at least one of the processing in Step S45 and the processing in Step S47 is executed, regardless of the number of low frequency button images and the number of high frequency button images included in the display target touch operation screen (i.e., Step S43 is skipped) and without the rearrangement of button images being performed (i.e., Step S44 is skipped).

Alternatively, a modification may be made of replacing the processing of shortening the operation state duration (Step S45) and the processing of reducing power supply (Step S47) with processing such that, when there are a plurality of sensors corresponding to a single low frequency button image area, some of the plurality of sensors are not supplied with power while the rest of the plurality of sensors are supplied with power (i.e., the number of sensors to which power is supplied is cut down).

<Power Saving Priority Mode in Step S31>

When determining in Step S31 that the power saving priority mode has been selected (Yes in Step S31), the main control unit 30 executes display changing processing in Steps S32 through S36 as the power saving priority mode.

First, the main control unit 30 determines whether or not the plurality of button images in the display target touch operation screen form a plurality of lines along the X direction or the Y direction (Step S32).

Figure 10A:
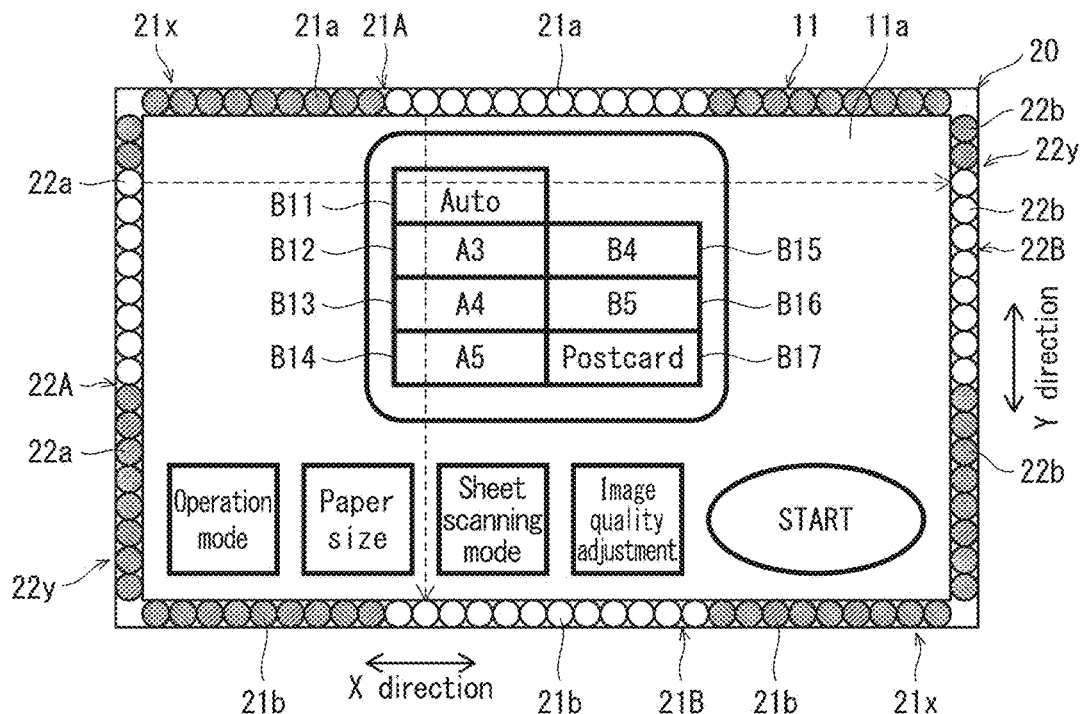
FIG. 10A is a schematic illustrating a state where multiple linear area image is displayed on display surface of display panel.

In the present disclosure, a plurality of button images form a plurality of lines when the button images form two or more parallel lines of button images extending in the same direction (X direction or Y direction). For example, FIG. 10A illustrates an arrangement where button images B11 through B17 form two lines of button images along the Y direction. Note that in the following, an image in which a plurality of button images form a plurality of lines is referred to as a "multiple linear area image".

When the main control unit 30 determines that the touch operation screen does not include a multiple linear area image (No in Step S32), processing proceeds to Step S35, where the main control unit 30 determines whether or not centralized display processing is executable. The processing in and following Step S35 is described in detail later in the present disclosure.

Figure 10B:
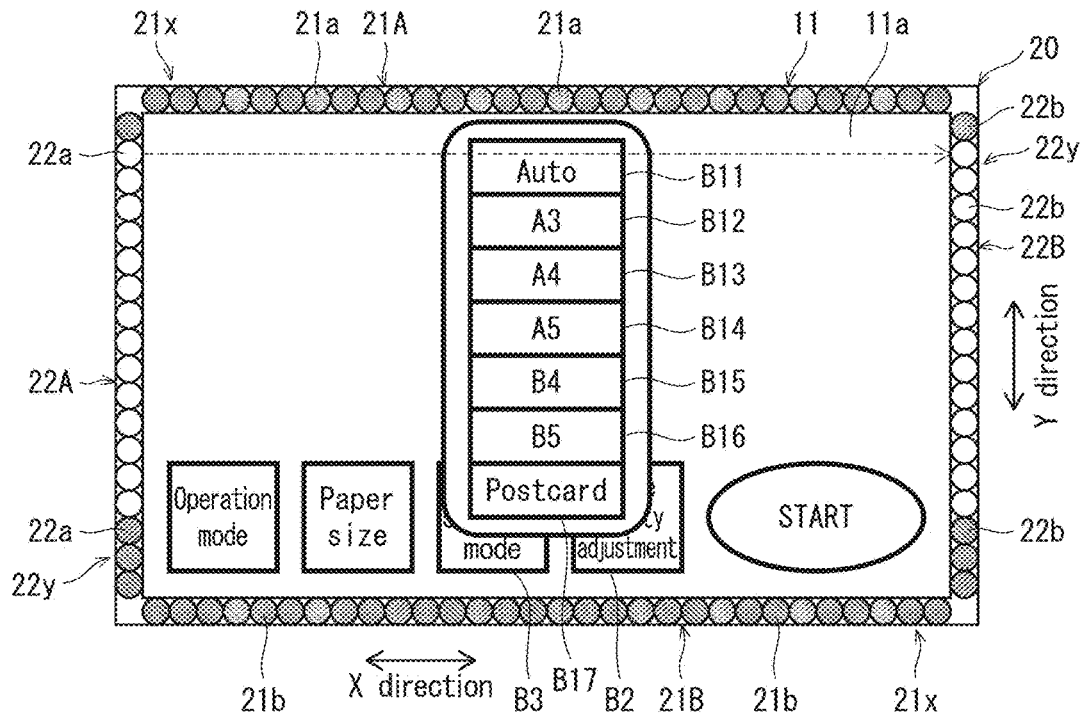
FIG. 10B is a schematic illustrating a state where single linear area image, which replaces multiple linear area image illustrated in FIG. 10A as a result of single linear area display processing, is displayed on display surface of display panel.

When the main control unit 30 determines that the touch operation screen includes a multiple linear area image (Yes in Step S32), processing proceeds to Step S33. In Step S33, the main control unit 30 determines whether or not image date for an image (referred to in the following as a single linear area image) obtained by rearranging the button images forming the plurality of lines in the multiple linear area image to form a single line is stored in advance in the storage unit. FIG. 10B illustrates one example of a single linear area image that is obtained by rearranging a plurality of button images (e.g., the button images B11 through B17) to form a single line in one direction (X direction or Y direction).

When the main control unit 30 determines that image data for a single linear area image is not stored in the storage unit (No in Step S33), processing proceeds to Step S23 in FIG. 5 without single linear area display processing in Step S34 being executed. In this case, the processing following this point is similar to that when the power saving priority mode has not been selected (No in Step S31), which has already been described above.

Meanwhile, when determining that image data for a single linear area image is stored in the storage unit (Yes in Step S33), the main control unit 30 determines that the single linear area display processing is executable. Following this, processing proceeds to Step S34, where the main control unit 30 executes the single linear area display processing.

<Single Linear Area Display Processing>

The single linear area display processing is executed when No in Step S16 or No in Step S17. That is, the single linear area display processing is executed when all sensors arranged along one direction (all first sensors 21x or all second sensors 22y) have not been set to non-operation state. For example, the single linear area display processing is executed with the sensors in the state illustrated in FIG. 7.

Due to this, the touch position detection mechanism 20, when actually performing the touch position detection in a case where the single linear area display processing is not executed, consumes a greater amount of power compared to when all sensors arranged along one direction (all first sensors 21x or all second sensors 22y) have been set to non-operation state (such state illustrated, for example, in FIGS. 3 and 4).

Meanwhile, when a multiple linear area image is replaced with a single linear area image, touch operations performed with respect to a plurality of button images can be detected by using only the sensors (i.e., the first sensors 21x or the second sensors 22y) that are disposed along the button arrangement direction. Thus, all of the sensors that are not directly involved in the above-described touch operation detection performed with respect to the button images (all of the first sensors 21x or all of the second sensors 22y) can be set to non-operation state.

Accordingly, the surface area of portions of the background image area with respect to which the touch position detection can be put in off state increases, and the total number of first sensors 21x and second sensors 22y that are used for performing the touch operation detection with respect to the background image area may increase. This results in the total of the number of sensors first sensors 21x that are used for performing the touch operation detection with respect to button images (button image areas) and the number of second sensors 22y that are used for performing the touch operation detection with respect to button images (button image areas) being reduced compared to before the change (i.e., the multiple linear area image), and power consumption of the touch position detection mechanism 20, when executing the touch position detection, being reduced.

That is, when the total of the number of first sensors 21x that are set to operation state and the number of second sensors 22y that are set to operation state decreases if display arrangement were to be changed from a first predetermined arrangement (multiple linear area image) to a second predetermined arrangement (single linear area image) differing from the first predetermined arrangement, the power consumption of the touch position detection mechanism 20 can be reduced.

Accordingly, in the present embodiment, among the multiple linear area images stored in the storage unit, ones for which the number of sensors (first sensors 21x and second sensors 22y) that are set to the operation state is reduced if replacement of the multiple linear area image with a single linear area image were to be performed are determined in advance, and such multiple linear area images are stored in the storage unit of the main control unit 30 along with corresponding single linear area images. Further, when there exists a single linear area image corresponding to a multiple linear area image in the display target touch operation screen (Yes in Step S33), the main control unit 30 executes the single linear area display processing (Step S34).

In this sense, the main control unit 30, when executing the processing in Step S33, functions as a surface area increase determiner that determines whether or not a surface area of X component areas and Y component areas with respect to which the touch position detection can be put in off state increases.

FIG. 10A is a schematic illustrating a state where a multiple linear area image with respect to which a determination is made that the single linear area display processing is executable is displayed on the display surface 11a. Note that the multiple linear area image illustrated in FIG. 10A is a screen that is, for example, displayed by being overlaid over the touch operation screen illustrated in FIG. 9A when the touch operation screen illustrated in FIG. 9A is displayed on the display surface 11a and the user performs a touch operation with respect to the button image B4, which is for selecting paper size.

The seven button images B11 through B17 included in the multiple linear area image displayed on the display surface 11a each correspond to information related to paper size. The button images B11 through B17 are displayed such that button images B11 through B14 form one line along the Y direction, button images B15 through B17 form another line along the Y direction, and the two lines are displayed parallel to one another. Further, the button images B11 through B17 have the same shapes and sizes, and in specific, have the same rectangular shape whose horizontal sides are longer than vertical sides. Note that each of the areas of the display surface 11a at which the seven button images B11 through B17 are displayed is a button image area.

In the line of button images in the left hand side, the four button images B11, B12, B13, and B14 are arranged in the stated order, from top to bottom in the Y direction. The button images B11 through B14 are displayed adjacent to one another without spaces therebetween. In the line of button images in the right hand side, the three button images B15, B16, and B17 are arranged in the stated order, from top to bottom in the Y direction. The button images B15 through B17 are displayed adjacent to one another without spaces therebetween.

The button image B11, which is displayed closest to the top of the display surface 11a in the Y direction in the line in the left hand side, has allocated thereto a function of providing an instruction to the image forming main body A to automatically select the size of paper to be used in printing based on image data.

The button images B12, B13, and B14, each of which are displayed lower than the button image B11, each have allocated thereto a function of providing an instruction to the image forming main body A to select a predetermined paper size.

Similarly, the button images B15, B16, and B17, which are displayed in the line in the right hand side, each have allocated thereto a function of providing an instruction to the image forming main body A to select a predetermined paper size.

When the display target touch operation screen includes such a multiple linear area image, the processing in Steps S14 through S17 and Step S21 is executed. Accordingly, first sensors 21x and second sensors 22y corresponding to button image areas of the button images B11 through B17 are put in operation state, as indicated by the unfilled circles in FIG. 10A.

FIG. 10B illustrates a state where a single linear area image that is obtained by rearranging all of the button images B11 through B17 in the above-described multiple linear area image to form one line along the Y direction is displayed on the display surface 11a.

In the single linear area image illustrated in FIG. 10B, the button images B11 through B17 are displayed in the stated order to form a single line along the Y direction.

With respect to such a single linear area image, touch operations performed with respect to the button image areas corresponding to the button images B11 through B17 can be detected by using the second sensors 22y, which are arranged along the Y direction, without using the first sensors 21x, which are arranged along the X direction.

Accordingly, as schematically illustrated in FIG. 10B, it suffices to set to operation state only second sensors 22y corresponding to the button images areas of the button images B11 through B17, as indicated by the unfilled circles in FIG. 10B.

Accordingly, all of the first sensors 21x, which are arranged along the X direction, are set to non-operation state. Further, among the second sensors 22y, which are arranged along the Y direction, only ones corresponding to the button images B11 through B17 are set to operation state. Thus, the total number of sensors (first sensors 21x and second sensors 22y) that are kept in non-operation state increases and the total number of sensors (first sensors 21x and second sensors 22y) that are switched to operation state decreases, compared to when the display target touch operation screen is the multiple linear area image illustrated in FIG. 10A.

Note that the image data stored in advance to the main control unit 30 not only includes image date for the single linear area image corresponding to the multiple linear area image illustrated in FIG. 10A, but also image data for single linear area images corresponding to other undepicted multiple linear images that, when the replacement of a multiple linear area image with a single linear area image is performed, reduce the number of sensors (first sensors 21x and second sensors 22y) that switch to operation state.

As such, when an instruction is provided to display one of such multiple linear area images, image data for a single linear area image corresponding to the multiple linear area image can be read, and the single linear area image, which is a replacement of the multiple linear area image, can be displayed on the display surface 11a based on the image data for the single linear area image.

As such, when a single linear area image corresponding to a multiple linear area image is stored in the storage unit of the main control unit 30, the result of the determination in Step S33 in FIG. 6 is affirmative, and the single linear area display processing in Step S34 is executed.

Figure 11:
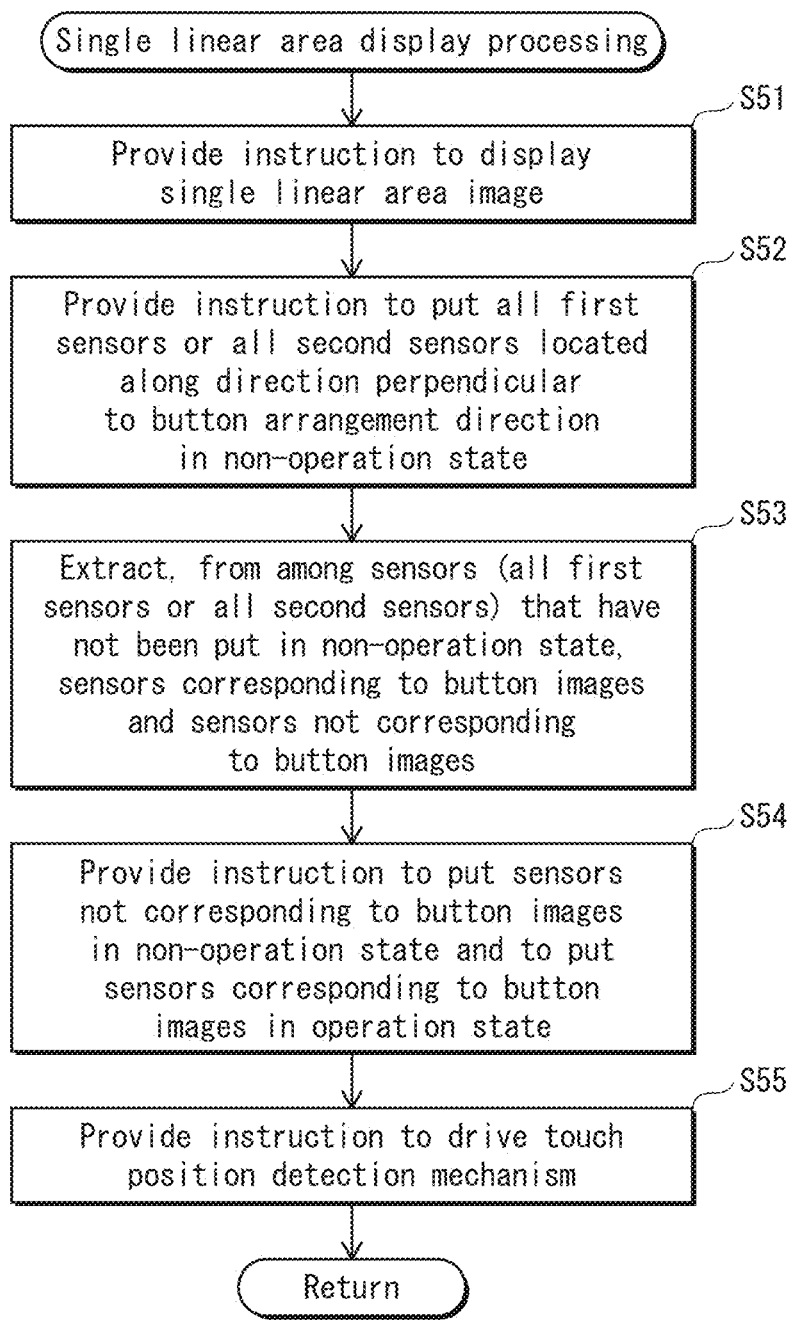
FIG. 11 is a flowchart illustrating sub-routines of single linear area display processing executed in power saving control.

FIG. 11 is a flowchart illustrating sub-routines of the single linear area display processing. In the single linear area display processing, the main control unit 30 provides an instruction to the display control unit 13 to display, on the display surface 11a, a single linear area image stored in the storage unit of the main control unit 30, in place of a multiple linear area image (Step S51).

Subsequently, the main control unit 30 provides an instruction to the light-emission control unit 25 and the light-reception control unit 26 to set to non-operation state all sensors (all of the first sensors 21x or all of the second sensors 22y) that are arranged in a direction perpendicular to the button arrangement direction in the single linear area image displayed on the display surface 11a (Step S52). For example, when the single linear area image illustrated in FIG. 10B is displayed, all of the first sensors 21x are set to non-operation state.

In addition, among the sensors (the first sensors 21x or the second sensors 22y) that have not been set to non-operation state, the main control unit 30 extracts sensors that do not correspond to button images (button image areas) and sensors that correspond to button images (button image areas) (Step S53). In the example illustrated in FIG. 10B, among all the second sensors 22y, the second sensors 22y indicated by filled circles are extracted as sensors that do not correspond to button images, whereas the second sensors 22y indicated by unfilled circles are extracted as sensors that correspond to button images.

Further, the main control unit 30 provides an instruction to the light-emission control unit 25 and the light-reception control unit 26 to set to non-operation state the sensors (first sensors 21x or second sensors 22y) that have been extracted as sensors that do not correspond to button images, and to set to operation state the sensors (first sensors 21x or second sensors 22y) that have been extracted as sensors that correspond to button images (Step S54).

Subsequently, the main control unit 30 provides an instruction to the touch position detection mechanism 20 to commence driving (Step S55). Accordingly, the touch position detection mechanism 20 is controlled by the light-emission control unit 25 and the light-reception control unit 26 in accordance with the instruction from the main control unit 30, and thereby performs the touch operation detection.

The light-emission control unit 25 and the light-reception control unit 26 keep all the sensors (first sensors 21x and second sensors 22y) that have been set to non-operation state in non-operation state. Thus, the power consumption of the touch position detection mechanism 20 is reduced compared to when the multiple linear area image, before replacement with the single linear area image, is displayed on the display surface 11a.

Following this, processing proceeds to Step S24 in FIG. 5, and the main control unit 30 remains in standby state until the user performs a touch operation with respect to one of the button images in the touch operation screen. Processing in and following Step S24 has already been described earlier in the present disclosure.

Note that when replacing a multiple linear area image with a single linear area image, as illustrated in FIG. 10B, a part of the single linear area image overlaps with originally-displayed button images B2 and B3. Thus, some users may feel uneasiness when presented the single linear area image. However, here, since the user has selected the power saving priority mode, the reduction of power consumption of the touch position detection mechanism 20 is prioritized.

Further, in the above, description is provided that the button images B11 through B17 are rearranged to form a single line along the Y direction as a result of the single linear area display processing. However, the result of the single linear area display processing may differ from this. Depending upon the number, the shapes, and sized of buttons, the buttons may be rearranged to form a single along the X direction, as a result of the single linear area display processing. Note that the button arrangement direction after the single linear area display processing can be determined in advance.

Further, description is provided above based on a multiple linear area image including a plurality of button images that form two lines in one direction (X direction or Y direction).

However, the single linear area display processing may be executed with respect to multiple linear area images other than this. For example, the single linear area display processing may be executed with respect to a multiple linear area image including a plurality of button images that form three or more lines in one direction (X direction or Y direction).

Further, description is provided above based on a multiple linear area image including lines of button images. However, the single linear area display processing may be executed with respect to images other than this. For example, when the total number of sensors (first sensors 21x and second sensors 22y) that are switched to operation state can be reduced if the single linear area display processing were to be executed, the single linear area display processing may be executed as described above with respect to, for example, a plurality of button images that are scattered with spaces therebetween.

<Centralized Display Processing>

The following describes processing in and following Step S35, which is executed when a determination is made in Step S32 in FIG. 6 that the touch operation screen does not include a multiple linear area image (No in Step S32). In the processing in and following Step S35, the main control unit 35 determines whether or not power consumption of the touch position detection mechanism 20 can be reduced through the centralized display processing (Step S35), and executes the centralized display processing when determining affirmatively in Step S35 (Step S36).

Figure 12A:
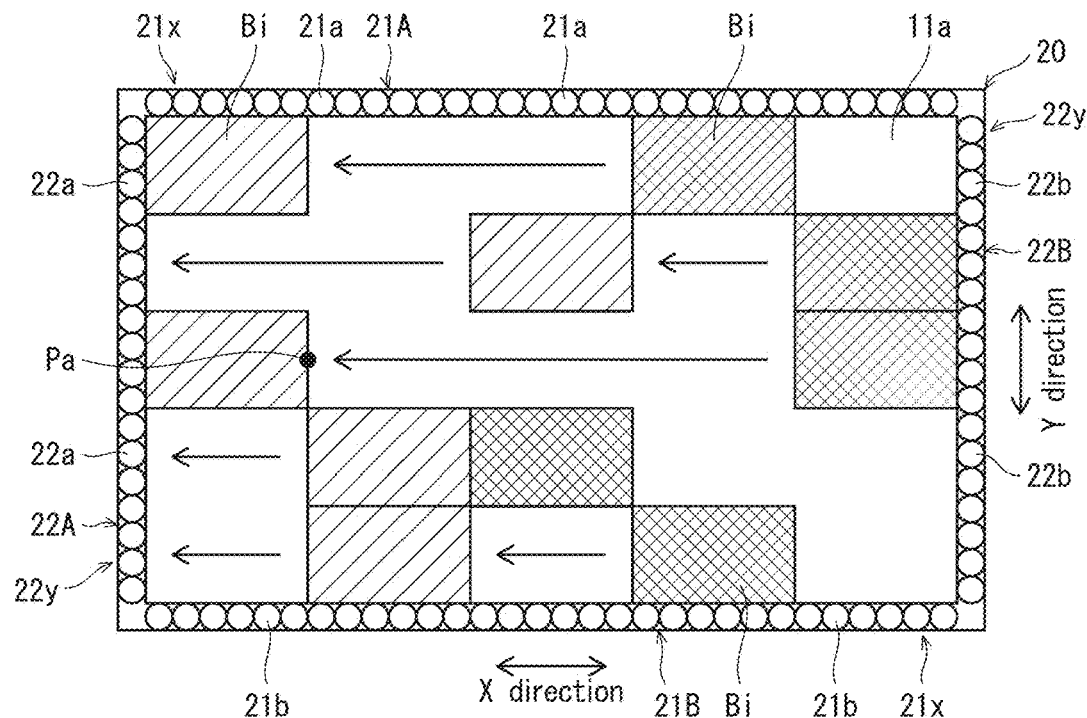
FIG. 12A is a schematic illustrating one example where touch operation screen with respect to which centralized display processing is executable is displayed on display surface of display panel.
Figure 12B:
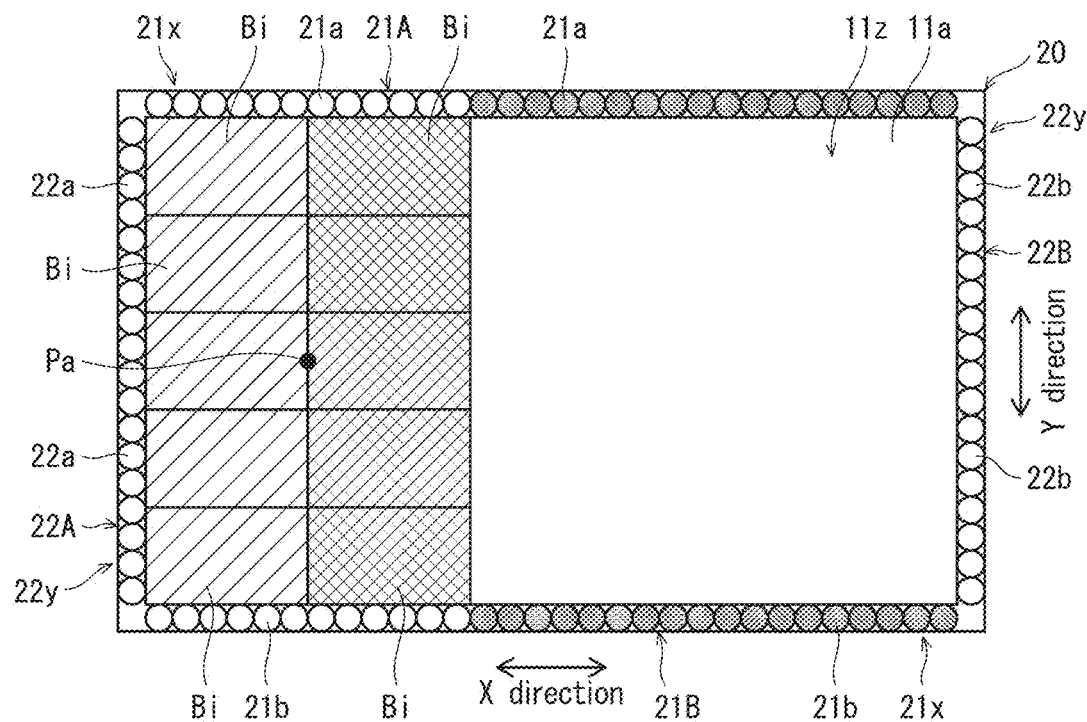
FIG. 12B is a schematic illustrating a state where image including button images in touch operation screen illustrated in FIG. 12A displayed in centralized manner at left side of display surface, due to execution of centralized display processing, is displayed on display surface of display panel.

In the present disclosure, when centralized display of button images is performed, all display target button images are displayed in a centralized manner, at one desired area of the display surface 11a (refer to FIG. 12B). Thus, when centralized display of button images is performed, adjacent ones of the button images are either arranged in contact with one another or arranged with a relatively small space therebetween.

In Step S35, the main control unit 30 determines whether or not centralized display of button images is executable with respect to the display target touch operation screen. In the present embodiment, for each touch operation screen including a plurality of button images that, when displayed, are arranged with spaces therebetween, it is determined in advance whether or not centralized display processing can be executed with respect to the touch operation screen. Thus, in Step S35, the main control unit 30 performs the determination based on the result of the determination performed in advance.

The main control unit 30 determines whether or not centralized display is executable as follows.

FIG. 12A illustrates a touch operation screen including a plurality of buttons B1 that, when displayed, are scattered throughout the display surface 11a.

In such a touch operation screen, there are many cases where the background image area does not have a portion covering the entirely of the display surface 11a in the X direction or the Y direction. Thus, in many cases, a large number of sensors (first sensors 21x and second sensors 22y) are used to perform the touch operation detection with respect to button image areas of button images. In other words, in many cases, only a small number of sensors (first sensors 21x and second sensors 22y) can be set to non-operation state.

When taking the touch operation screen illustrated in FIG. 12A as an example, all the first sensors 21x and all the second sensors 22y need to be set to operation state in order to perform the touch operation detection with respect to the button image areas of the ten button images Bi.

In order to increase the total number of sensors (first sensors 21x and second sensors 22y) that can be set to non-operation state and thereby reduce power consumption of the touch position detection mechanism 20, it suffices to increase the surface area of the display surface 11a occupied by portions of the background image area at which the touch position detection can be put in off state. In other words, it suffices to increase the surface area on the display surface 11a of portions of the background image area covering the entirety of the display surface 11a in the X direction or the Y direction.

In the present embodiment, in order to achieve this, the centralized display processing, which causes a plurality of button images that are scattered throughout a screen to be displayed in centralized state at one desired area of the display surface 11a, is executed.

FIG. 12B illustrates an image (image after the centralized display processing) where all button images Bi included in the touch operation screen are displayed in centralized state around one area (display center point) Pa on the display surface 11a.

Here, the button images Bi all have the same shape and size, and display positions of the button images Bi each correspond to a button image area on the display surface 11a.

Each of the button images Bi has an X direction length that is a one-fifth (⅕) of the X direction length of the display surface 11a, and has a Y direction length that is one-fifth (⅕) of the Y direction length of the display surface 11a.

Further, in the X direction, the display center point Pa is located at a distance corresponding to one-fifth (⅕) the X direction length of the display surface 11a from the left end of the display surface 11a. In the Y direction, the display center point Pa is located at a distance corresponding to half the Y direction length of the Y direction length of the display surface 11a from the upper end of the display surface 11a.

The centralized display processing is performed by moving, among the button images Bi included in the touch operation screen illustrated in FIG. 12A, button images Bi that can be moved leftward in the X direction leftward in the X direction as far as possible.

Thus, when the centralized display processing is performed, all of the button images Bi are displayed around the display center point Pa and are located within an area at the left side of the display surface 11a that has two-fifths (⅖) the size of the display surface 11a, as illustrated in FIG. 12B.

In order to detect an X coordinate of a touch operation performed with respect to the button images Bi in the touch operation screen illustrated in FIG. 12B, in which the button images Bi are displayed in centralized manner, it suffices to switch to operation state only first sensors 21x that are located within a distance corresponding to two-fifths the entire X direction length of the display surface 11a from the left end of the display surface 11a. In FIG. 12B, such first sensors 21x are indicated by using unfilled circles.

That is, a plurality of first sensors 21x corresponding to a background image area portion 11z having a great surface area can be set to non-operation state. The background image area portion 11z is located at the right side of the area in which the button images Bi are displayed in centralized manner. In FIG. 12B, first sensors 21x that can be set to non-operation state are indicated by using filled circles.

As such, by changing display arrangement such that all button images Bi included in the touch operation screen illustrated in FIG. 12A (a first predetermined arrangement)

are arranged around the display center point Pa as illustrated in FIG. 12B (a second predetermined arrangement differing from the first predetermined arrangement), the number of sensors (first sensors 21x and second sensors 22y) corresponding to the background image area can be increased. Accordingly, the number of sensors (first sensors 21x and second sensors 22y) corresponding to the button images Bi is reduced.

For each of a plurality of touch operation screens, it is determined in advance whether or not the number of sensors (first sensors 21x and second sensors 22y) that are switched to operation state can be reduced when the centralized display processing is executed. When the number of sensors that are switched to operation state can be reduced by executing the centralized display processing with respect to a given touch operation screen, a determination is made that the centralized display processing is executable with respect to the given touch operation screen. On the other hand, when the number of sensors that are switched to operation state cannot be reduced by executing the centralized display processing with respect to a given touch operation screen, a determination is made that the centralized display processing is not executable with respect to the given touch operation screen. Results of the above-described determination are stored in the main control unit 30. In this sense, the main control unit 30, when executing the processing in Step S35, functions as a surface area increase determiner, as already described above.

FIGS. 12A and 12B illustrate an example where the display center point Pa is set at the left side of the center of the display surface 11a in the X direction. However, the display center point Pa may be set, for example, at the center of the display surface 11a or at the right side of the center of the display surface 11a.

Figure 13A:
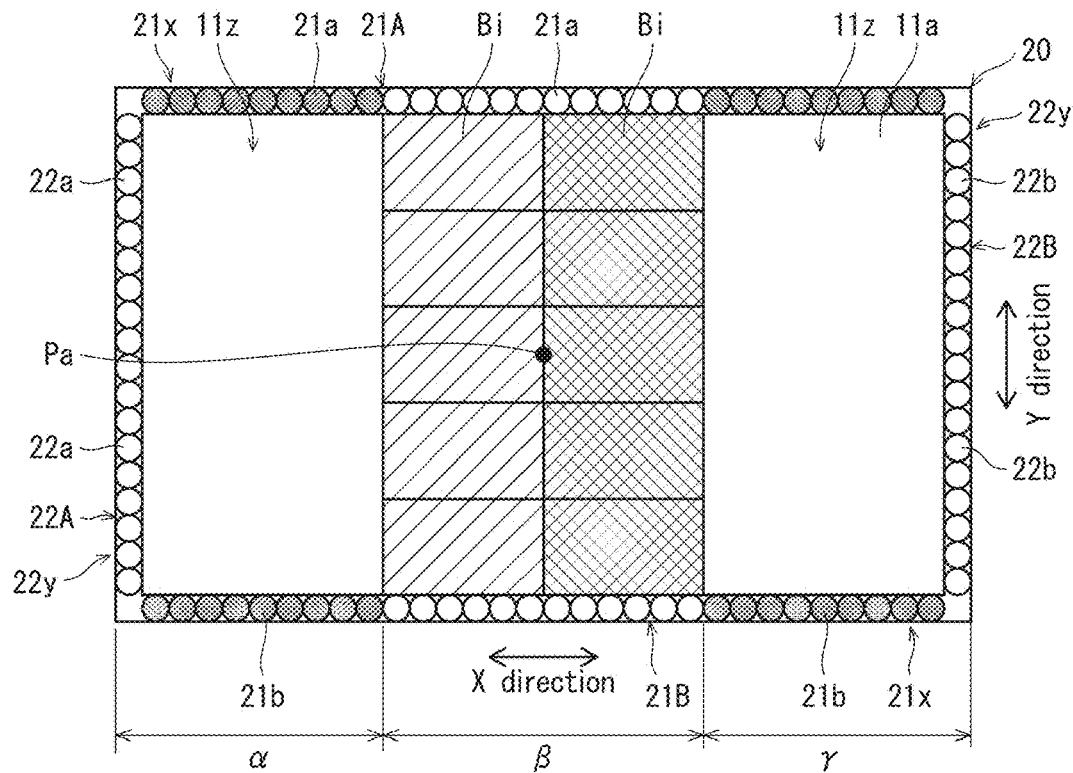
FIG. 13A is a schematic illustrating a state where image including button images in touch operation screen displayed in centralized manner at center of display surface, due to execution of centralized display processing, is displayed on display surface of display panel.
Figure 13B:
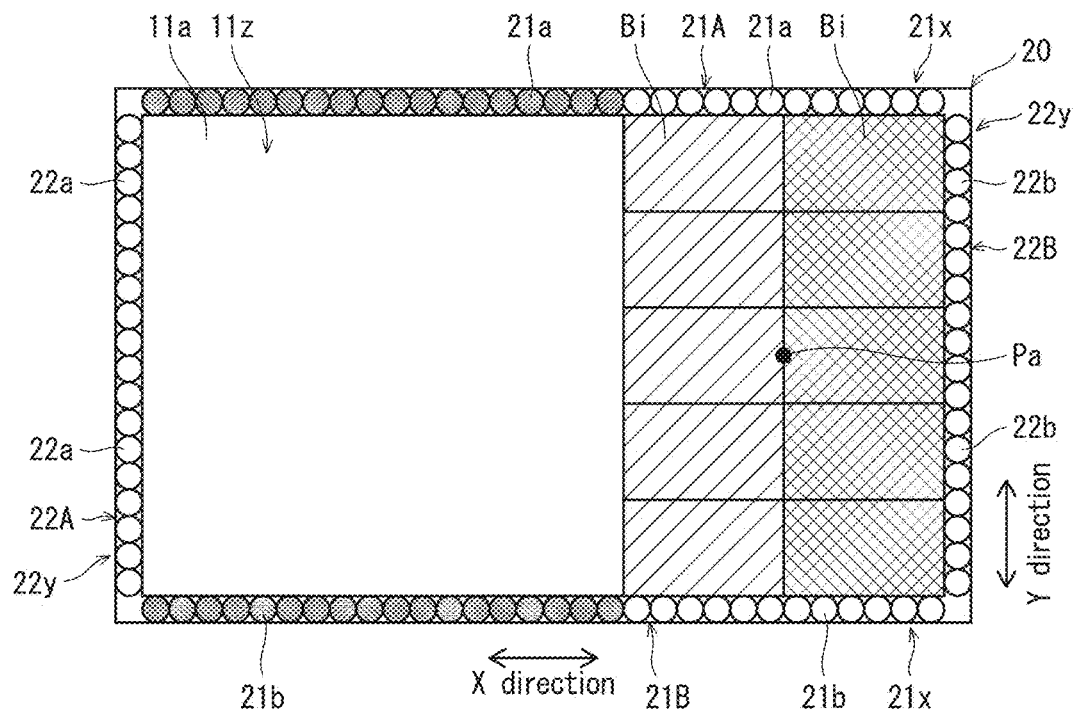
FIG. 13B is a schematic illustrating a state where image including button images in touch operation screen displayed in centralized manner at right side of display surface, due to execution of centralized display processing, is displayed on display surface of display panel.

FIG. 13A illustrates an example where the centralized display processing has been performed in a case where the display center point Pa is set at the center of the display surface 11a. FIG. 13B illustrates an example where the centralized display processing has been performed in a case where the display center point Pa is set at the right side of the center of the display surface 11a.

Performing the centralized display processing as illustrated in each of FIGS. 13A and 13B reduces the total number of sensors (first sensors 21x and second sensors 22y) that are switched to operation state compared to when button images are scattered as illustrated in FIG. 12A.

Further, as described later in the present disclosure, the determination of whether the display center point Pa is to be set to the location in FIG. 12B, the location in FIG. 13A, or the location in FIGS. 13B can be made based on a touch position of an initial touch operation performed by the user.

For example, when dividing the display surface in the X direction into three substantially equal areas (area α at the left, area β at the center, and area γ at the left) as illustrated in FIG. 13A, when the user performs the initial touch operation within the center area β, the display center point Pa is set to the center of the center area β as illustrated in FIG. 13A, and the centralized display processing is performed as illustrated in FIG. 13A.

Further, in the above-described case, when the user performs the initial touch operation within the right area γ, the display center point Pa is set to a location that is at a distance corresponding to one-fifths (⅕) the X direction length of the display surface 11a in the X direction from the right end of the display surface 11a and is at a distance corresponding to half (½) the Y direction length of the display surface 11a in the Y direction from the top end of the display surface 11a, and the centralized display processing is performed as illustrated in FIG. 13B.

Further, in the above-described case, when the user performs the initial touch operation within the left area α, the centralized display processing is performed as illustrated in FIG. 12B.

In the above, description is provided based on a case where a plurality of button images are rearranged into two parallel lines in the Y direction. However, a plurality of button images may be rearranged into two parallel lines in the X direction. The determination of the button arrangement direction of the rearranged buttons can be made in advance.

Returning to FIG. 6, in Step S35, when the main control unit 30 determines that the centralized display processing is not executable with respect to the display target touch operation screen (No in Step S35), processing proceeds to Step S23 in FIG. 5, and processing in and following Step S23 is executed.

Meanwhile, when the main control unit 30 determines that the centralized display processing is executable with respect to the display target touch operation screen (Yes in Step S35), processing proceeds to Step S36, and the centralized display processing is executed.

Figure 14:
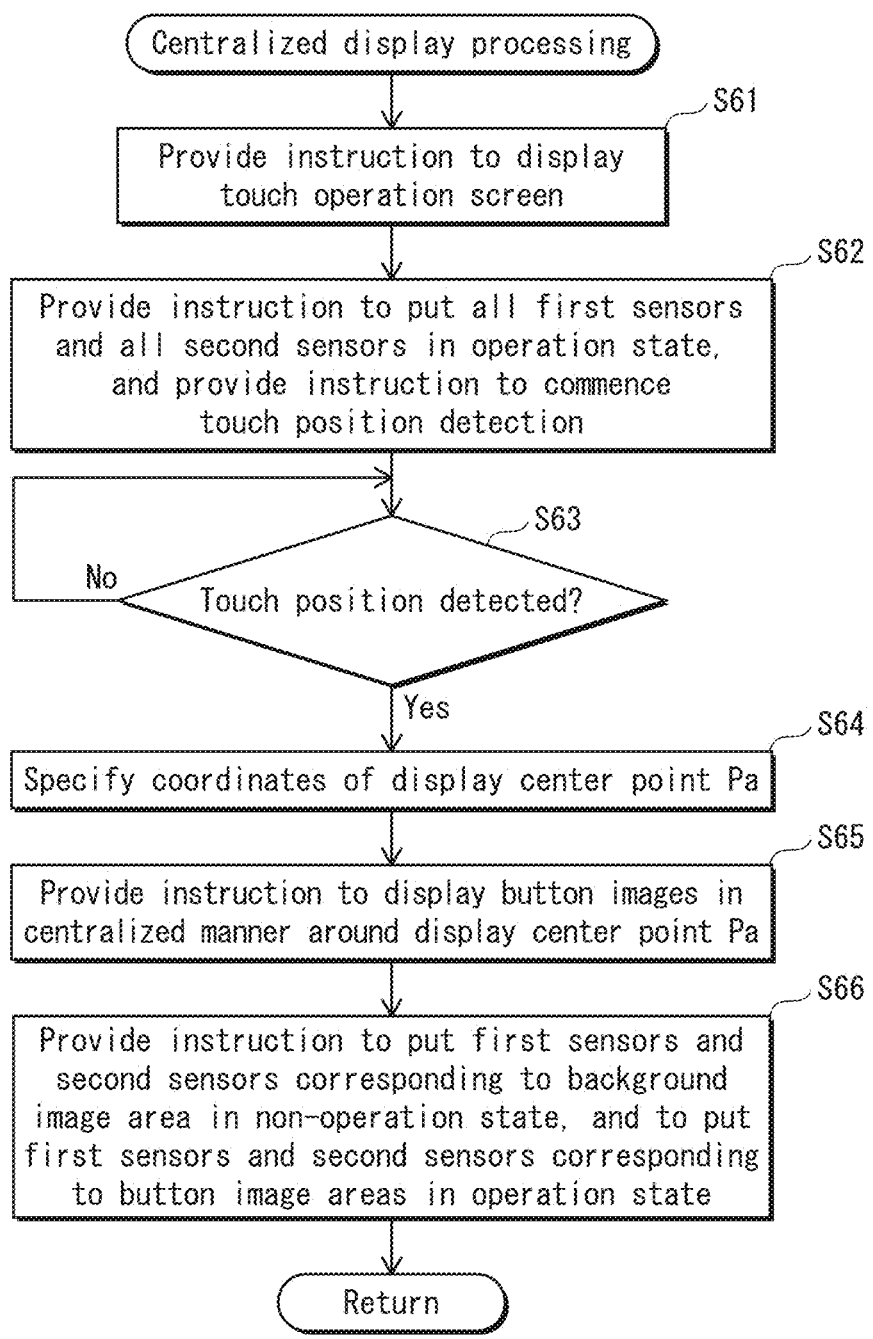
FIG. 14 is a flowchart illustrating sub-routines of centralized display processing executed in power saving control.

FIG. 14 is a flowchart illustrating sub-routines of the centralized display processing.

As illustrated in FIG. 14, first, the main control unit 30 provides an instruction to the display control unit 13 to display the display target touch operation screen (i.e., the touch operation screen with respect to which the centralized display processing has not yet been executed) (Step S61). Accordingly, a touch operation screen including button images that can be displayed in a centralized manner is displayed on the display surface 11a.

Subsequently, the main control unit 30 provides an instruction to the light-emission control unit 25 and the light-reception control unit 26 to switch to operation state all of the first sensors 21x and all of the second sensors 22y, and provides an instruction to the touch position detection mechanism 20 to commence the touch position detection (Step S62). In the present embodiment, the display center point Pa is determined based on an initial touch position after the touch operation screen has been displayed. Thus, in order to detect the initial touch position on the display surface 11a, all of the first sensors 21x and all of the second sensors 22y are switched to operation state.

Following this, the main control unit 30 remains in standby state until an initial touch position is detected due to the user performing a touch operation with respect to the display surface 11a (Step S63).

Subsequently, when an initial touch position is detected on the display surface 11a (Yes in Step S63), the main control unit 30 specifies the coordinate position of the display center point Pa based on the combination of the first sensor 21x and the second sensor 22y having detected the initial touch position (Step S64). Here, the main control unit 30 determines in which of the areas α, β, and γ illustrated in FIG. 13A the initial touch position is included. The main control unit 30 specifies the coordinate position illustrated in FIG. 12B as the display center point Pa when determining that the initial touch position is included in area α, specifies the coordinate position illustrated in FIG. 13A as the display center point Pa when determining that the initial touch position is included in area β, and specifies the coordinate position illustrated in FIG. 13B as the display center point Pa when determining that the initial touch position is included in area γ.

Subsequently, the main control unit 30 provides an instruction to the display control unit 13 to display the button images Bi in centralized manner around the display center point Pa (Step S65). In response, the display control unit 13 changes the display positions of the button images Bi such that all the button images Bi are displayed in a centralized manner around the display center point Pa on the display surface 11a. Accordingly, button images Bi that can be moved towards the display center point Pa are moved towards the display center point Pa. Thus, all of the button images Bi are displayed in a centralized manner around the display center point Pa.

Note that when displaying all button images Bi in a centralized manner as described above, adjacent ones of the button images Bi may be in contact with one another or may be arranged with relatively small spaces therebetween.

Following this, the main control unit 30 provides an instruction to keep in non-operation state all sensors (first sensors 21x and second sensors 22y) corresponding to the background image area (the area other than button images areas corresponding to the button images Bi) and to switch to operation state all sensors (first sensors 21x and second sensors 22y) corresponding to the button images areas of the button images Bi (Step S66). This concludes the centralized display processing, and processing proceeds to Step S24 in FIG. 5, where the main control unit 30 remains in standby state until a touch operation is performed with respect to one of the button images Bi, as already described above.

Note that the above-described centralized display processing also reduces the power consumption of the touch position detection mechanism 20 compared to when all of the first sensors 21x and all of the second sensors 22y are switched to operation state.

Meanwhile, when the above-described centralized display processing is executed, button images that were originally displayed in a scattered manner are displayed at different positions. Thus, some users may feel a decrease in usability. However, here, since the user has selected the power saving priority mode, the reduction of power consumption of the touch position detection mechanism 20 is prioritized over usability.

In the description above related to the centralized display processing, the display center point Pa is specified based on an initial touch position on the display surface 11a at which the user initially performs a touch operation. However, for example, the display center point Pa may be specified in advance as any desired position on the display surface 11a. When making such a modification, processing in and following Step S65 in FIG. 14 is executed without the processing in Steps S62 through S64 being executed.

<Slide Operation Power Saving Processing>

The following explains the slide operation power saving processing, which is executed in Step S13 in FIG. 5.

Figure 15:
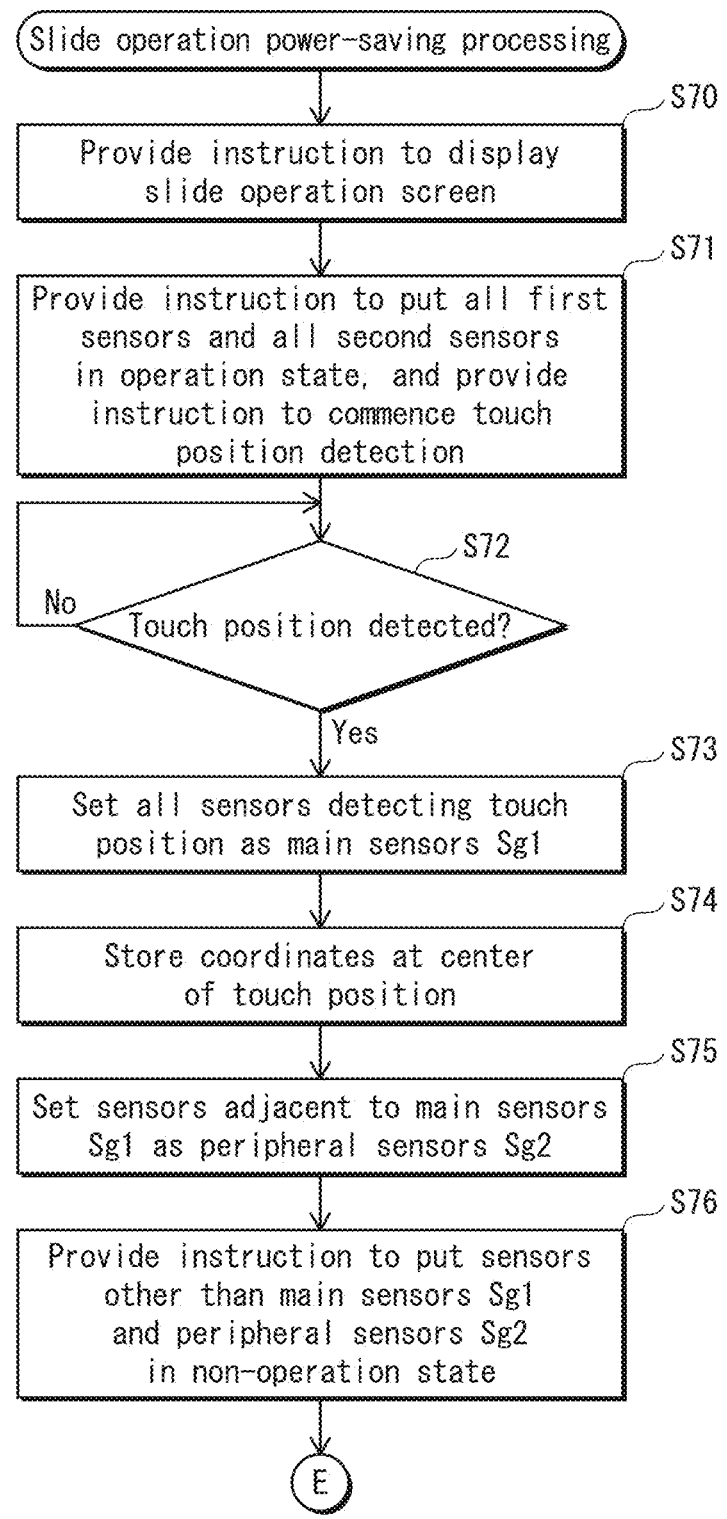
FIG. 15 is a flowchart illustrating sub-routines of slide operation power saving processing executed in power saving control.
Figure 16:
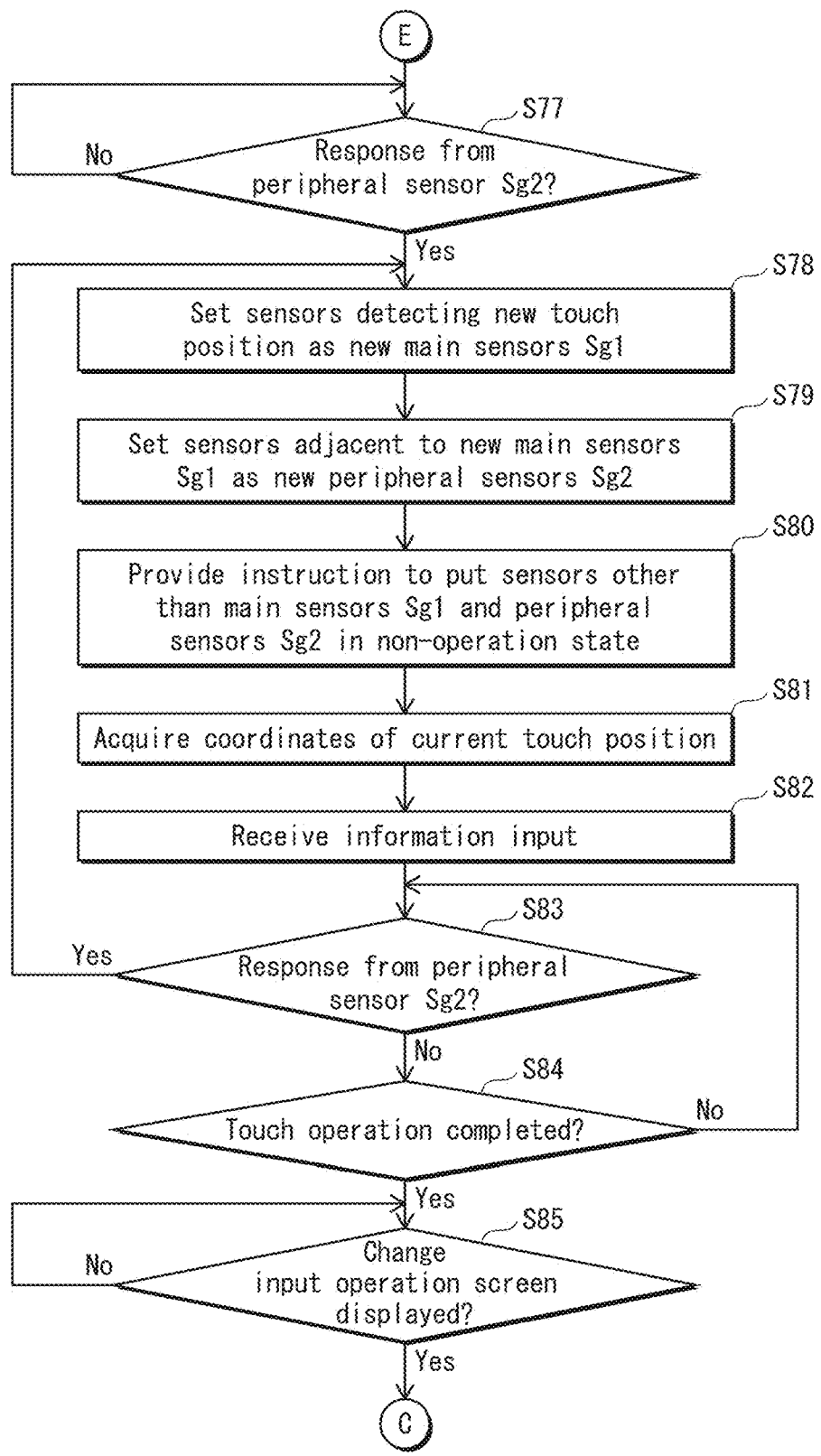
FIG. 16 is a flowchart that is a continuation of the flowchart in FIG. 15, and illustrates procedures of slide operation power saving processing.

FIGS. 15 and 16 are flowcharts illustrating sub-routines of the slide operation power saving processing. In the slide operation power saving processing, the main control unit 30 provides an instruction to the display control unit 13 to display, on the display surface 11a, a single touch screen or a double touch screen as a slide operation screen (Step S70 in FIG. 15).

A single touch screen, when displayed on the display surface 11a, includes, for example, an image whose display position can be changed when a flick operation is performed. A double touch screen, when displayed on the display surface 11a, includes, for example, an image whose size is increased when the user performs a pinch-out operation or is decreased when the user performs a pinch-in operation. Note that the processing illustrated in FIGS. 15 and 16 is executed regardless of whether a single touch screen or a double touch screen is displayed on the display surface 11a.

When a slide operation screen is displayed on the display surface 11a, the main control unit 30 provides an instruction to the touch position detection mechanism 20 to switch to operation state all of the first sensors 21x and all of the second sensors 22y, and provides an instruction to the touch position detection mechanism 20 to commence the touch position detection (Step S71).

Subsequently, the main control unit 30 remains in standby state until a touch position is detected (Step S72).

The touch position detection is performed by specifying, from among the plurality of first sensors 21x, a first sensor 21x whose first light-reception element 21b outputs a current lower than the threshold current, and specifying, from among the plurality of second sensors 22y, a second sensor 22y whose second light-reception element 22b outputs a current lower than the threshold current, and further by detecting the X coordinate position of the first sensor 21x and the Y coordinate position of the second sensor 22y, as already described above.

When a touch position is detected due to a touch operation being performed (Yes in Step S72), the main control unit 30 sets all the first sensors 21x and all the second sensors 22y that have detected touch positions as main sensors Sg1 (Step S73).

Further, the main control unit 30 determines an X coordinate and a Y coordinate at the center of the touch positions (area) based on the X coordinate positions and the Y coordinate positions of all main sensors Sg1, and stores the set of the X coordinate and the Y coordinate as a current touch position (Step S74).

Subsequently, the main control unit 30 sets, as peripheral sensors Sg2, first sensors 21x and second sensors 22y that correspond to an area surrounding the touch position detected by the main sensors Sg1 (Step S75). Accordingly, with respect to a first sensor 21x that has been set as a main sensor Sg1, two first sensors 21x, one at each side of the first sensor 21x in the X direction, are set as peripheral sensors Sg2. Similarly, with respect to a second sensor 22y that has been set as a main sensor Sg1, two second sensors 22y, one at each side of the second sensor 22y in the Y direction, are set as peripheral sensors Sg2.

When main sensors Sg1 and peripheral sensors Sg2 have been set, the main control unit 30 provides an instruction to the touch position detection mechanism 20 to keep in non-operation state all first sensors 21x and all second sensors 22y other than the main sensors Sg1 and the peripheral sensors Sg2 (Step S76).

Accordingly, the touch position detection mechanism 20 puts the touch position detection in off state with respect to X component areas and Y component areas corresponding to areas of the display surface other than the current touch position and an area surrounding the current touch position. As such, the touch position detection mechanism 20 executes the touch position detection with respect to only X component areas and Y component areas corresponding to the current touch position and the area surrounding the current touch position on the display surface 11a. This state is referred to in the following as a first state.

The following describes the above-described processing in Steps S71 through S76, taking as an example a case where a single touch screen is displayed on the display surface 11a.

FIG. 17 is a schematic for explaining a state before the user performs a slide operation with respect to a touch position on a single touch screen displayed on the display surface 11a, and a state after the user performs the slide operation.

In the following, on the display surface 11 having a single touch screen displayed thereon, a position where the user initially performs a touch operation by using his/her finger or the like is referred to as a touch position Pt. Before the slide operation, the area corresponding to the touch position Pt is detected by three first sensors 21x continuous in the X direction and three second sensors 22y continuous in the Y direction.

Accordingly, in Step S73, each of the three first sensors 21x is set as a main sensor Sg1, and each of the three second sensors 22y is set as a main sensor Sg1. In Step S74, an X coordinate of a first sensor 21x at the center of the three first sensors 21x set as main sensors Sg1 is stored as the X coordinate of the current touch position, and a Y coordinate of a second sensor 22y at the center of the three second sensors 22y set as main sensors Sg1 is stored as the Y coordinate of the current touch position.

Subsequently, in Step S75, two first sensors 21x, one at each side in the X direction of the group of three first sensors 21x having been set as main sensors Sg1, are each set as a peripheral sensor Sg2, and similarly, two second sensors 22y, one at each side in the Y direction of the group of three second sensors 22y having been set as main sensors Sg1, are each set as a peripheral sensor Sg2.

Subsequently, in Step S76, the main control unit 30 provides an instruction to the touch position detection mechanism 20 to keep all first sensors 21x other than the five first sensors 21x having been set as main sensors Sg1 or peripheral sensors Sg2 in non-operation state and all second sensors 22y other than the five second sensors 22y having been set as main sensors Sg1 or peripheral sensors Sg2 in non-operation state.

As such, when a single touch screen is displayed, at the point when the user has not yet performed a slide operation, the processing in Steps S71 through S76 puts five first sensors 21x and five second sensors 22y, which are indicated by using unfilled circles, in operation state while keeping the rest of the first sensors 21x and the second sensors 22y, which are indicated by using filled circles, in non-operation state.

Note that the result of the processing in Steps S71 through S76 is the same when a double touch screen is displayed on the display surface 11a. However, it should be noted that the user, when performing a pinch-in operation or a pinch-out operation, performs the touch operation by using two of his/her fingers. Further, when the two fingers that the user uses to perform the touch operation are in contact with one another in a pinch-out operation, a single area may be detected as a touch position Pt instead of two areas being detected as touch positions Pt.

Figure 18A:
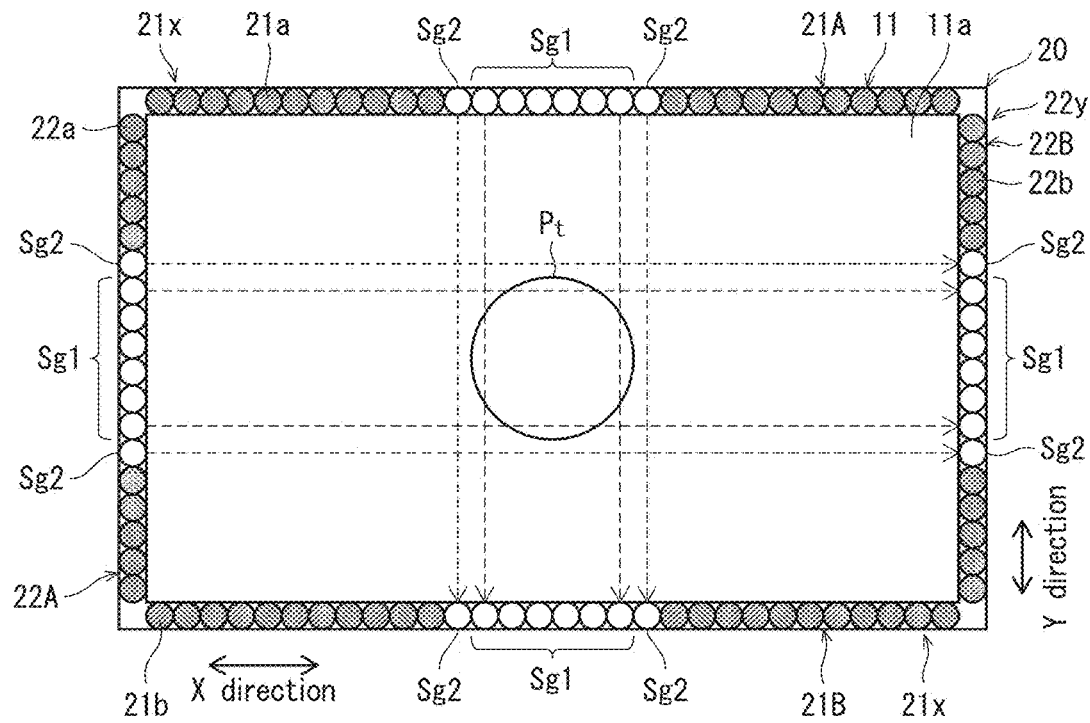
FIG. 18A is a schematic for explaining a state where user has initially performed touch operation on double touch screen displayed on display panel for performing pinch-out operation.

FIG. 18A is a schematic for explaining a state where the user has performed an initial touch operation on the display surface 11a to perform a pinch-out operation on a double touch screen displayed on the display surface 11a. In FIG. 18A, a single area is detected as a touch position Pt. The touch position Pt has a slightly greater surface area than a case where the user performs a touch operation on a single touch screen by using one finger. Further, FIG. 18A illustrates that the touch position Pt is detected by six first sensors 21x and six second sensors 22y.

In the case illustrated in FIG. 18A, the six first sensors 21x and the six second sensors 22y that detect the touch position Pt are each set as a main sensor Sg1. Further, two first sensors 21x, one at each side in the X direction of the group of six first sensors 21x having been set as main sensors Sg1, and two second sensors 22y, one at each side in the Y direction of the group of six second sensors 22y having been set as main sensors Sg1, are each set as a peripheral sensor Sg2.

Meanwhile, when the user performs a pinch-in operation on a double touch screen, the two fingers that the user uses to perform the touch operation are separated from one another, and thus two touch positions are detected. In this case, main sensors Sg1 and peripheral sensors Sg2 are set for each of the two touch positions, in a manner similar to when main sensors Sg1 and peripheral sensors Sg2 are set in the state illustrated in FIG. 17 (i.e., before a slide operation).

Subsequently, in Step S76, the main control unit 30 provides an instruction to the touch position detection mechanism 20 to keep in non-operation state all first sensors 21x and second sensors 22y other than the first sensors 21x and the second sensors 22y having been set as main sensors Sg1 or peripheral sensors Sg2.

Accordingly, similar to when a single touch screen is displayed, the touch position detection mechanism 20 puts the touch position detection in off state with respect to X component areas and Y component areas corresponding to areas of the display surface 11 other than the current touch position and an area surrounding the current touch position when a double touch screen is displayed. As such, the touch position detection mechanism 20 only executes the touch operation detection with respect to X component areas and Y component areas corresponding to the current touch position and the area surrounding the current touch position.

The following explains processing in and following Step S77 in FIG. 16.

In Step S77, the main control unit 30 remains in standby state until one peripheral sensor Sg2 among the peripheral sensors, which are switched to operation state, detects a touch operation and makes a response.

When a single touch screen or a double touch screen is displayed, the user normally performs a slide operation by sliding one or more fingers that the user has touched the display surface 11a with while keeping the fingers in contact with the display surface 11a. Accordingly, when a slide operation is performed, current output from a light-reception element (first light-reception element 21b or second light-reception element 22b) of one peripheral sensor Sg2 falls below the threshold current, which is considered as a response made by the peripheral sensor Sg2. Thus, in Step S77, the main control unit 30 determines that a slide operation has been performed with respect to the touch position when one of the peripheral sensors Sg2 makes a response (Yes in Step S77), and processing proceeds to Step S78.

In Step S78, the main control unit 30 sets all first sensors 21x and all second sensors 22y detecting a new touch position each as a new main sensor Sg1 (i.e., updates main sensors Sg1). Further, the main control unit 30 sets, as new peripheral sensors Sg2, each of two first sensors 21x, each at one side of the group of first sensors 21x having been newly set as main sensors Sg1, and each of two second sensors 22y, each at one side of the group of second sensors 22y having been newly set as main sensors Sg1 (i.e., updates peripheral sensors Sg2) (Step S79).

When having newly set main sensors Sg1 and peripheral sensors Sg2, the main control unit 30 provides an instruction to the touch position detection mechanism 20 to keep all first sensors 21x other than the first sensors 21x having been newly set as main sensors Sg1 or peripheral sensors Sg2 in non-operation state (off state) and to keep all second sensors 22y other than the second sensors 22y having been newly set as main sensors Sg1 or peripheral sensors Sg2 in non-operation state (off state), and to switch all first sensors 21x having been newly set as main sensors Sg1 or peripheral sensors Sg2 to operation state and to switch all second sensors 22y having been newly set as main sensors Sg1 or peripheral sensors Sg2 to operation state (Step S80). Thus, the main control unit 30 provides an instruction to the touch position detection mechanism 20 to transition from the first state to a second state.

When taking the single touch screen illustrated in FIG. 17 as an example, the touch position Pt, which is located at the position illustrated in the upper part of FIG. 17 before the slide operation, is located at a position (referred to in the following as a slide position Ps) that differs by a distance corresponding to one first sensor 21x to the right in the X direction after the slide operation.

Here, the second state, which refers to a state after a slide operation, indicates a state at the point of time where a peripheral sensor Sg2 (a second sensor 22y) that is located to the right in the X direction of the group of three first sensors 21x having been set as main sensors Sg1 before the slide operation (i.e., in the first state) makes a response (i.e., the point of time when the current output from a second light-reception element 22b of the peripheral sensor Sg2 falls below the threshold current).

In the state after the slide operation illustrated in the example illustrated in FIG. 17, three first sensors 21x and three second sensors 22y that detect the slide position Ps, which is moved in the right direction from the touch position Pt before the slide operation, are each newly set as a main sensor Sg1.

Further, two first sensors 21x, each at one side in the X direction of the group of first sensors 21x having been newly set as main sensors Sg1, and each of two second sensors 22y, each at one side in the Y direction of the group of second sensors 22y having been newly set as main sensors Sg1, are each newly set as peripheral sensors Sg2. Here, even when a given one (a first sensor 21x or a second sensor 22y) of the sensors described above that are newly set as peripheral sensors Sg2 has been already set as a peripheral sensor Sg2 before the slide operation, such a sensor is newly set as a peripheral sensor Sg2 once again if the given sensor corresponds to a peripheral sensor Sg2 after the slide operation.

After the main sensors Sg1 and the peripheral sensors Sg2 are newly set, the main control unit 30 provides, in Step S80, an instruction to the touch position detection mechanism 20 to keep all sensors other than the main sensors Sg1 and the peripheral sensors Sg2 in non-operation state.

Meanwhile, when a pinch-in operation or a pinch-out operation is performed with respect to a double touch screen, the two fingers that the user uses to perform the touch operation normally slide in opposite directions. Accordingly, when one touch position Pt has been initially detected and a slide operation is subsequently performed, peripheral sensors Sg2 that are located in opposite directions from the touch position Pt initially detected make a response. Further, when two touch positions Pt have been initially detected and a slide operation is subsequently performed, a peripheral sensor Sg2 around each of the two touch positions makes a response, and the peripheral sensors Sg2 making a response are located in opposite directions from the respective touch positions. Further, with respect to each of the two new touch positions detected by the two peripheral sensors making a response, main sensors Sg1 and peripheral sensors Sg2 are newly set.

Figure 18B:
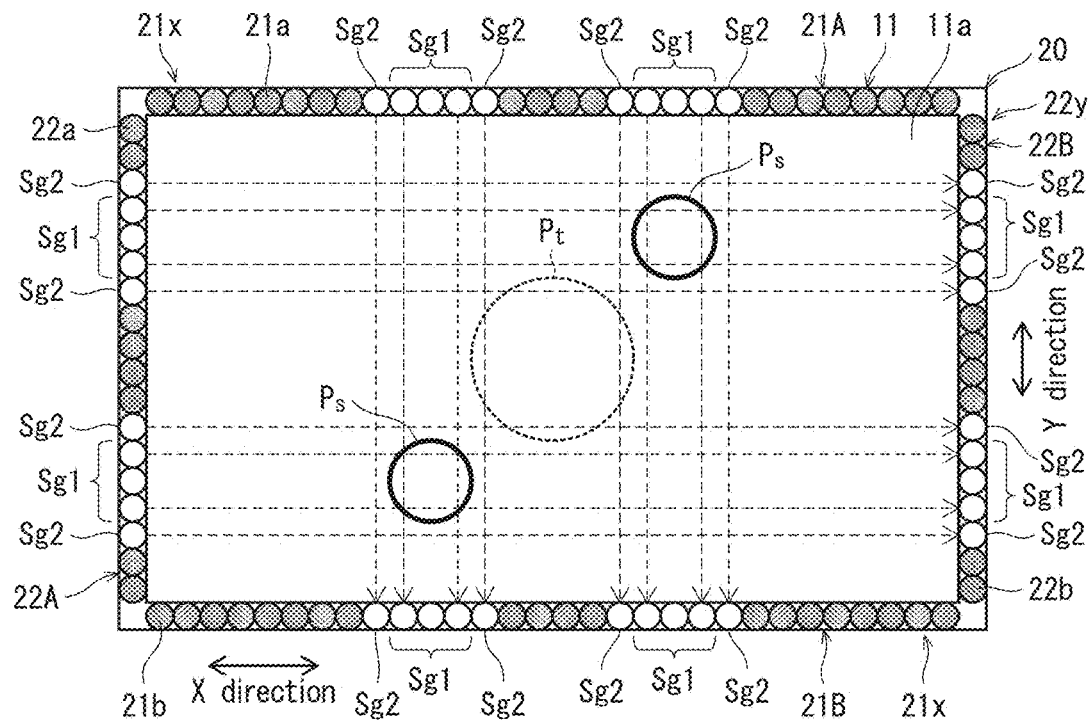
FIG. 18B is a schematic for explaining a state where user has performed pinch-put operation following the state illustrated in FIG. 18A.

FIG. 18B is a schematic for explaining a case where a pinch-put operation is performed on a double touch screen in the state illustrated in FIG. 18A, where a single initial touch position Pt has been detected. When the user performs the pinch-out operation, the single touch position Pt separates in two positions as illustrated in FIG. 18B, and the two position move along the display surface 11a in opposite directions so that the two positions separate from one another.

In this example, two peripheral sensors Sg2 located at opposite directions from the initial touch position Pt each detect a touch operation, and for each of the two slide positions Ps after the slide operation, all first sensors 21x and second sensors 22y corresponding to the slide position Ps (three first sensors 21x and three second sensors 22y in FIG. 18B) are each newly set as a main sensor Sg1.

Further, for each of the two slide positions Ps, peripheral sensors Sg2 are newly set with respect to the main sensors Sg1 that have been newly set. Here, as already described above, two first sensors 21x, one at each side in the X direction of the group of first sensors 21x having been newly set as main sensors Sg1, are each newly set as a peripheral sensor Sg2, and similarly, two second sensors 22y, one at each side in the Y direction of the group of three second sensors 22y having been newly set as main sensors Sg1, are each newly set as a peripheral sensor Sg2.

Meanwhile, when a pinch-in operation is performed with respect to a double touch screen, a touch operation is initially performed with respect to two areas (touch positions) on the display surface 11a. When a pinch-in operation is performed in this state, the two touch positions move along the display surface 11a in opposite directions, so that the two touch positions approach one another. In this case, similar to when a pinch-out operation is performed, main sensors Sg1 and peripheral sensors Sg2 are newly set for each of the two slide positions Ps.

Returning to FIG. 16, the main control unit 30 acquires X and Y coordinates of the center of the current touch position, in Step S81. The main control unit 30 performs this acquisition by detecting an X coordinate at a center position of all first sensors 21x that are currently set as main sensors Sg1, and detecting a Y coordinate at a center position of all second sensors 22y that are currently set as main sensors Sg1.

Subsequently, the main control unit 30 receives input of predetermined information based on the touch positions before and after the main sensors Sg1 and peripheral sensors Sg2 are newly set, or more specifically, based on the coordinates of the touch position acquired in Step S74 and the coordinates of the touch position acquired in Step S81 (Step S82).

For example when a single touch screen is displayed, the main control unit 30 regards that an instruction has been issued of moving an image from the touch position acquired in Step S74, which is the touch position before the main sensors Sg1 and the peripheral sensors Sg2 are newly set, towards the touch position acquired in Step S81, which is the touch position after the main sensors Sg1 and the peripheral sensors Sg2 are newly set, and receives the instruction.

Meanwhile, when a double touch screen is displayed, the main control unit 30 regards that an instruction has been issued to increase or decrease the size of the image displayed at the touch positions before the main sensors Sg1 and the peripheral sensors Sg2 are newly set, based on a difference between the two touch positions before the main sensors Sg1 and the peripheral sensors Sg2 are newly set and the two touch position after the main sensors Sg1 and the peripheral sensors Sg2 are newly set. Further, the main control unit 30 receives such an instruction. Here, note that the touch positions are those detected when the user performs a touch operation by using two fingers or the like. Specifically, when the user performs a pinch-out operation on a double touch screen, the main control unit 30 regards that an instruction has been issued to increase the size of the image that is displayed at the touch positions before the main sensors Sg1 and the peripheral sensors Sg2 are newly set along the slide direction by a rate corresponding to the slide distance. Meanwhile, when the user performs a pinch-in operation on a double touch screen, the main control unit 30 regards that an instruction has been issued to decrease the size of the image that is displayed at the touch positions before the main sensors Sg1 and the peripheral sensors Sg2 are newly set along the slide direction by a rate corresponding to the slide distance.

Subsequently, the main control unit 30 determines whether or not one of the peripheral sensors Sg2 makes a response due to the detection of a touch operation (Step S83).

When one of the peripheral sensors Sg2 makes a response due to the sliding of touch positions by the user being continued (Yes in Step S83), processing returns to Step S78, and processing in and following Step S78 is executed.

When a slide position on a single touch screen or slide positions on a double touch screen continues to slide, the processing in Steps S78 through S83 is executed each time there is a response from a peripheral sensor Sg2. Each time the processing in Steps S78 through S83 is executed, main sensors Sg1 and peripheral sensors Sg2 are newly set (updated), and the image displayed on the display surface 11a also is moved, enlarged, etc., along with the sliding of the one or more touch positions performed by the user.

Note that when the processing in Steps S78 through S83 is executed two or more times, the reception of input of predetermined information in Step S82 is performed each time, with the touch position acquired in Step S81 in the previous iteration being used as the touch position before the main sensors Sg1 and the peripheral sensors Sg2 are newly set and the touch position acquired in Step S81 in the instant iteration being used as the touch position after the main sensors Sg1 and the peripheral sensors Sg2 are newly set.

Subsequently, when the main control unit 30 determines that none of the peripheral sensors Sg2 makes a response due to the slide of the one or more touch positions Pt no longer taking place, or that is, due to the user no longer performing a slide operation by using his/her finger (No in Step S83), processing proceeds to Step S84.

In Step S84, the main control unit 30 determines whether the touch operation by the user has been completed.

The main control unit 30 determines that that the touch operation by the user has been completed when the user's finger or the like has departed from the display surface 11a, or more specifically, when all of the first sensors 21x and second sensors 22y, which are switched to operation state, transition to a state of not detecting any touch position (i.e., when the current output from all first sensors 21x and second sensors 22y become equal to or greater than the threshold current).

When completion of the touch operation by the user is not determined (No in Step S84), processing returns to Step S83.

Meanwhile, when determining that the touch operation by the user has been completed (Yes in Step S84), the main control unit 30 determines whether or not it is necessary to replace the slide operation screen currently displayed on the display surface 11a with a different input operation screen (not limited to a slide operation screen) (Step S85). For example, the main control unit 30 makes this determination based on a touch operation performed by the user with respect to a predetermined position on the slide operation screen displayed on the display surface 11a.

The main control unit 30 remains in standby state until determining that it is necessary to replace the input operation screen currently displayed with a different input operation screen. When the main control unit 30 determines that it is necessary to replace the input operation screen currently displayed with a different input operation screen (Yes in Step S85), processing returns to Step S11 illustrated in FIG. 5, and processing in and following Step S11 is executed.

As described above, after an initial touch operation is performed by the user on the display surface 11a with a slide operation screen displayed thereon, only first sensors 21x and second sensors 22y for performing touch operation detection at and around a touch position, among all first sensors 21x and all second sensors 22y, are switched to operation state. Thus, power consumption of the touch position detection mechanism 20 is reduced compared to when all first sensors 21x and all second sensors 22y are switched to operation state.

Further, when a slide of touch position is subsequently detected, only the first sensors 21x and the second sensors 22y for performing touch operation detection at and around the slide positions are newly switched to operation state.

The slide of touch position, direction of the slide, and the distance of the slide are acquired based on the first sensors 21x and the second sensors 22y that are switched to operation state. Thus, input of various types of information can be received on the slide operation screen while reducing power consumption of the touch position detection mechanism 20.

In the above, description is provided that only sensors adjacent to groups of main sensors Sg1 are set as peripheral sensors Sg2 for detecting X component areas and Y component areas corresponding to an area surrounding a touch position. However, other sensors may be set as peripheral sensors Sg2, and for example, in addition to sensors adjacent to the main sensors Sg1 being set as peripheral sensors Sg2, sensors adjacent to such peripheral sensors Sg2 may also be set as peripheral sensors Sg2. The number of sensors at one side of a group of main sensors Sg1 that are to be set as peripheral sensors Sg2 can be determined in advance.

[Modifications]

The power saving control described above allows execution of a plurality of processes in which the touch position detection mechanism 20 is put in power saving state, as illustrated in the flowcharts in FIGS. 5 and 6. However, the power saving control need not allow execution of all such processes, and may allow execution of one of such processes, or two or more selected ones among such processes.

<Modification 1>

For example, the touch operation power saving processing may not include the processing in Steps S17 through S20 and Step S22 in the flowchart in FIG. 5. In such a case, processing in Step S15 is executed, and when Yes in Step S16, processing proceeds to Step S21 (setting sensors corresponding to background image area to non-operation state). Subsequently, processing proceeding to Step S23.

When making this modification, due to Step S18 not being executed, the above-described process of keeping in non-operation state all first sensors 21x or all second sensors 22y is not performed even when a plurality of button images form a single line. However, this modification reduces power consumption of the touch position detection mechanism 20 compared to when all of the first sensors 21x and all of the second sensors 22y are switched to operation state. Further, when making this modification, it is no longer necessary to count the number of time touch operations have been performed in Step S25.

Alternatively, a modification may also be made such that Steps S15 and S17 are executed in the stated order, and when Yes in Step S17, Steps S21 and S22 (operation frequency-based processing) are executed in stated order.

<Modification 2>

In the description provided above, the operation frequency-based processing (Step S22) is executed when a plurality of button images form a single line. However, the operation frequency-based processing may be executed even when a plurality of button images do not form a single line.

For example, a modification may be made such that when button image B6 is not frequently accessed in an input operation screen such as that illustrated in FIG. 7, the display position of button image B6 is not changed (Step S44 is not executed) and at least one of shortening of operation state duration (Step S45) or reduction of power supply (Step S47) is executed with respect to each of first sensors 21x and second sensors 22y corresponding to the button image area of the button image B6.

When making this modification, Steps S15, S21, and S22 may be executed in the stated order, and in Step S22, processing other than that in Steps S43 and S44 may be executed.

Alternatively, a modification may be made such that when button image B8 in the example illustrated in FIG. 7 is not frequently accessed, shortening of operation state duration and/or reduction of power supply is executed with respect to only the three second sensors 22y corresponding to the button image area of the button image B8. When making such a modification, provided that the frequency at which button image B9 is accessed is not low, shortening of operation state duration and reduction of power supply are not executed with respect to the three first sensors 21x corresponding to the button image area of the button image B8, since the three first sensors 21x are also used for detecting touch operations performed with respect to the button image area of the button image B9.

Alternatively, a modification may be made such that not all of the power saving priority mode, the operation frequency-based processing, the single linear area display processing, and the centralized display processing are executed. For example, when making a modification such that only the single linear area display processing or the centralized display processing is executed, processing in and following Step S32 in FIG. 6 may be executed after Step S15 in FIG. 5.

Further, a plurality of button images need not be displayed on the display surface 11a, and for example, only one button image may be displayed on the display surface 11a. Thus, the present invention is applicable to when one or more button images are displayed on the display surface 11a.

<Modification 3>

In the embodiment, the space between two adjacent button images are considered as being a background image, and a first sensor 21x corresponding to the background image (for example, the set of the light-emission element 21aj and light-reception element 21bj in FIG. 3) is set to non-operation state. However, such a sensor may be set to operation state.

For example, a modification may be made such that an area surrounding a plurality of button images is considered as one button image area. When making such a modification, an area between two adjacent button images is included in a button image area, and thus a sensor (first sensor 21x or second sensor 22y) for performing the touch operation detection at the area between the two adjacent button images (for example, the set of the light-emission element 21aj and light-reception element 21bj in FIG. 3) is set to operation state.

This modification also reduces power consumption of the touch position detection mechanism 20 compared to when all first sensors 21x and all second sensors 22y are set to operation state.

That is, power consumption of the touch position detection mechanism 20 can be reduced compared to when all first sensors 21x and all second sensors 22y are set to operation state by setting to non-operation state at least one or more first sensors 21x and/or one or more second sensors 22y corresponding to an area that corresponds to a part of the background image area (second area), which is an area on the display surface 11a other than an area where an image that receives a user touch operation is displayed (first area). In other words, power consumption of the touch position detection mechanism 20 can be reduced compared to when all first sensors 21x and all second sensors 22y are set to operation state by putting in off state the touch position detection at X component areas and Y component areas corresponding to a part of the background image area (second area) and executing the touch detection at X component areas and Y component areas corresponding to the area where the image that receives a user touch operation is displayed (first area).

Note that for each touch operation screen that may be displayed, a determination can be made in advance of which part of the background image area with respect to which the touch position detection is to be put in the off state, and thus, the first sensors 21x and/or the second sensors 22y that are to be set to non-operation state, which correspond to the part of the background image area with respect to which the touch position detection is to be put in the off state.

<Modification 4>

In the embodiment, the touch position detection mechanism 20 is that of an optical type. Further, in the touch position detection mechanism 20, the light-emission elements 21a are connected to the light-emission power supply line 21e, each via a respective light-emission switch 21c, and the light-emission elements 21a emit light one at a time in the order in which the light-emission elements 21a are arranged, by the light-emission switches 21c being switched one at a time in order such that a light-emission switch 21c connected to a light-emission element 21a in operation state is put in on state. However, the touch position detection mechanism 20 need not be configured as described above.

For example, a modification may be made such that each of the light-emission elements 21a are controlled to be switched between a light-emission state and a light non-emitting state without provision of the light-emission switches 21c. When making such a modification, the switching between the standard power and the low drive power may be achieved by making a configuration such that the power supplied to each of the light-emission elements 21a can be changed.

Further, a modification may also be made such that instead of putting the light-emission elements 21a in light-emission state one at a time, all of the light-emission elements 21a that have been set to operation state are caused to emit light at the same time. This similarly applies to the light-emission elements 22a.

Further, the present invention is applicable to a configuration where light-emission elements that are set to operation state are supplied with power enabling the touch position detection, while light-emission elements that are set to non-operation state are not supplied with power.

The present invention is also applicable to touch position detection mechanisms of a type other than an optical type. For example, the present invention is applicable to a touch position detection mechanism of a projected capacitive type.

When using a projected capacitive type touch position detection mechanism, the first sensors are each constituted of a transparent electrode pattern that extends in the Y direction from an X coordinate position differing from that of another one of the first sensors. Similarly, the second sensors are each constituted of a transparent electrode pattern that extends in the X direction from a Y coordinate position differing from that of another one of the second sensors. Further, where the first sensors 21x and the second sensors 22y intersect, the sensors are electrically-insulated from one another.

Alternatively, the present invention is applicable to touch panels in general, including but not limited to those described above. That is, the present invention is applicable to a touch panel of any type, as long as touch position detection can be switched, by differing power supply, between on state (executable) and off state (non-executable) at each a plurality of areas indicated by different X and Y coordinates on the display surface 11a.

In the embodiment, description is provided on a touch panel input device that is used in an image forming device. However, the present invention is also applicable to touch panel input devices used in various electronic devices, such as personal computers, portable information terminal devices, and car-mounted information terminal devices.

Further, the embodiment and the modifications described above may each be combined with one another, as long as such combinations are implementable.

CONCLUSION

The embodiment and the modifications each merely describe one aspect of the present invention, which solves the technical problems presented in the "Description of the Related Art" section of the present disclosure. The following summarizes various aspects of the present invention.

One aspect of the present invention is a touch panel input device including: a display panel that has a display surface; a display controller that causes a button image to be displayed on the display surface, the button image used for receiving a touch operation performed by a user of the touch panel input device; a touch position detector that performs touch position detection of detecting a touch position of the display surface by detecting a set of an X coordinate and a Y coordinate on an X-Y rectangular coordinate system defined on the display surface; an area specifier that, when the button image is to be displayed on the display surface, specifies a first area and a second area of the display surface, the first area being an area of the display surface at which the button image is to be displayed, the second area being a remaining area of the display surface; and a detection instructor that refers to a result of the specification by the area specifier and provides an instruction to the touch position detector (i) to perform the touch position detection with respect to an area, on the rectangular coordinate system, corresponding to the first area and (ii) to put in off state the touch position detection with respect to an area, on the rectangular coordinate system, corresponding to at least a part of the second area.

The touch panel input device pertaining to one aspect of the present invention may further include: an arrangement determiner that, when a plurality of button image are to be displayed on the display surface, determines whether or not the button images, when displayed, form a single line extending along an X direction or a Y direction of the display surface, and in the touch panel input device pertaining to one aspect of the present invention, the detection instructor, when the arrangement determiner determines that the button images, when displayed, form a single line extending along the X direction, may provide an instruction to the touch position detector to put in off state detection of any Y coordinate on the rectangular coordinate system, regardless of the result of the specification by the area specifier, and the detection instructor, when the arrangement determiner determines that the button images, when displayed, form a single line extending along the Y direction, may provide an instruction to the touch position detector to put in off state detection of any X coordinate on the rectangular coordinate system, regardless of the result of the specification by the area specifier.

The touch panel input device pertaining to one aspect of the present invention may further include: a frequency classifier that, when the arrangement determiner determines that the button images, when displayed, form a single line along the X direction or the Y direction, classifies whether each of the button images is a low frequency button image or a high frequency button image, a button image classified as a low frequency button image being touched at a frequency lower than a threshold value, a button image classified as a high frequency button image being touched at a frequency higher than the threshold value, and in the touch panel input device pertaining to one aspect of the present invention, the touch position detector may include, for each of an X coordinate range of the display surface and a Y coordinate range of the display surface, a plurality of detectors for performing the touch position detection, and the detection instructor may provide an instruction to the touch position detector (i) to supply, to a detector for performing the touch position detection with respect to a first area on which a high frequency button image is to be displayed, a predetermined standard power within a predetermined power range, and (ii) to supply, to a detector for performing the touch position detection with respect to a first area on which a low frequency button image is to be displayed, a predetermined power within the predetermined power range and lower than the predetermined standard power, a power within the predetermined power range enabling the touch position detection.

In the touch panel input device pertaining to one aspect of the present invention, the display controller, when a result of the classification by the frequency classifier indicates that at least one of the high frequency button image and the low frequency button image is included in plurality in the button images, may change display positions of the button images such that the button images, when displayed, are arranged along the single line with each high frequency button image positioned within a first region and each low frequency button image positioned in a second region, the first region and the second region separated from one another in the direction in which the button images form a single line.

The touch panel input device pertaining to one aspect of the present invention may further include: a frequency classifier that, when the arrangement determiner determines that the button images, when displayed, form a single line along the X direction or the Y direction, classifies whether each of the plurality of button images is a low frequency button image or a high frequency button image, a button image classified as a low frequency button image being touched at a frequency lower than a threshold value, a button image classified as a high frequency button image being touched at a frequency higher than the threshold value, and in the touch panel input device pertaining to one aspect of the present invention, the touch position detector may include, for each of an X coordinate range of the display surface and a Y coordinate range of the display surface, a plurality of detectors for performing the touch position detection, the detection instructor may provide an instruction to the touch position detector to supply power enabling the touch position detection to two or more detectors that are to be used to perform the touch position detection, one at a time, and the detection instructor may provide an instruction to the touch position detector (i) to supply the power for a first duration to a detector for performing the touch position detection with respect to a first area on which a high frequency button image is to be displayed, and (ii) to supply the power for a second duration to a detector for performing the touch position detection with respect to a first area on which a low frequency button image is to be displayed, the second duration shorter than the first duration.

In the touch panel input device pertaining to one aspect of the present invention, the display controller, when a result of the classification by the frequency classifier indicates that at least one of the high frequency button image and the low frequency button image is included in plurality in the button images, may change display positions of the button images such that the button images, when displayed, are arranged along the single line with each high frequency button image positioned within a first region and each low frequency button image positioned in a second region, the first region and the second region separated from one another in the direction in which the button images form a single line.

The touch panel input device pertaining to one aspect of the present invention may further include: a surface area increase determiner that, when a plurality of button images are to be displayed on the display surface, determines whether or not a surface area of the area on the rectangular coordinate system with respect to which the touch position detection is put in off state increases if display positions of the button images were to be changed from a first predetermined arrangement to a second predetermined arrangement differing from the first predetermined arrangement, and in the touch panel input device pertaining to one aspect of the present invention, the display controller, when a result of the determination by the surface area increase determiner indicates that the surface area increases, may change the display positions of the button images.

In the touch panel input device pertaining to one aspect of the present invention, when displayed in the first predetermined arrangement, the button images may form a plurality of rows extending along one direction, the one direction being an X direction or a Y direction of the display surface, and when displayed in the second predetermined arrangement, the button images may form a single line extending along the one direction.

In the touch panel input device pertaining to one aspect of the present invention, when displayed in the first predetermined arrangement, the button images may be scattered throughout the display surface, and when displayed in the second predetermined arrangement, the button images may be displayed in centralized manner within one area of the display surface.

In the touch panel input device pertaining to one aspect of the present invention, the display controller displays the button images in the first predetermined arrangement before changing the display positions of the button images, and when the user performs a touch operation with respect to the display surface for a first time after the button images are displayed on the display surface in the first predetermined arrangement and the touch position detector detects a touch position, may determine the one area of the display surface based on the touch position and change the display positions of the button images such that the button images are displayed in centralized manner within the one area of the display surface.

The touch panel input device pertaining to one aspect of the present invention may further include: a frequency classifier that, when a plurality of button image are to be displayed on the display surface, classifies whether each of the button images is a low frequency button image or a high frequency button image, a button image classified as a low frequency button image being touched at a frequency lower than a threshold value, a button image classified as a high frequency button image being touched at a frequency higher than the threshold value, and in the touch panel input device pertaining to one aspect of the present invention, the touch position detector may include, for each of an X coordinate range of the display surface and a Y coordinate range of the display surface, a plurality of detectors for performing the touch position detection, and the detection instructor may provide an instruction to the touch position detector (i) to supply, to a detector for performing the touch position detection with respect to a first area on which a high frequency button image is to be displayed, a predetermined standard power within a predetermined power range, and (ii) to supply, to a detector for performing the touch position detection with respect to a first area on which a low frequency button image is to be displayed, a predetermined power within the predetermined power range and lower than the predetermined standard power, a power within the predetermined power range enabling the touch position detection.

In the touch panel input device pertaining to one aspect of the present invention, the area specifier may include an outline coordinate acquirer that acquires sets of X coordinates and Y coordinates that indicate an outline of the button image, and the area specifier may specify the first area and the second area by using the sets of X coordinates and Y coordinates.

In the touch panel input device pertaining to one aspect of the present invention, the touch position detector may include: an optical system that is composed of a first light-emission element array, a first light-reception element array, a second light-emission element array, and a second light-reception element array that are disposed around the display surface, each of the first light-emission element array and the second light-emission element array composed of a plurality of light-emission elements, each of the first light-reception element array and the second light-reception element array composed of a plurality of light-reception elements, the first light-emission element array and the first light-reception element array each being disposed to correspond to one of two sides of the display surface that are opposite one another in a Y direction, the second light-emission element array and the second light-reception element array each being disposed at one of two sides of the display surface that are opposite one another in an X direction; and a light-emission controller that controls each of the light-emission elements in the optical system, and the detection instructor may provide an instruction to the light-emission controller (i) to supply power enabling the touch position detection to a light-emission element for performing the touch position detection at the area on the rectangular coordinate system with respect to which the touch position detection is performed and (ii) not to supply power to a light-emission element for performing the touch position detection at the area on the rectangular coordinate system with respect to which the touch position detection is put in off state.

In the touch panel input device pertaining to one aspect of the present invention, the light-emission elements in the optical system may be connected to a same power supply line, each via a respective switch, and the detection instructor may provide an instruction to the light-emission controller to control on and off of the switches connected to the light-emission elements such that (i) a switch connected to a light-emission element for performing the touch position detection at the area on the rectangular coordinate system with respect to which the touch position detection is performed is turned on and (ii) a switch connected to a light-emission element for performing the touch position detection at the area on the rectangular coordinate system with respect to which the touch position detection is put in off state is turned off.

Another aspect of the present invention is a touch panel input device including: a display panel that has a display surface; a display controller that causes a predetermined screen to be displayed on the display surface; a touch position detector that performs touch position detection of detecting a touch position of the display surface by detecting a set of an X coordinate and a Y coordinate on an X-Y rectangular coordinate system defined on the display surface; and a detection instructor that, when the touch position detector detects a touch position with a slide operation screen for urging the user to perform a slide operation displayed on the display surface, provides an instruction to the touch position detector (i) to perform the touch position detection with respect to an area, on the rectangular coordinate system, corresponding to a first area of the display surface and (ii) to put in off state the touch position detection with respect to an area, on the rectangular coordinate system, corresponding to a second area of the display surface, the first area being an area of the display surface including the touch position and an area around the touch position, the second area being a remaining area of the display surface.

In the touch panel input device pertaining to another aspect of the present invention, when the user performs the slide operation and the touch position detector detects another touch position differing from the touch position while performing the touch position detection with respect to the first coordinate area, the detection instructor may provide an instruction to the touch position detector to transition to a state where (i) the touch position detection is performed with respect to a third coordinate area corresponding to a third area of the display surface and (ii) the touch position detection is put in off state with respect to a fourth coordinate area corresponding to a fourth area of the display surface, the third coordinate area and the fourth coordinate area each being an area on the rectangular coordinate system, the third area being an area of the display surface including the another touch position and an area around the another touch position, the fourth area being a remaining area of the display surface.

In the touch panel input device pertaining to another aspect of the present invention, the slide operation screen may be a single touch screen, the single touch screen being a screen receiving input of predetermined information when a touch position slides on the display screen in one direction.

In the touch panel input device pertaining to another aspect of the present invention, the slide operation screen may be a double touch screen, the double touch screen being a screen receiving input of predetermined information when touch positions slide on the display screen in respective directions differing from one another.

In the touch panel input device pertaining to another aspect of the present invention, the touch position detector may include: an optical system that is composed of a first light-emission element array, a first light-reception element array, a second light-emission element array, and a second light-reception element array that are disposed around the display surface, each of the first light-emission element array and the second light-emission element array composed of a plurality of light-emission elements, each of the first light-reception element array and the second light-reception element array composed of a plurality of light-reception elements, the first light-emission element array and the first light-reception element array each being disposed to correspond to one of two sides of the display surface that are opposite one another in a Y direction, the second light-emission element array and the second light-reception element array each being disposed at one of two sides of the display surface that are opposite one another in an X direction; and a light-emission controller that controls each of the light-emission elements in the optical system, and the detection instructor may provide an instruction to the light-emission controller (i) to supply power enabling the touch position detection to a light-emission element for performing the touch position detection at the area on the rectangular coordinate system with respect to which the touch position detection is performed and (ii) not to supply power to a light-emission element for performing the touch position detection at the area on the rectangular coordinate system with respect to which the touch position detection is put in off state.

In the touch panel input device pertaining to another aspect of the present invention, the light-emission elements in the optical system may be connected to a same power supply line, each via a respective switch, and the detection instructor may provide an instruction to the light-emission controller to control on and off of the switches connected to the light-emission elements such that (i) a switch connected to a light-emission element for performing the touch position detection at the area on the rectangular coordinate system with respect to which the touch position detection is performed is turned on and (ii) a switch connected to a light-emission element for performing the touch position detection at the area on the rectangular coordinate system with respect to which the touch position detection is put in off state is turned off.

In the touch panel input device pertaining to one aspect of the present invention, the touch position detection mechanism puts the touch position detection in off state with respect to the second coordinate area, which corresponds to at least a part of the second area.

Accordingly, power consumption of the touch position detection mechanism is reduced compared to a structure where the touch position detection is performed with respect to all areas of the display surface. As such, power consumption of the entire touch panel input device is reduced, regardless of whether or not the display panel includes a backlight.

In the touch panel input device pertaining to another aspect of the present invention, the touch position detection is executed only with respect to the first area of a slide operation screen displayed on the display surface of the display panel. The first area is an area including the touch position and an area around the touch position. Accordingly, power consumption of the touch position detection mechanism is reduced compared to a structure where the touch position detection is performed with respect to all areas of the display surface, while enabling detection of a slide of a touch position and the direction of the slide. As such, power consumption of the entire touch panel input device is reduced.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being encompassed by the present invention.

What is claimed is:

1. A touch panel input device comprising:
    a display panel that has a display surface;
    a memory configured to store a plurality of multiple linear area images and a plurality of single linear area images, each of the plurality of single linear area images corresponding to at least one of the plurality of multiple linear area images, each of the multiple and single linear area images representing an arrangement of buttons on the display panel;
    a touch position detector that includes a first element array arranged in an X direction and a second element array arranged in a Y direction, the first element array and the second element array usable for detecting a touch position of the display surface, and performs touch position detection of detecting the touch position of the display surface by detecting a set of an X coordinate and a Y coordinate on an X-Y rectangular coordinate system defined on the display surface, a power being provided for elements of the first element array and for elements of the second element array; and
    a hardware processor configured to:
        cause a plurality of button images to be displayed on the display surface, the plurality of button images used for receiving a touch operation performed by a user of the touch panel input device;
        specify a first area and a second area of the display surface when the plurality of button images are to be displayed on the display surface, the first area being an area of the display surface at which the plurality of button images are to be displayed, the second area being a remaining area of the display surface;
        based on a result of the specification, provide an instruction to the touch position detector by controlling power provided for the elements in the first element array and the elements in the second element array (i) to put in an on state the touch position detection with respect to an area, on the rectangular coordinate system, corresponding to the first area and (ii) to put in an off state the touch position detection with respect to an area, on the rectangular coordinate system, corresponding to at least a part of the second area; and
        change display positions of the plurality of button images in order to increase the number of an X component of the first element array and/or a Y component of the second element array with respect to which the touch position detection is put in off state, wherein the changing is from one multiple linear area image to a corresponding single linear area image, wherein
    the plurality of the single linear area images each reflect the plurality of button images extending in a single row along one direction,
    the plurality of multiple linear area images each reflect the plurality of button images extending in a plurality of rows, and
    the increase is in accordance with a decrease of numbers of the elements in the first element array and/or the second element array put in the on state for the touch position detection.

2. The touch panel input device of claim 1, wherein the hardware processor is configured to:
    provide, when determining that the button images, when displayed, form the single row extending along the X direction, an instruction to the touch position detector to put in off state detection of any Y coordinate on the rectangular coordinate system, regardless of the result of the specification by the hardware processor, and
    provide, when determining that the button images, when displayed, form the single row extending along the Y direction, an instruction to the touch position detector to put in off state detection of any X coordinate on the rectangular coordinate system, regardless of the result of the specification by the hardware processor.

3. The touch panel input device of claim 2, wherein
    the hardware processor is configured to classify, when determining that the button images, when displayed, form the single row along the X direction or the Y direction, whether each of the button images is a low frequency button image or a high frequency button image, a button image classified as a low frequency button image being touched at a frequency lower than a threshold value, a button image classified as a high frequency button image being touched at a frequency higher than the threshold value, the touch position detector includes, for each of an X coordinate range of the display surface and a Y coordinate range of the display surface, a plurality of detectors for performing the touch position detection, and
    the hardware processor is configured to provide an instruction to the touch position detector (i) to supply, to a detector for performing the touch position detection with respect to a first area on which a high frequency button image is to be displayed, a predetermined standard power within a predetermined power range, and (ii) to supply, to a detector for performing the touch position detection with respect to a first area on which a low frequency button image is to be displayed, a predetermined power within the predetermined power range and lower than the predetermined standard power, a power within the predetermined power range enabling the touch position detection.

4. The touch panel input device of claim 3, wherein
    the hardware processor is configured to, when a result of the classification indicates that at least one of the high frequency button image and the low frequency button image is included in the plurality of the button images, change display positions of the button images such that the button images, when displayed, are arranged along the single row with each high frequency button image positioned within a first region and each low frequency button image positioned in a second region, the first region and the second region separated from one another in the direction in which the button images form the single row.

5. The touch panel input device of claim 2, wherein
the hardware processor is configured to, when determining that the button images, when displayed, form the single row along the X direction or the Y direction, classify whether each of the plurality of button images is a low frequency button image or a high frequency button image, a button image classified as a low frequency button image being touched at a frequency lower than a threshold value, a button image classified as a high frequency button image being touched at a frequency higher than the threshold value, the touch position detector includes, for each of an X coordinate range of the display surface and a Y coordinate range of the display surface, a plurality of detectors for performing the touch position detection,
the hardware processor is configured to provide an instruction to the touch position detector to supply power enabling the touch position detection to two or more detectors that are to be used to perform the touch position detection, one at a time, and
the hardware processor is configured to provide an instruction to the touch position detector (i) to supply the power for a first duration to a detector for performing the touch position detection with respect to a first area on which a high frequency button image is to be displayed, and (ii) to supply the power for a second duration to a detector for performing the touch position detection with respect to a first area on which a low frequency button image is to be displayed, the second duration shorter than the first duration.

6. The touch panel input device of claim 5, wherein
the hardware processor is configured to, when a result of the classification indicates that at least one of the high frequency button image and the low frequency button image is included in plurality in the button images, change display positions of the button images such that the button images, when displayed, are arranged along the single row with each high frequency button image positioned within a first region and each low frequency button image positioned in a second region, the first region and the second region separated from one another in the direction in which the button images form the single row.

7. The touch panel input device of claim 1, wherein
when displayed in the first predetermined arrangement, the button images form a plurality of rows extending along one direction, the one direction being the X direction or the Y direction of the display surface, and
when displayed in the second predetermined arrangement, the button images form the single row extending along the one direction.

8. The touch panel input device of claim 1, wherein
the hardware processor is configured to, when a plurality of button images are to be displayed on the display surface, classify whether each of the button images is a low frequency button image or a high frequency button image, a button image classified as a low frequency button image being touched at a frequency lower than a threshold value, a button image classified as a high frequency button image being touched at a frequency higher than the threshold value,
the touch position detector includes, for each of an X coordinate range of the display surface and a Y coordinate range of the display surface, a plurality of detectors for performing the touch position detection, and
the hardware processor is configured to provide an instruction to the touch position detector (i) to supply, to a detector for performing the touch position detection with respect to a first area on which a high frequency button image is to be displayed, a predetermined standard power within a predetermined power range, and (ii) to supply, to a detector for performing the touch position detection with respect to a first area on which a low frequency button image is to be displayed, a predetermined power within the predetermined power range and lower than the predetermined standard power, a power within the predetermined power range enabling the touch position detection.

9. The touch panel input device of claim 1, wherein the hardware processor is configured to:
acquire sets of X coordinates and Y coordinates that indicate an outline of the button image, and
specify the first area and the second area by using the sets of X coordinates and Y coordinates.

10. The touch panel input device of claim 1, wherein
the touch position detector includes:
an optical system that is composed of a first light-emission element array, a first light-reception element array, a second light-emission element array, and a second light-reception element array that are disposed around the display surface, each of the first light-emission element array and the second light-emission element array composed of a plurality of light-emission elements, each of the first light-reception element array and the second light-reception element array composed of a plurality of light-reception elements, the first light-emission element array and the first light-reception element array each being disposed to correspond to one of two sides of the display surface that are opposite one another in a Y direction, the second light-emission element array and the second light-reception element array each being disposed at one of two sides of the display surface that are opposite one another in an X direction; and
a light-emission controller that controls each of the light-emission elements in the optical system, and
the hardware processor is configured to provide an instruction to the light-emission controller (i) to supply power enabling the touch position detection to a light-emission element for performing the touch position detection at the area on the rectangular coordinate system with respect to which the touch position detection is performed and (ii) not to supply power to a light-emission element for performing the touch position detection at the area on the rectangular coordinate system with respect to which the touch position detection is put in off state.

11. The touch panel input device of claim 10, wherein
the light-emission elements in the optical system are connected to a same power supply line, each via a respective switch, and
the hardware processor is configured to provide an instruction to the light-emission controller to control on and off of the switches connected to the light-emission elements such that (i) a switch connected to a light-emission element for performing the touch position detection at the area on the rectangular coordinate system with respect to which the touch position detection is performed is turned on and (ii) a switch connected to a light-emission element for performing the touch position detection at the area on the rectangular coordinate system with respect to which the touch position detection is put in off state is turned off.

12. A touch panel input device comprising:
a display panel that has a display surface;
a touch position detector that includes a first element array arranged in an X direction and a second element array arranged in a Y direction, the first element array and the second element array usable for detecting a touch position of the display surface, and performs touch position detection of detecting the touch position of the display surface by detecting a set of an X coordinate and a Y coordinate on an X-Y rectangular coordinate system defined on the display surface, a power being provided for elements of the first element array and for elements of the second element array; and
a hardware processor configured to:
cause a plurality of button images to be displayed on the display surface, the plurality of button images used for receiving a touch operation performed by a user of the touch panel input device;
specify a first area and a second area of the display surface when the plurality of button images are to be displayed on the display surface, the first area being an area of the display surface at which the plurality of button images are to be displayed, the second area being a remaining area of the display surface;
based on a result of the specification, provide an instruction to the touch position detector by controlling power provided for the elements in the first element array and the elements in the second element array (i) to put in an on state the touch position detection with respect to an area, on the rectangular coordinate system, corresponding to the first area and (ii) to put in an off state the touch position detection with respect to an area, on the rectangular coordinate system, corresponding to at least a part of the second area; and
change display positions of the plurality of button images in order to increase the number of an X component of the first element array and/or a Y component of the second element array with respect to which the touch position detection is put in off state, wherein the changing is from a first predetermined arrangement to a second predetermined arrangement differing from the first predetermined arrangement, the second predetermined arrangement displaying the plurality of button images in a centralized manner, wherein
the increase is in accordance with a decrease of numbers of the elements in the first element array and/or the second element array put in the on state for the touch position detection.

13. The touch panel input device of claim 12, wherein
the hardware processor is configured to classify, when determining that the button images, when displayed, form the cluster, whether each of the button images is a low frequency button image or a high frequency button image, a button image classified as a low frequency button image being touched at a frequency lower than a threshold value, a button image classified as a high frequency button image being touched at a frequency higher than the threshold value, the touch position detector includes, for each of an X coordinate range of the display surface and a Y coordinate range of the display surface, a plurality of detectors for performing the touch position detection, and
the hardware processor is configured to provide an instruction to the touch position detector (i) to supply, to a detector for performing the touch position detection with respect to a first area on which a high frequency button image is to be displayed, a predetermined standard power within a predetermined power range, and (ii) to supply, to a detector for performing the touch position detection with respect to a first area on which a low frequency button image is to be displayed, a predetermined power within the predetermined power range and lower than the predetermined standard power, a power within the predetermined power range enabling the touch position detection.

14. The touch panel input device of claim 13, wherein
the hardware processor is configured to, when a result of the classification indicates that at least one of the high frequency button image and the low frequency button image is included in the plurality in the button images, change display positions of the button images such that the button images, when displayed, are arranged in the cluster with each high frequency button image positioned within a first region and each low frequency button image positioned in a second region, the first region and the second region separated from one another in the cluster.

15. The touch panel input device of claim 12, wherein
the hardware processor is configured to, when determining that the button images, when displayed, form the cluster, classify whether each of the plurality of button images is a low frequency button image or a high frequency button image, a button image classified as a low frequency button image being touched at a frequency lower than a threshold value, a button image classified as a high frequency button image being touched at a frequency higher than the threshold value, the touch position detector includes, for each of an X coordinate range of the display surface and a Y coordinate range of the display surface, a plurality of detectors for performing the touch position detection,
the hardware processor is configured to provide an instruction to the touch position detector to supply power enabling the touch position detection to two or more detectors that are to be used to perform the touch position detection, one at a time, and
the hardware processor is configured to provide an instruction to the touch position detector (i) to supply the power for a first duration to a detector for performing the touch position detection with respect to a first area on which a high frequency button image is to be displayed, and (ii) to supply the power for a second duration to a detector for performing the touch position detection with respect to a first area on which a low frequency button image is to be displayed, the second duration shorter than the first duration.

16. The touch panel input device of claim 15, wherein
the hardware processor is configured to, when a result of the classification indicates that at least one of the high frequency button image and the low frequency button image is included in plurality in the button images, change display positions of the button images such that the button images, when displayed, are arranged along the cluster with each high frequency button image positioned within a first region and each low frequency button image positioned in a second region, the first region and the second region separated from one another in the cluster.

17. The touch panel input device of claim 12, wherein
when displayed in the first predetermined arrangement, the button images form a plurality of rows extending along one direction, the one direction being the X direction or the Y direction of the display surface, and
when displayed in the second predetermined arrangement, the button images form the cluster.

18. The touch panel input device of claim 12, wherein
when displayed in the first predetermined arrangement, the button images are scattered throughout the display surface, and
when displayed in the second predetermined arrangement, the button images are displayed in the cluster in a centralized manner within one area of the display surface.

19. The touch panel input device of claim 18, wherein the hardware processor is configured to:
display the button images in the first predetermined arrangement before changing the display positions of the button images, and
determine, when the user performs a touch operation with respect to the display surface for a first time after the button images are displayed on the display surface in the first predetermined arrangement and the touch position detector detects a touch position, the one area of the display surface based on the touch position and change the display positions of the button images such that the button images are displayed in the centralized manner within the one area of the display surface.

20. The touch panel input device of claim 12, wherein
the hardware processor is configured to, when a plurality of button images are to be displayed on the display surface, classify whether each of the button images is a low frequency button image or a high frequency button image, a button image classified as a low frequency button image being touched at a frequency lower than a threshold value, a button image classified as a high frequency button image being touched at a frequency higher than the threshold value,
the touch position detector includes, for each of an X coordinate range of the display surface and a Y coordinate range of the display surface, a plurality of detectors for performing the touch position detection, and
the hardware processor is configured to provide an instruction to the touch position detector (i) to supply, to a detector for performing the touch position detection with respect to a first area on which a high frequency button image is to be displayed, a predetermined standard power within a predetermined power range, and (ii) to supply, to a detector for performing the touch position detection with respect to a first area on which a low frequency button image is to be displayed, a predetermined power within the predetermined power range and lower than the predetermined standard power, a power within the predetermined power range enabling the touch position detection.

21. The touch panel input device of claim 12, wherein the hardware processor is configured to:
acquire sets of X coordinates and Y coordinates that indicate an outline of the button image, and
specify the first area and the second area by using the sets of X coordinates and Y coordinates.

22. The touch panel input device of claim 12, wherein the touch position detector includes:
an optical system that is composed of a first light-emission element array, a first light-reception element array, a second light-emission element array, and a second light-reception element array that are disposed around the display surface, each of the first light-emission element array and the second light-emission element array composed of a plurality of light-emission elements, each of the first light-reception element array and the second light-reception element array composed of a plurality of light-reception elements, the first light-emission element array and the first light-reception element array each being disposed to correspond to one of two sides of the display surface that are opposite one another in a Y direction, the second light-emission element array and the second light-reception element array each being disposed at one of two sides of the display surface that are opposite one another in an X direction; and
a light-emission controller that controls each of the light-emission elements in the optical system, and
the hardware processor is configured to provide an instruction to the light-emission controller (i) to supply power enabling the touch position detection to a light-emission element for performing the touch position detection at the area on the rectangular coordinate system with respect to which the touch position detection is performed and (ii) not to supply power to a light-emission element for performing the touch position detection at the area on the rectangular coordinate system with respect to which the touch position detection is put in off state.

23. The touch panel input device of claim 22, wherein
the light-emission elements in the optical system are connected to a same power supply line, each via a respective switch, and
the hardware processor is configured to provide an instruction to the light-emission controller to control on and off of the switches connected to the light-emission elements such that (i) a switch connected to a light-emission element for performing the touch position detection at the area on the rectangular coordinate system with respect to which the touch position detection is performed is turned on and (ii) a switch connected to a light-emission element for performing the touch position detection at the area on the rectangular coordinate system with respect to which the touch position detection is put in off state is turned off.

* * * * *